(12) United States Patent
He

(10) Patent No.: US 8,595,671 B2
(45) Date of Patent: Nov. 26, 2013

(54) LOW-POWER FPGA CIRCUITS AND METHODS

(75) Inventor: Lei He, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 309 days.

(21) Appl. No.: 12/773,686

(22) Filed: May 4, 2010

(65) Prior Publication Data

US 2010/0281448 A1    Nov. 4, 2010

Related U.S. Application Data

(60) Division of application No. 11/566,573, filed on Dec. 4, 2006, now Pat. No. 7,714,610, which is a continuation of application No. PCT/US2005/019732, filed on Jun. 3, 2005.

(60) Provisional application No. 60/654,186, filed on Feb. 17, 2005, provisional application No. 60/615,907, filed on Oct. 4, 2004, provisional application No. 60/577,428, filed on Jun. 4, 2004.

(51) Int. Cl.
*G06F 17/50* (2006.01)

(52) U.S. Cl.
USPC .................................................. 716/116

(58) Field of Classification Search
USPC ................................................. 716/100–139
See application file for complete search history.

(56) References Cited

U.S. PATENT DOCUMENTS

| | | | |
|---|---|---|---|
| 5,774,367 A | 6/1998 | Reyes et al. | |
| 6,101,143 A | 8/2000 | Ghia | |
| 6,175,952 B1 | 1/2001 | Patel et al. | |
| 6,232,893 B1 | 5/2001 | Cliff et al. | |
| 6,384,628 B1 | 5/2002 | Lacey et al. | |
| 6,710,621 B2 | 3/2004 | Devlin et al. | |
| 6,714,043 B1 | 3/2004 | Sharpe-Geisler | |
| 6,859,066 B1 | 2/2005 | Rahman et al. | |
| 6,897,677 B2 | 5/2005 | Devlin et al. | |
| 6,940,307 B1 | 9/2005 | Liu et al. | |
| 7,026,840 B1 | 4/2006 | May et al. | |
| 2001/0039640 A1* | 11/2001 | Bernstein et al. | 716/2 |
| 2002/0005735 A1 | 1/2002 | Goettling et al. | |
| 2002/0163826 A1* | 11/2002 | Devlin et al. | 365/63 |
| 2004/0174187 A1* | 9/2004 | New | 326/41 |
| 2004/0243958 A1* | 12/2004 | Bednar et al. | 716/7 |
| 2005/0114814 A1* | 5/2005 | Correale et al. | 716/10 |

OTHER PUBLICATIONS

United States Patent and Trademark Office, International Search Report and Written Opinion issued Feb. 22, 2006, counterpart PCT International Application No. PCT/US2005/019732, including claims, 18 pages.

* cited by examiner

*Primary Examiner* — Vuthe Siek
*Assistant Examiner* — Aric Lin
(74) *Attorney, Agent, or Firm* — John P. O'Banion

(57) ABSTRACT

Field Programmable Logic Arrays (FPGAs) are described which utilize multiple power supply voltages to reduce both dynamic power and leakage power without sacrificing speed or substantially increasing device area. Power reduction mechanisms are described for numerous portions of the FPGA, including logic blocks, routing circuits, connection blocks, switch blocks, configuration memory cells, and so forth. Embodiments describe circuits and methods for implementing multiple supplies as sources of $V_{dd}$, multiple voltage thresholding $V_t$, signal level translators, and power gating of circuitry to deactivate portions of the circuit which are inactive. The supply voltage levels can be fixed, or programmable. Methods are described for performing circuit CAD in the routing and assignment process on FPGAs, in particular for optimizing FPGA use having the power reduction circuits taught. Routing methods describe utilizing slack timing, power sensitivity, trace-based simulations, and other techniques to optimize circuit utilization on a multi $V_{dd}$ FPGA.

28 Claims, 39 Drawing Sheets

Sensitivity-based dual-Vdd assignment algorithm:
input: single-Vdd BC-netlist $N$
output: dual-Vdd BC-netlist $N'$
  (with original Vdd and another low Vdd)
constraint:
$$\frac{crit\_path\_delay(N') - crit\_path\_delay(N)}{crit\_path\_delay(N)} < delay\_increase\_bound$$

Let partially assigned BC-netlist $N_p$ be input netlist $N$;
While( $N_p$ has logic blocks not tried )
begin
    Find path $p$ with largest timing slack in $N_p$;
    Get logic blocks on path $p$ but not on critical path;
    Calculate power-sensitivity for those logic blocks;
    Select logic block $B$ with largest sensitivity;
    Assign low Vdd to $B$ and update timing information;
    If( delay constraint not met )
    begin
        Reverse the low-Vdd assignment;
    end
    mark logic block $B$ as 'tried';
end
Let the output netlist $N'$ be $N_p$

FIG. 10

```
Sensitivity-based dual-Vdd assignment algorithm:
Assign VddH to all logic blocks;
While ( ∃ logic blocks not tried )
{
  Obtain logic blocks on circuit path with largest timing slack;
  Calculate power-sensitivity S for these logic blocks;
  Assign VddL to the block with largest S if no critical delay increase;
  Update timing slack and mark the logic block as tried;
}
```

```
Sensitivity-based dual-Vdd assignment algorithm:
Assign VddH to all assignment units;
Calculate power-sensitivity S for all assignment units;
While( ∃ assignment units not tried )
{
    Assign VddL to the unit with largest S if no
critical path increase;
    Update timing slack and mark the unit as tried;
}
```

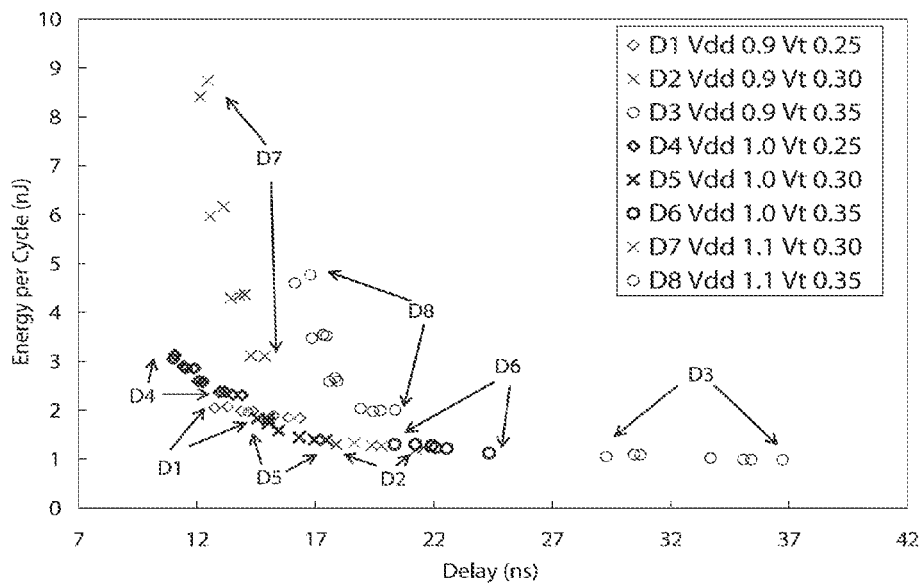

FIG. 47

```
Segment based heuristic:
Assign VddH to all switches and mark them as 'untried';
Calculate power-sensitivity for all switches;
While( ∃ 'untried' switch){
    Assign VddL to the candidate switch j with the largest
power sensitivity;
    If (critical path delay increases){
        Find all the upstream switches of j in the same tree;
        Assign VddH to j and those upstream switches, and
mark them as 'tried';
    }
    Else mark j as 'tried';
}
```

FIG. 48

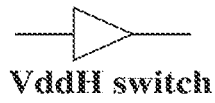
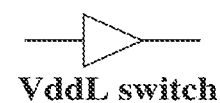
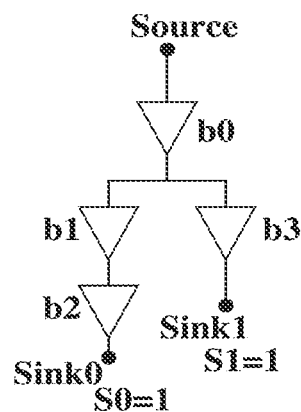
FIG. 49A
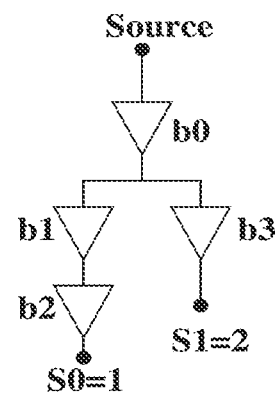
FIG. 49B
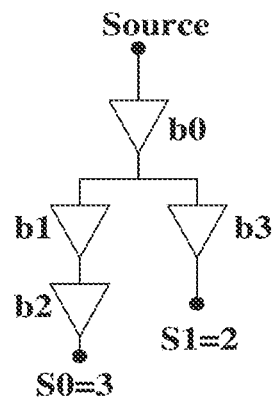
FIG. 49C
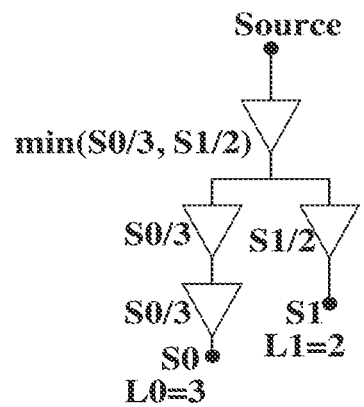
FIG. 49D

US 8,595,671 B2

LOW-POWER FPGA CIRCUITS AND METHODS

CROSS-REFERENCE TO RELATED APPLICATIONS

This application is a divisional of U.S. patent application Ser. No. 11/566,573 filed on Dec. 4, 2006, now U.S. Pat. No. 7,714,610, incorporated herein by reference in its entirety, which claims priority from, and is a 35 U.S.C. §111(a) continuation of, co-pending PCT international application serial number PCT/US2005/019732, filed on Jun. 3, 2005, incorporated herein by reference in its entirety, which claims priority from U.S. provisional application Ser. No. 60/654,186, filed on Feb. 17, 2005, incorporated herein by reference in its entirety, U.S. provisional application Ser. No. 60/615,907, filed on Oct. 4, 2004, incorporated herein by reference in its entirety, and U.S. provisional application Ser. No. 60/577,428, filed on Jun. 4, 2004, incorporated herein by reference in its entirety.

STATEMENT REGARDING FEDERALLY SPONSORED RESEARCH OR DEVELOPMENT

This invention was made with Government support under Grant No. CCR-0401682 and CCR-0306682 awarded by the National Science Foundation. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to field-programmable logic arrays, and more particularly to circuits and methods for reducing power consumption using multiple supplies.

2. Description of Related Art

Field Programmable Gate Arrays (FPGAs) are an important and commonly used circuit element in conventional electronic systems. FPGAs are attractive for use in many designs in view of its low non-recurring engineering costs (NRE) and rapid time to market. FPGA circuitry is also being increasingly integrated within other circuitry to provide a desired amount of programmable logic.

Many applications can be implemented using FPGA devices without the need of fabricating a custom integrated circuit, or application specific integrated circuit (ASIC) as it is called. Although ASICs allow all the circuitry to be customized to the application, including all transistor parameters, routing and so forth, they are very costly in terms of engineering costs, mask fabrication, and minimum order sizes. ASICS have been designed with more than one supply which is readily implemented in the masking which is developed around that specific application circuit. In ASICs the geometries of all elements can be customized for the specific application. In some ASIC designs different level converter circuits have been used with two supply designs. DCVS level converters and level converters with data latch have been proposed in for use in ASIC design. These level converters use both high and low supply voltage levels for a single rail and create extra constraints for power/ground routing.

However, it should be appreciated that the fixed patterns implemented within FPGAs provide a number of challenges which have prevented multi source techniques from providing real world benefits.

Typically, an FPGA is made up of two types of blocks: logic blocks (typically comprising look-up tables (LUTs)), and interconnects (routing). More complicated FPGAs may also include blocks of dedicated RAM and some common logical blocks such as adders, multipliers, and so forth.

FIG. 1 depicts a conventional 4-input LUT using single $V_{dd}$ and $V_t$ and is referred to herein as a "LUT_SVST". LUTs are utilized as a gate that can be programmed for any desired logic function. A single bit output LUT with a desired number of input terms is usually implemented as a storage block of memory cells with a one-bit word. To program the LUT, the truth table of the gate being implemented by the LUT is loaded into the storage block, with the truth table corresponding to the address lines of the storage element, and the output of the truth table being the stored value at that address. The storage element may be directly connected to the output, coupled to other elements or interconnects, a flip-flop inserted between the gate and the output for clocked logic, and so forth.

The inputs and outputs to the various LUTs are connected to each other by interconnects, such as including routing blocks (e.g., including wire segments, connection blocks, and switch blocks). Each routing block has several wires connected to it, and these wires have programmable connections between them. Since the total number of possible connections increases rapidly in response to the number of wires connected to the routing block, most routing blocks are designed with a limited number of paths through the block. The LUTs and interconnects are usually distributed throughout the FPGA, such as giving it a regular array structure.

One of the drawbacks of FPGA circuitry is a low power efficiency which limits applicability of the devices. Attention has been increasingly focused on improving FPGA power efficiency, as power has become an increasingly important design constraint. One study introduced hierarchical interconnects to reduce interconnect power, but they do not consider deep sub-micron effects such as the increasingly large leakage power. Another study developed a flexible power evaluation framework referred to as "fpga EVA-LP" (fpga_EVALP) and performed dynamic and leakage power evaluation for FPGAs with cluster-based logic blocks and island style routing structure.

Accordingly, it will be appreciated that interconnect power consumption is a major detractor to the use of FPGAs. The present invention reduces interconnect power levels without significantly increasing circuit cost or complexity.

BRIEF SUMMARY OF THE INVENTION

FPGA circuits and methods are described for increasing the utilization of FPGAs, reducing the need for additional control memory, reducing leakage current, and reducing overall power consumption. It should be appreciated that the apparatus and methods discussed may be utilized separately or in combination with other aspects of the invention, or in combination with conventional technology, without departing from the teachings of the present invention.

The prior work on FPGAs has considered the use of uniform supply voltage $V_{dd}$ and threshold voltage $V_t$. It has not been appreciated that multiple supply voltages can reduce power consumption. Supply voltage reduction is effective to limit the dynamic power consumption because dynamic power reduces quadratically as the supply voltage scales down. Dual-$V_{dd}$ or multi-$V_{dd}$ techniques has been deployed in application specific integrated circuits (ASICs) in which the supply levels can be tailored to elements designed into the masks from which the layers of the specific integrated circuit are fabricated. Using multiple supplies has shown to achieve dynamic power reductions of roughly 40-45%, while reducing leakage power.

The application is divided into a number of sections, which each describe additional aspects of the invention. These sections are summarized as follows.

Low-Power FPGA Using Pre-Defined Dual-$V_{dd}$/Dual-$V_t$ Fabrics.

Traditional FPGAs use uniform supply voltage $V_{dd}$ and uniform threshold voltage $V_t$. We propose to use pre-defined dual-$V_{dd}$ and dual-$V_t$ fabrics to reduce FPGA power. Dual-$V_{dd}$ circuitry reduces power consumption by utilizing a high circuit voltage (i.e., $V_{ddH}$) on critical circuit paths and low circuit voltages (i.e., $V_{ddL}$) on non-critical paths which can tolerate slower transition speeds. We design FPGA circuits with dual-$V_{dd}$/dual-$V_t$ to effectively reduce both dynamic power and leakage power, and define dual-$V_{dd}$/dual-$V_t$ FPGA fabrics based on the profiling of benchmark circuits. We further develop CAD algorithms including power-sensitivity-based voltage assignment and simulated-annealing based placement to leverage such fabrics.

Compared to the conventional fabric using uniform $V_{dd}/V_t$ at the same target clock frequency, our new fabric using dual-$V_t$ achieves 9% to 20% power reduction. However, the pre-defined FPGA fabric using both dual-$V_{dd}$ and dual-$V_t$ only achieves on average 2% extra power reduction. The limited power reduction is because the pre-designed dual-$V_{dd}$ layout pattern introduces non-negligible performance penalty. Therefore, programmability of supply voltage is needed to achieve significant power saving for dual-$V_{dd}$ FPGAs. The teachings of the present invention include an in-depth study on applying both dual-$V_{dd}$ and dual-$V_t$ to FPGA circuits, fabrics and CAD algorithms.

FPGA Power Reduction Using Configurable Dual-$V_{dd}$.

Power optimization is of growing importance for FPGAs in nanometer technologies. Considering dual-$V_{dd}$ technique, we show that configurable power supply is required to obtain a satisfactory performance and power trade-off. We design FPGA circuits and logic fabrics using configurable dual-$V_{dd}$ and develop the corresponding CAD flow to leverage such circuits and logic fabrics. We then carry out a highly quantitative study using area, delay and power models obtained from detailed circuit design and SPICE simulation in 100 nm technology. Compared to single-$V_{dd}$ FPGAs with optimized $V_{dd}$ levels for the same target clock frequency, configurable dual-$V_{dd}$ FPGAs with full and partial supply programmability for logic blocks reduce logic power by 35.46% and 28.62% respectively and reduce total FPGA power by 14.29% and 9.04% respectively. This portion of the application teaches the use of FPGAs with configurable dual-$V_{dd}$ for power reduction.

$V_{dd}$-Programmability to Reduce FPGA Interconnect Power.

Power is an increasingly important design constraint for FPGAs in nanometer technologies. Because interconnect power is dominant in FPGAs, we design $V_{dd}$-programmable interconnect fabric to reduce FPGA interconnect power. There are three $V_{dd}$ states for interconnect switches: high $V_{dd}$, low $V_{dd}$ and power-gating. We develop a simple design flow to apply high $V_{dd}$ to critical paths and low $V_{dd}$ to non-critical paths and to power gate unused interconnect switches. We carry out a highly quantitative study by placing and routing benchmark circuits in 100 nm technology to illustrate these power savings. Compared to single-$V_{dd}$ FPGAs with optimized but non-programmable $V_{dd}$ level for the same target clock frequency, our new FPGA fabric on average reduces interconnect power by 56.51% and total FPGA power by 50.55%. Due to the highly low utilization rate of routing switches, the major portion of the power reduction is achieved by power gating unused routing buffers. In contrast, recent work that considers $V_{dd}$-programmability only for logic fabric reduces total FPGA power by merely 14.29%. This portion of the application teaches the use of $V_{dd}$-programmability for FPGA interconnect power reduction Routing Track Duplication with Power-Gating for Interconnect Power Reduction.

Power has become an increasingly important design constraint for FPGAs in nanometer technologies, and global interconnects should be the focus of FPGA power reduction as they consume more power than logic cells. We design area-efficient circuits for programmable fine-grained power-gating of individual unused interconnect switches, and reduce interconnect leakage power dramatically because the interconnect switches have an intrinsically low utilization rate for the purpose of programmability. The low leakage interconnect via power-gating reduces total power by 38.18% for the FPGA in 100 nm technology. Furthermore, it enables interconnect dynamic power reduction. We design a routing channel containing abundant or duplicated routing tracks with pre-determined high and low $V_{dd}$, and develop a routing process using low $V_{dd}$ for non-critical routing to reduce dynamic power. The track-duplicated routing channel has small leakage power and increase the FPGA power reduction to 45.00%.

Power Modeling and Architecture Evaluation for FPGA with Novel Circuits for $V_{dd}$-Programmability.

$V_{dd}$-programmable FPGAs have been proposed recently to reduce FPGA power, where $V_{dd}$ levels can be customized for different circuit elements and unused circuit elements can be power-gated. In this section, we first develop an accurate FPGA power model and then design novel $V_{dd}$-programmable interconnect switches with minimum number of configuration SRAM cells. Applying our power model to place and routed benchmark circuits, we evaluate $V_{dd}$-programmable FPGA architecture using the new switches. The best architecture in our study uses $V_{dd}$-programmable logic blocks and $V_{dd}$-gateable interconnects. Compared to the baseline architecture similar to the leading commercial architecture, the best architecture reduces the minimal energy-delay product by 44.14% with 48% area overhead and 3% SRAM cell increase. Our evaluation results (under these particular test conditions) also show that LUT size 4 always gives the lowest energy consumption while LUT size 7 always leads to the highest performance for all evaluated architectures.

Device and Architecture Co-Optimization for FPGA Power Reduction.

Device optimization considering supply voltage $V_{dd}$ and threshold voltage $V_t$ tuning does not increase chip area but has a great impact on power and performance in the nanometer technology. This section studies the simultaneous evaluation of device and architecture optimization for FPGA. We first develop an efficient yet accurate timing and power evaluation method, called a trace-based model. By collecting trace information from cycle-accurate simulation of placed and routed FPGA benchmark circuits and re-using the trace for different $V_{dd}$ and $V_t$, we enable the device and architecture co-optimization for hundreds of combinations. Compared to the baseline FPGA which has a similar architecture as the commercial FPGA used by Xilinx®, and has $V_{dd}$ suggested by ITRS but $V_t$ optimized by our device optimization, architecture and device co-optimization can reduce energy-delay product by 20.5% without any chip area increase compared to the conventional FPGA architecture. Furthermore, considering power-gating of unused logic blocks and interconnect switches, our co-optimization method reduces energy-delay product by 54.7% and chip area by 8.3%. This portion of the application teaches FPGAs architecture variation and device co-optimization.

Leakage Efficient Chip-Level Dual-$V_{dd}$ Assignment with Time Slack Allocation for FPGA Power Reduction.

To reduce power, $V_{dd}$-programmability has been proposed recently to select $V_{dd}$-levels for interconnects and to power gate unused interconnects. However, $V_{dd}$-level converters used in the $V_{dd}$-programmable method are subject to substantial leakage. In this section, we develop chip-level dual-$V_{dd}$ assignment algorithms to guarantee that no low-$V_{dd}$ interconnect switch drives high-$V_{dd}$ interconnect switches. This removes the need of $V_{dd}$-level converters and reduces interconnect leakage and interconnect device area by 91.78% and 25.48%, respectively. The assignment algorithms include power sensitivity-based heuristics with implicit time slack allocation and a linear programming (LP) based method with explicit time slack allocation. Both methods first allocate time slack to interconnects with higher transition density and assign low-$V_{dd}$ to them for more power reduction. Compared to the aforementioned $V_{dd}$-programmable method using $V_{dd}$-level converters, the LP-based algorithm reduces interconnect power by 65.13% without performance loss for the MCNC benchmark circuits. Compared to the LP-based algorithm, the sensitivity-based heuristics can obtain slightly smaller power reduction but runs 4× faster.

The invention is amenable to being embodied in a number of ways, including but not limited to the following descriptions of embodiments.

One embodiment of the invention provides an apparatus in the form of a field programmable gate array (FPGA) integrated circuit containing an array of gates adapted for being programmed after manufacture for implementing desired electronic functionality, comprising: (a) logic blocks configured for performing combinational or sequential logic operations based on programming of the FPGA in response to one or more logic inputs; (b) programmable routing channels configured for interconnecting the logic blocks for routing input signals to the logic blocks and output signals from the logic blocks based on programming of the FPGA; (c) memory cells within the FPGA for configuring logic block operation and signal routing within the programmable routing channels; and (d) means for operating the logic blocks or switching within the programmable routing channels from a supply voltage $V_{dd}$ selected from multiple discrete supply voltage levels. The means comprises laying out transistors geometries within the specific blocks to operate at different voltage levels, or at either voltage level (for dual $V_{dd}$) and providing converters for shifting from lower voltage referenced signals to higher voltage referenced signals as determined during routing and configuration of the FPGA. In addition, the FPGA may include means for power gating of the logic blocks and switching within the programmable routing channels into an inactive powered-down state in response to a configuration setting in which the logic block or switching is not in use.

One embodiment of the invention provides an integrated circuit field programmable gate array (FPGA) containing an array of gates adapted for being programmed after manufacture for implementing desired electronic functionality, comprising: (a) logic blocks configured for performing combinational or sequential logic operations based on programming of the FPGA in response to one or more logic inputs; (b) the logic blocks are configured for operating at a supply voltage $V_{dd}$ selected from multiple discrete supply voltage levels (which may be fixed to the discrete levels during fabrication or programmed by configuration bits); (c) programmable routing channels configured for interconnecting the logic blocks for routing input signals to the logic blocks and output signals from the logic blocks based on programming of the FPGA; and (d) memory cells within the FPGA for configuring logic block operation and signal routing within the programmable routing channels. The FPGA is configured with logic blocks separated as islands within a routing structure, and the routing channels are formed in the spaces between the logic blocks. The logic blocks are preferably arranged in a row-based or interleaved layout pattern within the routing structure.

In one embodiment, the programmable routing channels comprise: (a) a plurality of wire segments surrounding the logic blocks; (b) a plurality of connection blocks configured for connecting the inputs and outputs of the logic block with the wire segments; and (c) a plurality of switch blocks at the intersection of wire segments for controlling the path of signal routing between sets of wire segments. Circuitry can be included within the connection block or routing switch for selecting one of multiple discrete supply voltage levels as $V_{dd}$ for operating the connection block or routing switch. The routing switch can also include a decoder configured for controlling routing switch state patterns in response to a binary input value. The number of configuration bits needed to set the state of the routing switches is thereby reduced and fewer memory cells are necessary for controlling the state of the routing switch. Power gating circuits are preferably utilized to switch off power to the decoder when the routing switch is not in use.

The FPGA can include power gating circuitry within the connection block for switching off power to any output buffer which is not selected according to the configuration programmed in the memory cells. This aspect of power gating can be implemented without adding memory cells for controlling power gating.

The FPGA can include power gating circuitry within the switch block for switching off power to switching elements within the switch block that are not configured in response to configuration programming within the memory cells for switching signals between the wire segments. This aspect of power gating can also be implemented without the need of additional memory cells.

The programmable routing of the FPGA may include tracks adapted for carrying signals referenced to at least a portion of the multiple discrete supply voltage levels, such as to carrying high $V_{dd}$ signals and low $V_{dd}$ signals. In another embodiment the programmable routing is configured to only route signals referenced to a single supply voltage $V_{dd}$, wherein level translators are employed with the logic blocks which operate from other supply voltages. For example routing is based on high $V_{dd}$ signals ($V_{ddH}$), and low $V_{dd}$ signals ($V_{ddL}$) from the logic blocks are converted before communication over the programmable routing.

The FPGA can optionally include a power supply configured for supplying multiple discrete supply voltage levels. And the power supply can be configured to provide programmable output for one or more voltages within the multi-$V_{dd}$ FPGA, allowing the specific supply levels to be set in response to FPGA configuration, such as that programmed into the memory cells (i.e., SRAM).

In addition to multiple source voltage use within the FPGA, the transistors within the FPGA are optionally configured to use different threshold voltages to limit leakage current and provide additional benefits. The FPGA device being preferably designed to allow circuit routing to take advantage of these threshold variations to reduce power for memory, logic cells and routing. In one embodiment memory cells are configured with higher threshold voltages than the logic blocks of the FPGA, and the transistors output configuration signals are buffered prior to connection to the logic blocks. In one set of embodiments, the voltage threshold levels $V_t$ of transistors within the FPGA are scaled in response to the selection of a $V_{dd}$ level from multiple $V_{dd}$ levels, such as to maintain a constant leakage power across all $V_{dd}$ levels.

Another embodiment of the invention can be generally considered to describe a method of placing and routing application logic within an FPGA fabric having multiple supply voltage levels, $V_{ddx}$, levels, comprising: (a) receiving a net list; (b) assigning critical circuit paths defined within the net list to high supply voltage levels within the FPGA; (c) determining timing slack on non-critical circuit paths defined in the net list; (d) determining power sensitivity of circuit non-critical circuit paths; (e) assigning circuit paths with high power sensitivity and sufficient timing slack to logic blocks operating at a low supply voltage level; (f) updating timing information; (g) reversing assignment to logic blocks operating at a low supply voltage level if delay constraints are not met; and (h) continuing, iteratively, to execute steps (e) through (g) until all circuit paths within the net list have been assigned to blocks and routes within the FPGA.

The routing method provides optimization of assignment that realizes the multiple voltage source advantages, while preventing low $V_{dd}$ referenced signals from driving high $V_{dd}$ referenced signals, and other invalid conditions. The method provides determining output voltages to be generated on the FPGA by a power supply configured for generating at least one of the multiple supply voltage levels toward optimizing the power-performance tradeoff.

One embodiment of the routing method preferably utilizes a trace-based model which collects trace information from cycle-accurate simulations of placed and routed circuits for evaluating power tradeoffs when assigning circuit paths. The trace is reused for evaluating different $V_{dd}$ and $V_t$ combinations without the need to reroute the signals.

Embodiments of the present invention can provide a number of beneficial aspects which can be implemented either separately or in any desired combination without departing from the present teachings.

Described within the application are a number of inventive aspects, including but not necessarily limited to the following.

An aspect of the invention is to provide FPGA circuits and method of implementing FPGA circuits which are configured for operation at lower power levels than conventional devices.

Another aspect of the invention is to provide FPGA circuits which consume on the order of ½ of the power required by conventional FPGA devices.

Another aspect of the invention is to provide interconnect power minimization within Field Programmable Gate Arrays.

Another aspect of the invention is to provide an FPGA circuit which operates within a fully $V_{dd}$ programmable FPGA fabric.

Another aspect of the invention is to provide the FPGA fabric with programmable dual-$V_{dd}$ for both logic blocks and interconnects.

Another aspect of the invention is to provide a dual-$V_{dd}$ architecture which enables power-gating to reduce leakage in abundant unused interconnect components, which are required for allowing interconnect programmability.

Another aspect of the invention is to provide FPGA circuitry which can be implemented even at smaller device geometries, such as at 100 nm technology.

Another aspect of the invention is to provide FPGA circuitry using dual-$V_{dd}$ (or multiple $V_{dd}$ having more than two power states) in which the fabric is fully configurable and wherein placement is not compromised by pre-defined placement of the dual-$V_{dd}$ elements.

Another aspect of the invention is to provide FPGA circuitry with logic blocks having selectable H or L performance in response to selection of power-selection switches.

Another aspect of the invention is to provide FPGA circuitry in which logic blocks can be selectively powered down when unneeded.

Another aspect of the invention is providing FPGA power control circuitry configured for switching the power off in response to boosted gate voltages toward reducing leakage currents, such as on the order of two orders of magnitude.

Another aspect of the invention is providing FPGA circuitry with power control circuits implemented on a block level, such as two power switches per log block.

Another aspect of the invention is to provide an FPGA dual-$V_{dd}$ architecture in which dual a first $V_{dd}$ level is used in the routing, and the second $V_{dd}$ from logic blocks is converted to first $V_{dd}$ levels when necessary.

Another aspect of the invention is to provide an FPGA dual-$V_{dd}$ implementation in which high $V_{dd}$ voltage is routed between blocks and blocks configured with low $V_{dd}$ are converted to high $V_{dd}$, therein not subjecting the high voltage, higher speed, blocks to conversion delays.

Another aspect of the invention is to provide an FPGA circuit using power control blocks (P-blocks) are implemented with low voltage log blocks (L-blocks) and high voltage logic blocks (H-blocks) which are interleaved in a desired pattern according to a ratio suitable for the given application.

Another aspect of the invention is an FPGA architecture in which the pattern of L, H and P blocks follows an interleaved layout pattern, having a constituent repeating row pattern.

Another aspect of the invention is an FPGA architecture in which the pattern of interleaved pattern of L, H and P blocks are configured according to a fixed ratio as an architectural parameter, such as H/L/P block ratio of 1/1/2 and a sequence length of four blocks.

Another aspect of the invention is a "sensitivity" method of implementing designs using the inventive dual-$V_{dd}$ FPGAs.

Another aspect of the invention is to provide scaling of threshold voltages in response to the voltage levels applied, for example implementing dual-$V_t$ for the dual-$V_{dd}$ system.

Another aspect of the invention is to provide combination multi-$V_{dd}$ and multi-$V_t$ FPGA fabrics to reduce power consumption.

Another aspect of the invention is a method of designing circuits using multi-$V_{dd}$ and/or multi-$V_t$ FPGA fabrics for voltage assignment and block placement to optimize performance.

Another aspect of the invention is a method of performing voltage assignment within dual-$V_{dd}$/dual-$V_t$ FPGAs.

Another aspect of the invention is a method of performing simulated-annealing based placement within dual-$V_{dd}$/dual-$V_t$ FPGAs.

Another aspect of the invention is to provide a constant-leakage $V_{dd}$ scaling method, wherein $V_t$ is adjusted for each $V_{dd}$ level to maintain an almost constant leakage power across all $V_{dd}$ levels.

Another aspect of the invention is to provide an FPGA architecture in which the look-up table (LUT) operates with multiple thresholds $V_t$, the device referred to herein as a "LUT-SVDT".

Another aspect of the invention is to provide an FPGA architecture in which the $V_t$ of SRAM cells within the (LUT) are substantially increased, such as a factor of approximately fifteen.

Another aspect of the invention is to provide FPGA circuits incorporating asynchronous level converters, such as with a single supply voltage.

Another aspect of the invention is to provide FPGA fabrics having cluster-based logic blocks and island-style routing structures.

Another aspect of the invention is to provide FPGA fabric architectures: arch-SVST, arch-SVDT, arch-DVDT; which utilize the variations of $V_{dd}$ and $V_t$.

Another aspect of the invention is to provide FPGA fabrics with arch-SVST, arch-SVDT, arch-DVDT architectures having layout patterns according to the invention, such as row-based patterns and interleaved layout patterns.

Another aspect of the invention is a method of performing computer aided circuit design using dual-$V_{dd}$ and dual-$V_t$ circuitry according to the invention.

Another aspect of the invention is to provide apparatus and methods for power gating of unused circuits within an FPGA.

Another aspect of the invention is to provide a dual-voltage FPGA architecture having a routing tree which is not subject to multiple voltage levels, wherein the same voltage level is used for an entire routing tree.

Another aspect of the invention is to provide routing of High $V_{dd}$ voltage, with converters only necessary for the output of Low $V_{dd}$ blocks.

Another aspect of the invention is to provide FPGA interconnects configured for utilizing pre-defined high power and low power patterns with extra tracks to reduce dynamic power.

Another aspect of the invention is to provide power gating of unused circuit elements to reduce leakage and total dissipation.

Another aspect of the invention is to provide a low area overhead approach to power gating of unused circuit elements.

Another aspect of the invention is to provide power gating without the need of additional memory cells for controlling routing switches and connection switches.

Another aspect of the invention is to provide power gating in which the programmable circuit elements are moved from the output of any circuit cell to the power supply path of this cell, wherein design is subject to negligible area overhead for unused cells.

Another aspect of the invention is to provide enhancements to all device, circuit innovation, architecture innovation, CAD algorithms, and systems which apply to FPGAs with different programming mechanisms or memory units, such as SRAM, fuse, anti-fuse, FLASH memory, or other techniques known in the art.

Another aspect of the invention is to provide an FPGA architecture using pre-defined high power and low power patterns with extra tracks to reduce dynamic power.

Another aspect of the invention is to provide reduced levels of interconnect dynamic power by using the surplus timing slack within the dual-$V_{dd}$ FPGA fabric.

Another aspect of the invention is to provide an FPGA with a routing channel containing abundant or duplicated routing tracks, preferably with pre-determined high and low $V_{dd}$.

Another aspect of the invention is to provide a dual-$V_{dd}$ routing algorithm using low $V_{dd}$ for non-critical routing to reduce interconnect dynamic power.

Another aspect of the invention is to provide novel $V_{dd}$-programmable and $V_{dd}$-gateable interconnect switches with reduced number of memory cells in relation to conventional FPGAs.

Another aspect of the invention is to provide $V_{dd}$-programmable FPGA architectures.

Another aspect of the invention is to provide a Class 1 $V_{dd}$-FPGA architecture in which $V_{dd}$-programmability applies to logic blocks and interconnects with programmable $V_{dd}$-level converters before each interconnect switch.

Another aspect of the invention is to provide a Class 2 $V_{dd}$-FPGA architecture in which $V_{dd}$-programmability applies to logic blocks and $V_{dd}$-gateable interconnects.

Another aspect of the invention is to provide a Class 3 $V_{dd}$-FPGA architecture which is similar to Class 1, yet without $V_{dd}$-level converts in the routing channels.

Another aspect of the invention is to provide for simultaneously tuning both device and architectural FPGA parameters, and optionally other device parameters, such as body bias, Tox, transistor channel length, and so forth.

Another aspect of the invention is to provide for optimizing LUT sizes, cluster sizes, routing architectures, switch architectures and so forth.

Another aspect of the invention is to provide a trace-based method of FPGA power modeling.

Another aspect of the invention is to provide a system and method of creating FPGAs with a heterogeneous $V_t$ for logic and interconnect.

Another aspect of the invention is to provide a system and method of creating FPGAs with a $V_t$ optimization for chip-level voltage scaling.

Another aspect of the invention is to provide device and architecture co-optimization toward significantly reducing the energy-delay product.

Another aspect of the invention is to provide a method of performing chip-level $V_{dd}$ assignment which guarantees that no low-$V_{dd}$ interconnect switches drive high-$V_{dd}$ interconnect switches.

A still further aspect of the invention is to provide methods for developing and assignment of FPGA resources to reduce power consumption while maximizing resources.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 10 is pseudo-code for implementing a method of sensitivity-based dual-$V_{dd}$ assignment according to an aspect of the present invention.

FIG. 47 is a graph of Hyper-arches according to an aspect of the present invention shown under different device setting.

FIG. 48 is pseudo-code of segment-based heuristics according to an aspect of the present invention.

FIG. 49A-49D are schematic representations of estimating the number of $V_{ddL}$ switches according to an aspect of the present invention.

DETAILED DESCRIPTION OF THE INVENTION

Referring more specifically to the drawings, for illustrative purposes the present invention is embodied in the apparatus generally shown in FIG. 2 through FIG. 49D. It will be appreciated that the apparatus may vary as to configuration and as to details of the parts, and that the method may vary as to the specific steps and sequence, without departing from the basic concepts as disclosed herein.

1. Low-Power FPGA Using Pre-Defined Dual-$V_{dd}$/Dual-$V_t$ Fabrics.

Unique challenges exist in lowering device power dissipation by incorporating multi-$V_{dd}$/multi-$V_t$ techniques. First, leakage power becomes a large portion of the total FPGA power in 100 nm technology and below. One reason for the leakage is attributable to the large number of SRAM cells required within LUT-based FPGAs to provide programmability. Therefore, it is important to design FPGA circuits using dual-$V_{dd}$/dual-$V_t$ without increasing the leakage power budget. Second, FPGAs do not have the freedom of using mask patterns to arrange different $V_{dd}$/$V_t$ components in a flexible way as do ASICs. Multi-$V_{dd}$/multi-$V_t$ fabric and layout pattern must be pre-defined in FPGAs for a set of applications. In some cases this can limit the power reduction available using multi-$V_{dd}$/multi-$V_t$ techniques.

The description commences with describing and studying an FPGA fabric configured with dual-$V_{dd}$ and dual-$V_t$. FPGA circuits are taught herein with dual-$V_{dd}$/dual-$V_t$ to effectively reduce dynamic and leakage power. According to the profiling of benchmark circuits, we propose FPGA fabrics employing dual-$V_{dd}$/dual-$V_t$ techniques. To leverage the new fabrics, we develop new CAD algorithms including power-sensitivity-based voltage assignment and simulated-annealing based placement.

FPGAs consist of logic blocks and programmable routing channels. Detailed circuit designs for dynamic and leakage power reduction are first presented, and then predefined dual-$V_{dd}$/dual-$V_t$ FPGA fabrics are discussed in this section. Lookup table (LUT) based FPGAs and the island style routing are assumed for this section.

Figure 1:
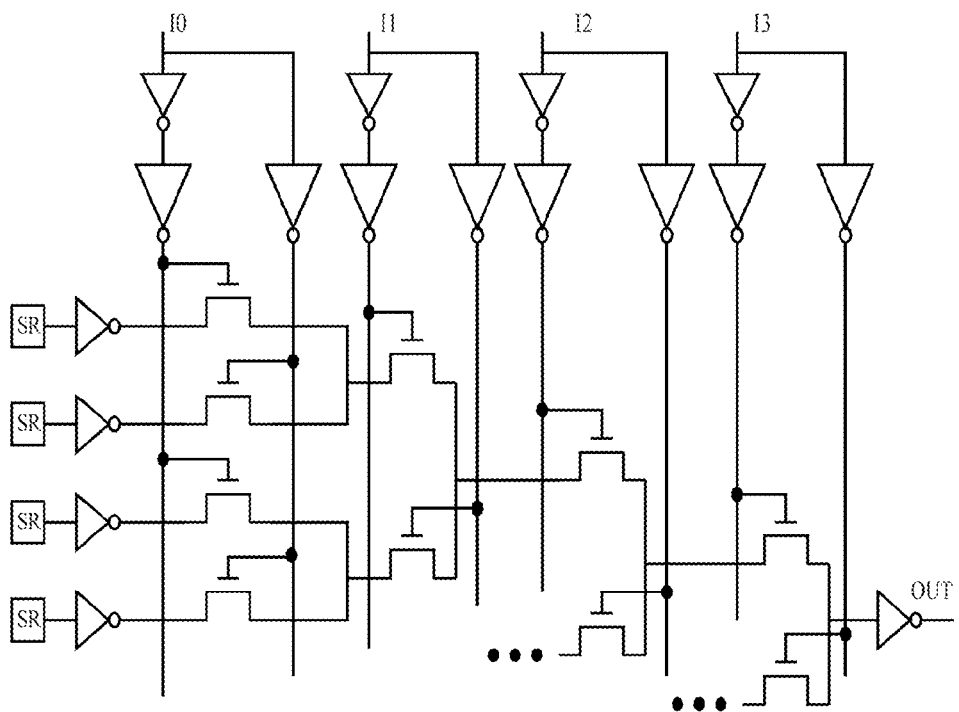
FIG. 1 is a schematic of a conventional 4-LUT using single $V_{dd}$ and single $V_t$ (LUT-SVST).

When dual-$V_{dd}$ is applied at LUT or logic block levels for this embodiment, we utilize a single $V_{dd}$ inside the LUT. FIG. 1 shows part of a 4-LUT circuit using single $V_{dd}$ and single $V_t$. It consists of SRAM cells and a MUX tree. The SRAM cells in the LUT can be programmed to implement any four-input logic function. Herein we name LUTs using single $V_{dd}$ and single $V_t$ as "LUT-SVST". The $V_{dd}$ scaling of LUT-SVST is effective to reduce dynamic power because dynamic power is quadratically proportional to the supply voltage. However, aggressive $V_{dd}$ scaling can introduce a large delay penalties. It is important to decide appropriate $V_t$ corresponding to the $V_{dd}$ level for optimum power-delay trade-offs.

Figure 2:
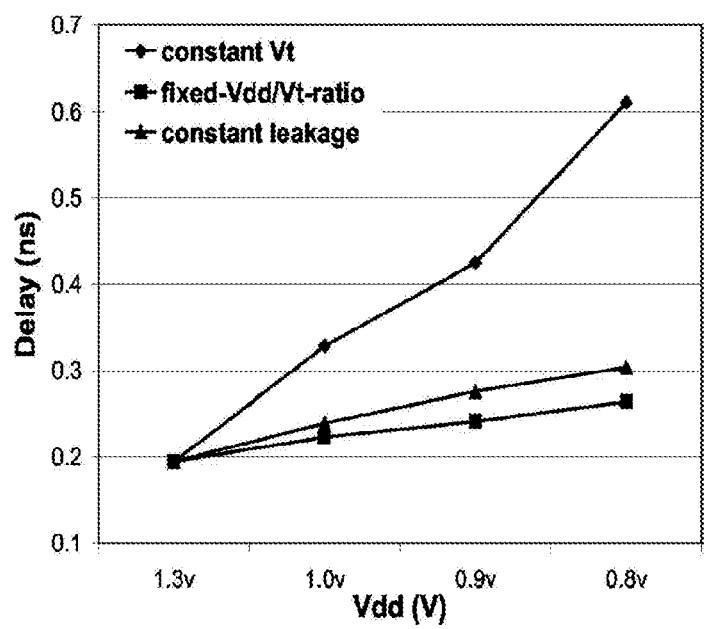
FIG. 2 is a graph of delay versus different $V_{dd}$ scaling schemes for a 4-input LUT (4-LUT).

FIG. 2 shows the delay increase of a 4-LUT in 100 nm technology during $V_{dd}$ scaling. Three different $V_{dd}$ scaling schemes are presented in the figure. The constant-$V_t$ scheme scales down $V_{dd}$ without changing the threshold voltage $V_t$. It is clear that the LUT delay at the lowest $V_{dd}$ (0.8 v) in our study is 3× larger than that at the highest $V_{dd}$ (1.3 v). To compensate for the large delay penalty at low $V_{dd}$, we scale down the threshold voltage $V_t$ accordingly as the $V_{dd}$ scales down. The scaling scheme preferably uses a fixed-$V_{dd}$/$V_t$-ratio. FIG. 2 shows that the technique increases the LUT delay by only 40% at the lowest $V_{dd}$ level. Although fixed-$V_{dd}$/$V_t$-ratio is promising to alleviate delay penalty compared to constant-$V_t$, leakage power increases greatly in this scaling scheme; because the leakage current increases exponentially when $V_t$ reduces.

Figure 3:
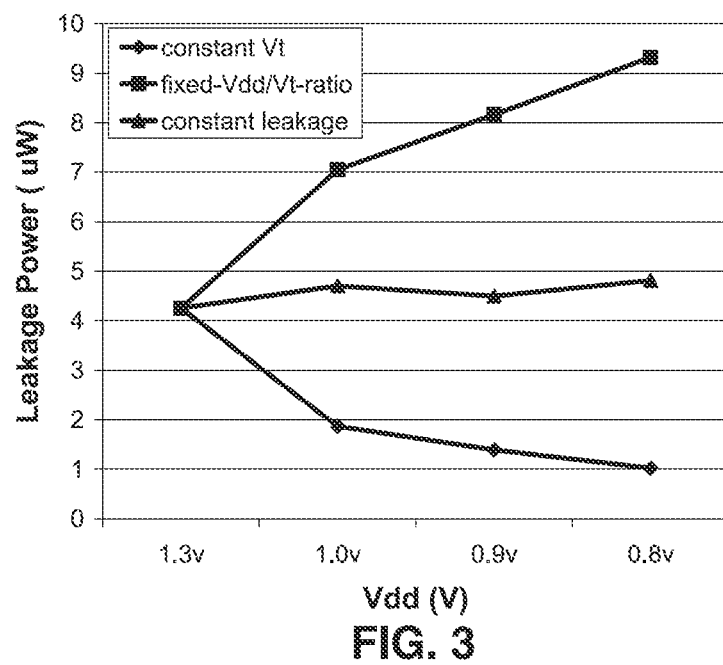
FIG. 3 is a graph of leakage power (at 100° C.) plotted for different $V_{dd}$ scaling schemes for a 4-LUT.

FIG. 3 illustrates that the leakage power for a 4-LUT almost doubles at the lowest $V_{dd}$ (0.8 v) in fixed-$V_{dd}$/$V_t$-ratio scaling even though the $V_{dd}$ level is reduced. Since leakage power has already been found to comprise a large portion of total FPGA power in nanometer technology, FPGA designs cannot afford the increasing leakage power by the fixed-$V_{dd}$/$V_t$-ratio scaling scheme. Based on the above two $V_{dd}$ scaling schemes, we propose the constant-leakage $V_{dd}$ scaling scheme. For each $V_{dd}$ level, we adjust the threshold voltage to maintain an almost constant leakage power across all the $V_{dd}$ levels, referring back to FIG. 3. In FIG. 2, we showed that a constant-leakage scaling scheme also limits the delay penalty almost as effectively as the fixed-$V_{dd}$/$V_t$-ratio scaling scheme. Therefore, constant leakage scaling achieves much better power-delay trade-off at circuit level compared to the other two scaling schemes. Table 1 summarizes our $V_{dd}$/$V_t$ combination used in the constant-leakage scaling scheme in the ITRS 100 nm technology.

Although we only use a single $V_{dd}$ inside a LUT, we still can apply dual-$V_t$ to a LUT. We design low-leakage LUTs with single $V_{dd}$ and dual-$V_t$ (named as LUT-SVDT).

Figure 4:
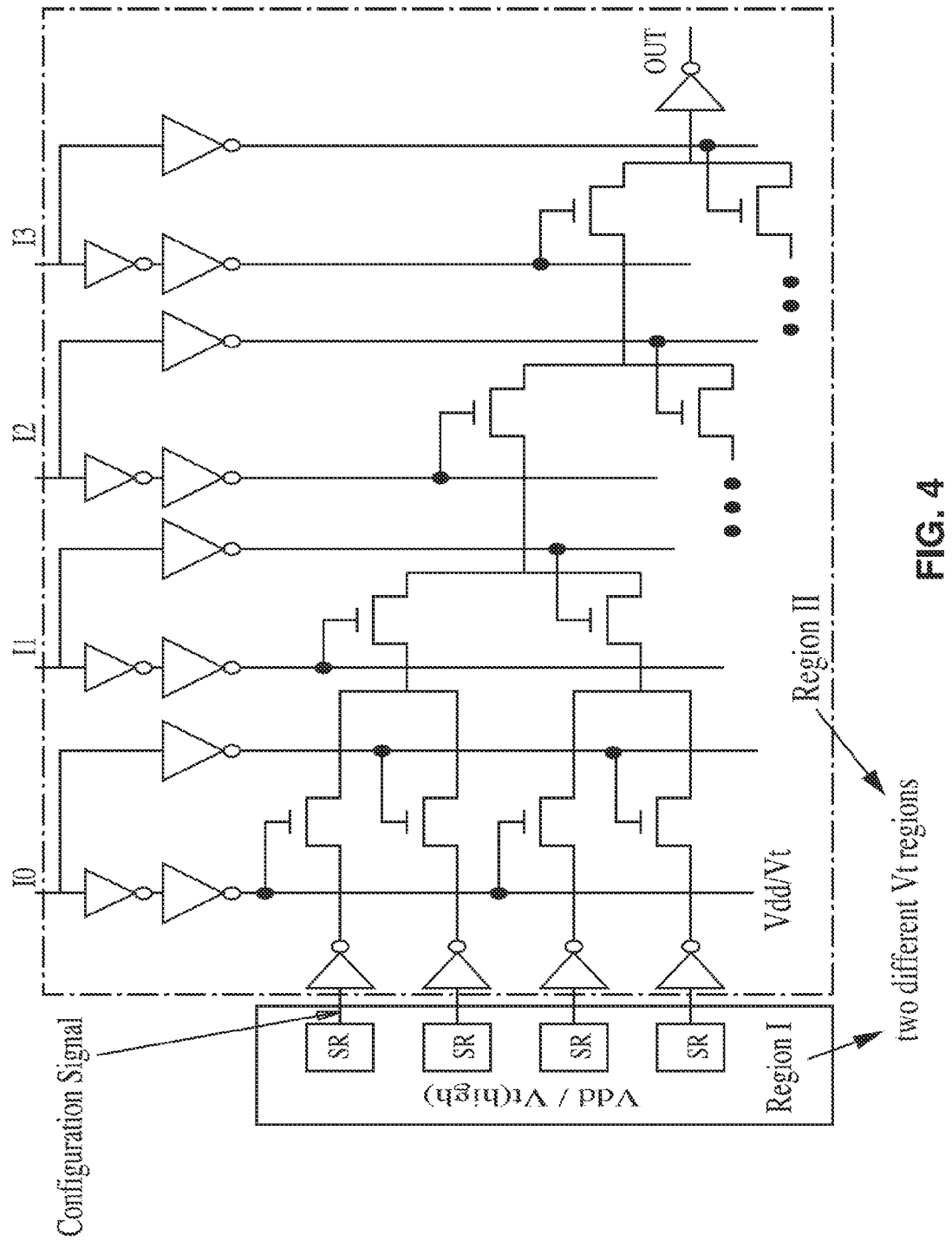
FIG. 4 is a schematic of a 4-LUT using single $V_{dd}$ and dual-$V_t$ (LUT-SVDT) according to an aspect of the present invention.

FIG. 4 illustrates by way of example embodiment a LUT-SVDT schematic. The entire LUT is shown partitioned into two different regions. All the SRAM cells belong to region I and provide the configuration signal for the LUT. The remaining portion, MUX-tree and input buffers, becomes region II. Note that the two regions are DC disconnected due to the inverters at the output of the SRAM cells. The content of the SRAM cells does not change after the LUT is configured and the SRAM cells always stay in the read status. Therefore, the threshold voltage of region I can be increased to reduce leakage power without introducing runtime delay penalty. Values $V_{dd}$ and $V_t$ are determined in a LUT-SVDT as follows. For region II, the $V_{dd}/V_t$ combination is decided by a constant-leakage $V_{dd}$ scaling scheme. For region I, the same $V_{dd}$ as region II is used but $V_t$ is increased.

Figure 5:
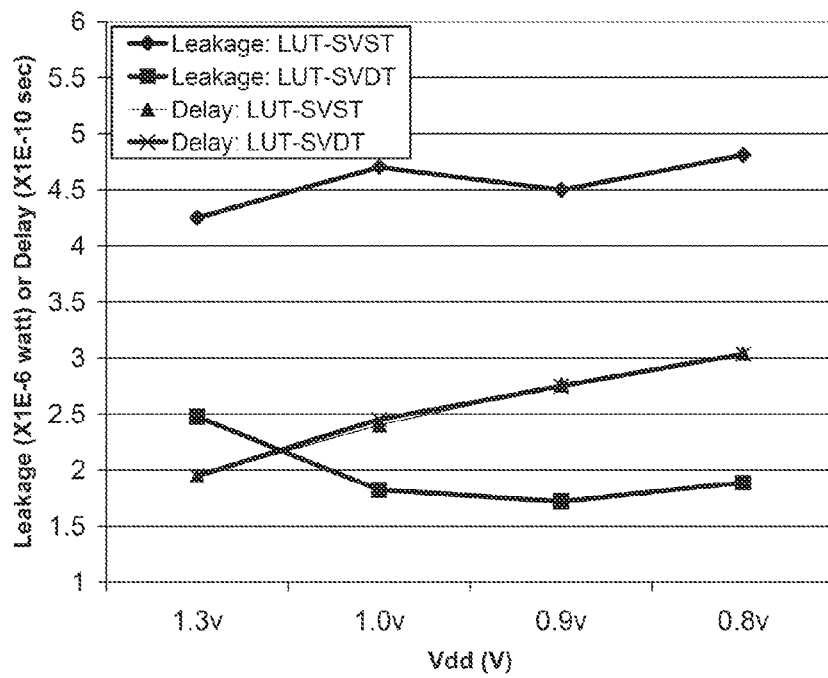
FIG. 5 is a graph of delay and power comparison between LUT-SVST and LUT-SVDT in the ITRS 100 nm technology, according to an aspect of the present invention, showing that there is virtually no delay difference between LUT-SVST and LUT-SVDT.

FIG. 5 compares the delay and leakage power between LUT-SVST and LUT-SVDT. LUT-SVDT obtained an average 2.4×LUT leakage reduction compared to LUT-SVST at different $V_{dd}$ levels. The delay of LUT-SVDT is almost identical to that of LUT-SVST. Considering the increasingly large portion of leakage power in FPGAs under 100 nm technology, LUT-SVDT is an effective design technique to reduce leakage for logic blocks. The high-$V_t$ low-leakage SRAM cells can be used for programmability of both interconnects and logic blocks. Ideally, $V_t$ can be increased as high as possible to achieve maximal leakage reduction without delay penalty. However, an extremely high $V_t$ increases the SRAM write access time and slows down the FPGA configuration speed. The $V_t$ of SRAM cells for 15×SRAM leakage reduction was increased and it increased the configuration time by only 13%.

For a dual-$V_{dd}$ FPGA fabric, the interface between a $V_{ddL}$ device and a $V_{ddH}$ device must be designed carefully to avoid excessive leakage power. If a $V_{ddL}$ device drives a $V_{ddH}$ device and the $V_{ddL}$ device output is logic '1', both PMOS and NMOS transistors in the $V_{ddH}$ device will be at least partially "on", dissipating unacceptable amounts of leakage power due to short circuit current. A level converter should therefore be inserted to block the short circuit current. It should be noted, however, that a $V_{ddH}$ device can drive a $V_{ddL}$ device without generating excessive leakage power. The level converter converts the $V_{ddL}$ signal swing to a $V_{ddH}$ signal swing.

Figure 6:
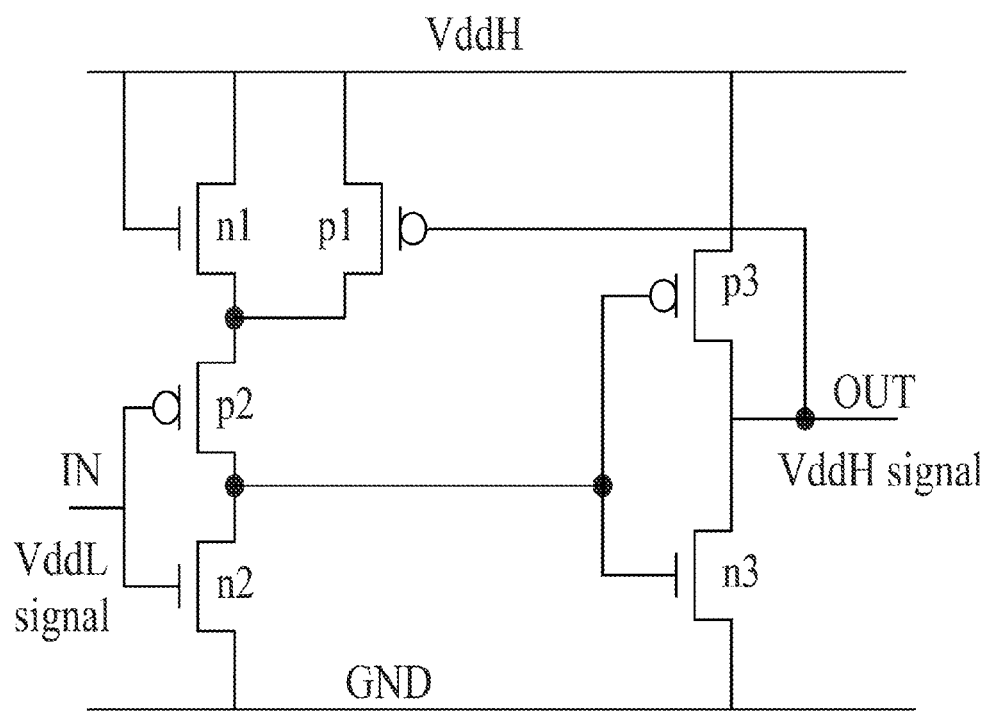
FIG. 6 is a schematic of a conventional level converter circuit with single supply voltage.

FIG. 6 illustrates an asynchronous level converter circuit shown with a single supply voltage which is utilized in this section. As shown in FIG. 6, when the input signal is logic '1', the threshold voltage drop across NMOS transistor 'n1' can provide a virtual low supply voltage to the first-stage inverter (p2,n2) so that p2 and n2 will not be partially "on". When the input signal is logic '0', the feedback path from node 'OUT' to PMOS transistor 'p1' pulls up the virtual supply voltage to $V_{ddH}$ and inverter (p2, n2) generates a $V_{ddH}$ signal to the second inverter so that no DC short circuit current exists. For a particular $V_{ddH}/V_{ddL}$ combination, we decide the transistor size in the level converter as follows. We start from a level converter with minimum transistor sizes. We size up the transistors to limit the level converter delay within 30% of a single LUT delay or 7% of a logic cluster delay. For transistor sizes that meet the delay bound, we choose the sizing with the lowest power consumption. Table 2 shows the delay and leakage power of the sized level converters used in this section. Note that the leakage power increases as the voltage difference between $V_{ddH}$ and $V_{ddL}$ increases. This is because the threshold voltage drop cannot provide a proper virtual low-supply as the gap between $V_{ddH}$ and $V_{ddL}$ is large. Therefore, the $V_{ddH}/V_{ddL}$ ratio should not be too large considering the leakage overhead of level converters.

Traditional FPGA fabrics largely use uniform $V_{dd}$ and $V_t$, but only provide limited power performance trade-off. To further increase power efficiency, we design dual-$V_{dd}$/dual-$V_t$ fabrics based on traditional uniform FPGA fabrics with cluster-based logic blocks and island-style routing structures. Dual-$V_t$ is applied to configuration SRAM cells in both logic blocks and programmable interconnects. We limit our self in this section to only applying dual-$V_{dd}$ to logic blocks, the advantages of dual-$V_{dd}$ routing fabric will be described subsequently.

Figure 7:
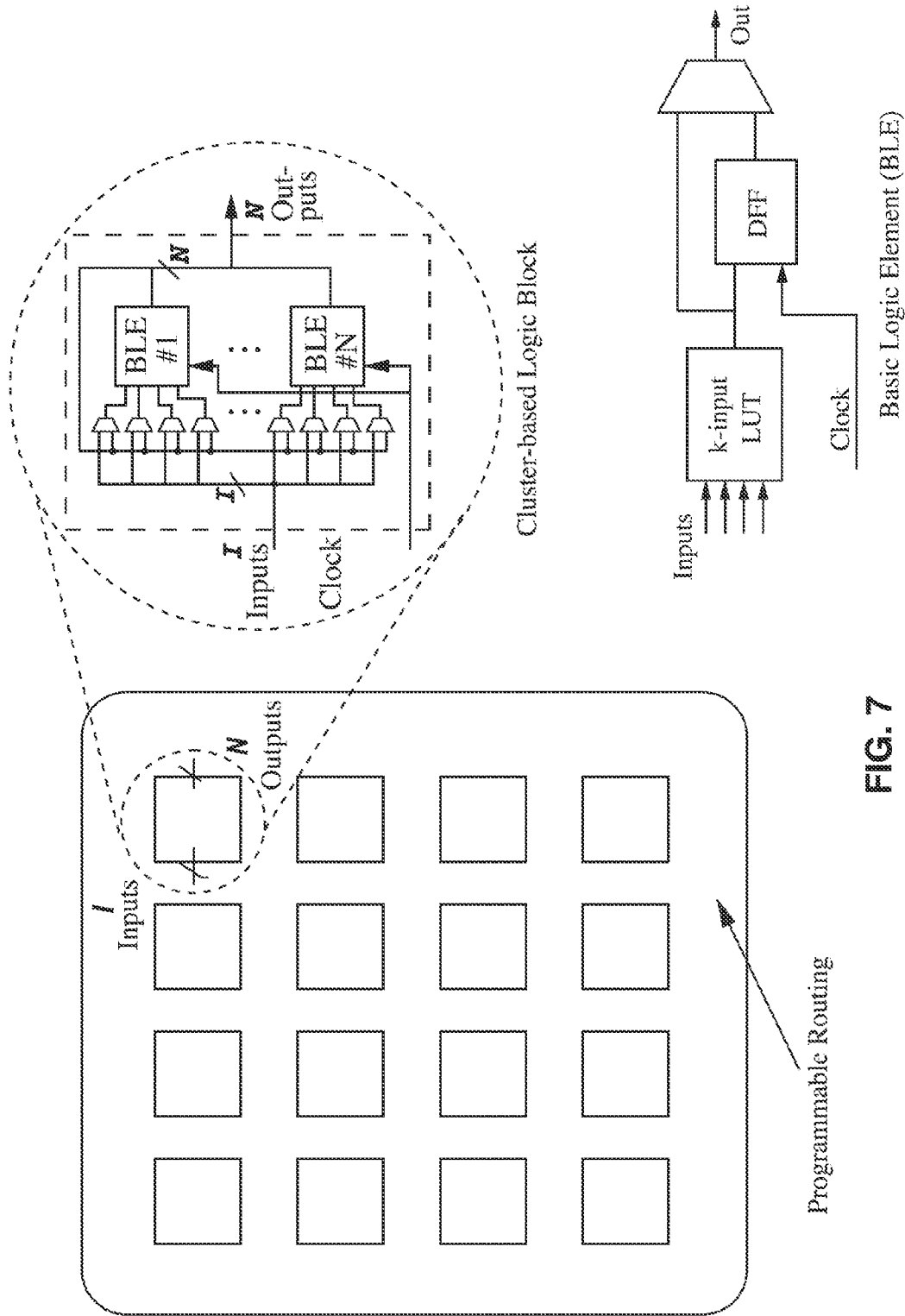
FIG. 7 is a schematic of an FPGA with cluster-based logic blocks and island style routing structures, showing the island pattern at right, with a logic block shown in the upper left comprising basic logic elements which are shown in the lower left.

FIG. 7 shows a generic FPGA fabric with cluster-based logic blocks and island style connection topology showing routing structures. By way of example the Basic Logic Element (BLE) consists of one Lookup Table (LUT) and one flip-flop. A set of fully connected BLEs become a logic block or cluster. The number of BLEs is the logic block size. The logic blocks are embedded into the programmable routing resources. When all the logic blocks and routing resources use the same $V_{dd}$ and $V_t$, a traditional FPGA fabric is created with uniform $V_{dd}$ and $V_t$ and is referred to herein as Single-$V_{dd}$ Single-$V_t$ fabric (arch-SVST), which provides a baseline for assessing the benefits provided by the numerous beneficial aspects of the present invention. The $V_{dd}/V_t$ ratio is determined by the constant leakage $V_{dd}$ scaling discussed in an earlier section and the lookup tables in the logic blocks are LUT-SVST. To provide a number of benefits over the arch-SVST architecture, we have designed another FPGA fabric referred to as "arch-SVDT", which uses LUT SVDT and low-leakage SRAM cells presented in a prior section. The arch-SVDT uses low-leakage SRAM cells for both LUTs and interconnects which distinguishes it from arch-SVST. The above two fabrics both use a single $V_{dd}$ in the entire FPGA chip.

To design a dual-$V_{dd}$ FPGA fabric, we need to determine: (i) the granularity to apply dual-$V_{dd}$, and (ii) the layout pattern to be formed by the physical locations of devices using dual-$V_{dd}$. The new fabric with dual-$V_{dd}$ and dual-$V_t$ is referred to "arch-DVDT". It uses low-leakage SRAM cells for all LUTs and interconnects, and employs one single $V_{dd}$ inside one logic block. However, logic blocks across the FPGA chip can have different supply voltages. The physical locations of these logic blocks define a dual-$V_{dd}$ layout pattern.

Figure 8A:
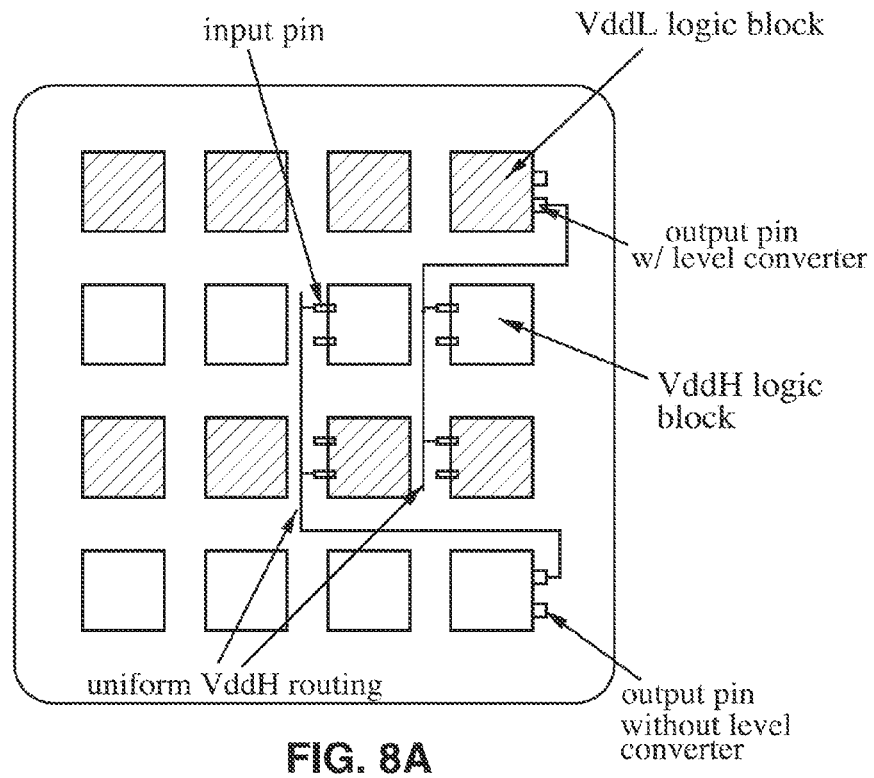
FIG. 8A-8B are connection topologies of island style routing with pre-designed dual-$V_{dd}$ layout patterns for a dual-$V_{dd}$ logic block fabric according to an aspect of the present invention.
Figure 8B:
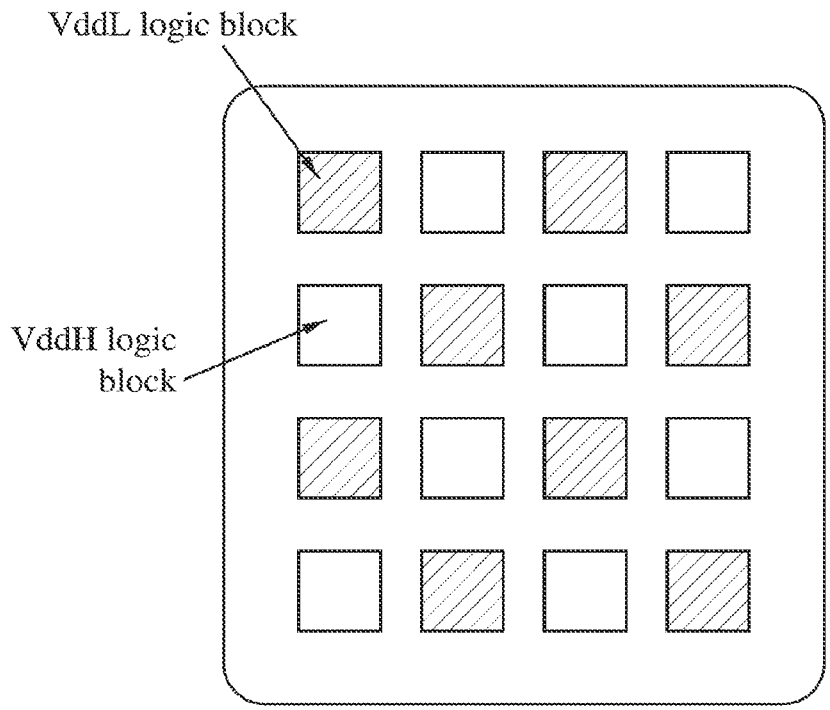

FIGS. 8A, 8B shows topology with two possible layout patterns. A first layout pattern is the row-based pattern (FIG. 8A), such as with a ratio of $V_{ddL}$-row/$V_{ddH}$-row as 1:1. Another pattern is the interleaved layout pattern (FIG. 8B), such as with a ratio of $V_{ddL}$-block/$V_{ddH}$-block as 1:1. In general, the ratio of $V_{ddL}$-row/$V_{ddH}$-row or of $V_{ddL}$-block/$V_{ddH}$-block is an architectural parameter and is determined experimentally in this section. Note that the routing resources in arch-DVDT uses uniform $V_{ddH}$.

FIG. 8A also shows example routing paths connecting logic blocks with different supply voltages. The output signals from a $V_{ddL}$ logic block must go through level converters before entering the routing channels. If the $V_{ddL}$ logic block size is N, that is to say it has N output pins, we need N level converters at output pins. On the other hand, $V_{ddH}$ logic blocks do not need any level converters. The signal in the uniform $V_{ddH}$ routing finally reaches another logic block, which can be either $V_{ddH}$ or $V_{ddL}$. In either case, no level converters are needed at the input pins of a logic block. The three FPGA fabrics are summarized in Table 3.

Figure 9:
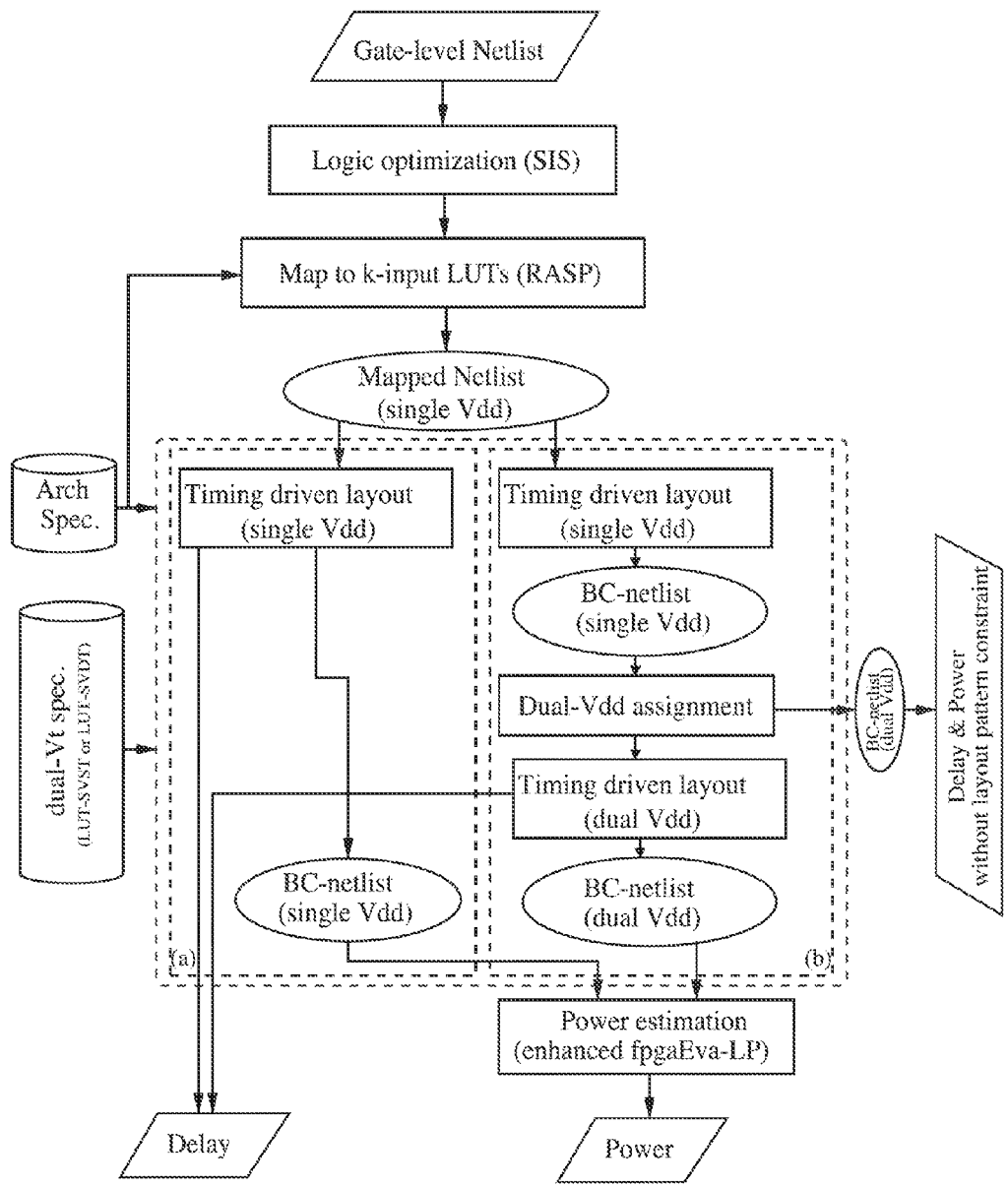
FIG. 9 is a design flow diagram for dual-$V_{dd}$/dual-$V_t$ FPGAs according to an aspect of the present invention.

FIG. 9 illustrates a design flow diagram for an arch-DVDT architecture. The following describes the design flow for dual-$V_{ddL}$/dual-$V_t$ FPGAS. It should be appreciated that CAD algorithms are needed to leverage the proposed FPGA fabrics with dual-$V_{dd}$ and dual-$V_t$. The figure presents an example of our low-power design process. The input data is a single-$V_{dd}$ gate-level net list and it is optimized by using SIS, described in a paper by E. M. Sentovich et al. entitled "SIS: A system for sequential circuit synthesis" from the Department of Electrical Engineering and Computer Science, University of California at Berkeley. The SIS is mapped to LUTs by using RASP, described in later section of the application. We then start the physical design as shown in the large dotted box in FIG. 9. After performing the physical design, we generate the basic circuit net list (BC-net list), such as extended from net lists previously described by the author. The BC-net list is annotated with capacitance, resistance as well as supply voltage levels if dual-$V_{dd}$ is applied. We perform power estimation and timing analysis on the BC-net lists to obtain the power and performance. An enhanced version of FPGA Eva-LP is developed to handle dual-$V_{dd}$/dual-$V_t$ FPGA power estimation.

One embodiment of our physical design flow has two parallel design paths. One is the traditional FPGA physical design flow labeled as section (a) in FIG. 9. Timing-driven packing, placement and routing are carried out for a single-$V_{dd}$ net list by using VPR, which is described in "Architecture and CAD for deep-submicron FPGAs" by A Marquardt et al. and published by Kluwer Academic Publishers. Note that this design path can also handle our new fabric arch-SVDT presented in Table 3, as the principle difference between arch-SVST and arch-SVDT is that arch-SVDT uses low-leakage SRAM cells with higher $V_t$. At the logic block level, it can still be viewed as a uniform fabric and traditional design flow can be readily applied.

Another design path is proposed for dual-$V_{dd}$ FPGA fabric such as arch-DVDT. After the generation of single-$V_{dd}$ BC-net list, two extra steps are needed: dual-$V_{dd}$ assignment and timing driven layout for dual-$V_{dd}$ fabric.

The following describes dual-$V_{dd}$ assignment. The dual-$V_{dd}$ assignment determines the $V_{dd}$ level for each logic block in the mapped net list. It makes use of the surplus timing slack in a circuit and performs power optimization using dual-$V_{dd}$. Sensitivity-based optimization algorithms have been used in ASIC circuit tuning either for delay optimization or for power-delay trade-off. The present invention creates a somewhat similar sensitivity-based algorithm for dual-$V_{dd}$ assignment. First, we define the power sensitivity given by the following.

Definition 1 (Power Sensitivity $S_x$).

For a given design variable x, power sensitivity is calculated as:

$$S_x = \frac{\Delta P}{\Delta x} = \frac{\Delta P_{sw}}{\Delta x} + \frac{\Delta P_{lkg}}{\Delta x}$$

In which $P_{sw}$ is the switching power and $P_{lkg}$ is the leakage power. In our dual-$V_{dd}$ assignment problem, the design variable x becomes supply voltage $V_{dd}$. To calculate the power sensitivity, we need the relationship between power and supply voltage. The switching power $P_{sw}$ of a primitive node i in the BC net list is calculated as follows.

$$P_{sw}(i) = 0.5 f \cdot \hat{E}_i \cdot C_i \cdot V_{dd}^2 \quad (1)$$

In the above relation f is the clock frequency, $\hat{E}_i$ is the effective transition density considering glitches and $C_i$ is the load capacitance. The leakage power $P_{lkg}$ of node i is calculated as follows.

$$P_{lkg}(i) = I_{lkg}(V_{dd}) \cdot V_{dd} \quad (2)$$

In the equation above $I_{lkg}$ is the leakage current at supply voltage $V_{dd}$. The power sensitivity of a logic block B can be calculated as the sum of sensitivities for all the nodes inside this logic block, such as given by the following relation.

$$S_x(B) = \sum_{node\ i \in B} S_x(B) \quad (3)$$

FIG. 10 presents an embodiment of our dual-$V_{dd}$ assignment algorithm which includes a greedy algorithm with an iteration loop. Given the single-$V_{dd}$ BC-net list, we analyze the timing and obtain the circuit path with the largest timing slack. Power sensitivity is calculated for logic blocks on this path but not on the critical path, which is preferably routed first. The logic block with the largest power sensitivity is selected and assigned a low $V_{dd}$, and the timing information updated. If the new critical path delay exceeds the user-specified delay increase bound, we reverse the low-$V_{dd}$ assignment. Otherwise, we keep this assignment and go to the next iteration. In either case, the logic block selected in this iteration will not be re-visited in other iterations. Subsequent to the dual-$V_{dd}$ assignment, we can estimate the power and delay for the dual-$V_{dd}$ BC-net list as shown in FIG. 9. However, this dual-$V_{dd}$ BC-net list does not consider the layout constraint imposed by the pre-designed dual-$V_{dd}$ pattern. It assumes the flexibility to assign low-$V_{dd}$ to a logic block at arbitrary physical location. This is considered the ideal case for fabric arch-DVDT. To obtain the real case power and delay considering the layout pattern constraint, we use this dual-$V_{dd}$ net list as an input and perform dual-$V_{dd}$ placement and routing.

Figure 11:
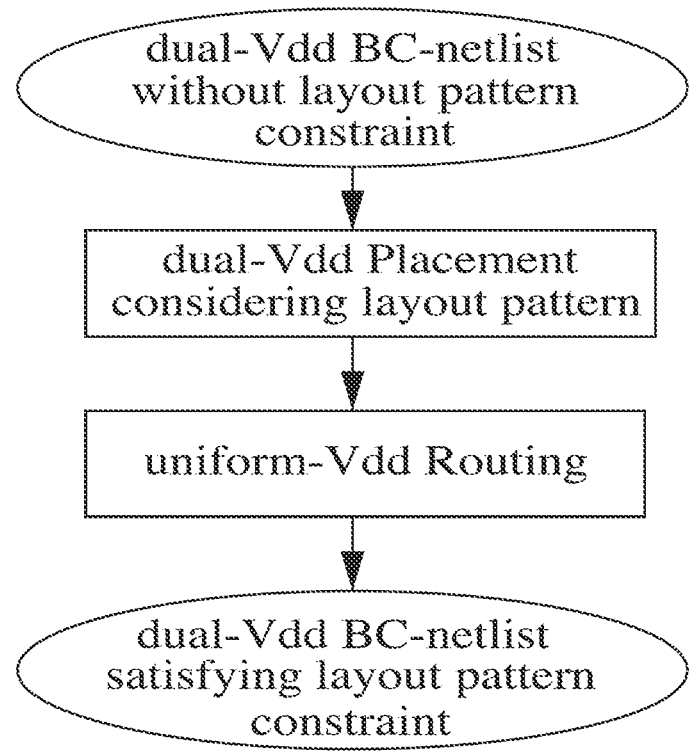
FIG. 11 is a design flow diagram for the placement and routing for dual-$V_{dd}$ fabric arch-DVDT according to an aspect of the present invention.

FIG. 11 describes placement and routing for Dual-$V_{dd}$ FPGA fabric according to our invention. The input data is the dual-$V_{dd}$ BC-net list generated by dual-$V_{dd}$ assignment. Our dual-$V_{dd}$ placement considers the layout constraint in arch-DVDT. The traditional global and detail routing algorithms are applied because the routing fabric in arch-DVDT uses uniform $V_{dd}$. After placement and routing, we obtain a new dual-$V_{dd}$ BC-net list that satisfies the layout pattern constraint. Our dual-$V_{dd}$ placement is based on the simulated annealing algorithm implemented in VPR. The VPR placement tool models an FPGA as a set of legal slots or discrete locations, at which logic blocks or I/O pads can be placed. A linear congestion cost function is used in VPR placement, which is shown as follows.

$$Cost_{lin\text{-}cgst} = \sum_{i=1}^{N_{nets}} q(i) \left[ \frac{bb_x(i)}{C_{av,x}(i)^\beta} + \frac{bb_y(i)}{C_{av,y}(i)^\beta} \right] \quad (4)$$

The summation above is performed over the number of nets $N_{nets}$ in the circuit. For each net i, $bb_x(i)$ and $bb_y(i)$ represents the horizontal and vertical spans of its bounding box, respectively. The q(i) compensating factor is due to the fact that the bounding box wire length model underestimates the wiring required to connect nets with more than three terminal. Its value depends on the number of terminals in net i. Values $C_{av,x}(i)$ and $C_{av,y}(i)$ are the average channel capacities in x and y directions, respectively, over the bounding box of net i. When the channel capacities are different across the FPGA chip, the cost function penalizes placements which require more routing in the narrower channels and hence reduce the routing congestion. New cost function for the dual-$V_{dd}$ placement is developed. The placement cost difference caused by moving logic block j to a new location is defined as follows.

$$Cost_{lin\text{-}cgst}'=Cost_{lin\text{-}cgst}+\alpha\cdot\Delta matched(j)+\gamma(1-\Delta matched(j))\qquad(5)$$

The parameter matched (j) is a Boolean function related to the assigned $V_{dd}$ level for block j and its the physical location. If the $V_{dd}$ level assigned to block j does not match the $V_{dd}$ level at its physical location determined by the dual-$V_{dd}$ layout pattern, matched(j) returns value '0'. Otherwise, it returns '1'. The value of matched(j) is the difference between matched(j) in the previous placement and matched(j) in the current placement. It penalizes a 'move' that brings a logic block from a $V_{dd}$-matched location to a $V_{dd}$-unmatched location.

Term 1—matched(j) penalizes a 'move' that brings a logic block from a $V_{dd}$-unmatched location to another $V_{dd}$-unmatched location. Values α and γ are weights set to the similar order of magnitude as typical linear congestion cost value. They are tuned to have a better trade-off between power and delay. The new cost function is integrated into VPR placement tool and the adaptive annealing schedule is used to perform the placement.

The following describes the results obtained from this aspect of the invention. We have carried out power evaluation for the following three FPGA fabrics. The first is the single-$V_{dd}$ single-$V_t$ fabric arch-SVST. This is the traditional uniform FPGA fabric. We studied its low-power application in the context of supply voltage scaling, such as the system-level trend of power and performance as we scaled down the supply voltage. The circuit design for arch-SVST used the constant-leakage $V_{dd}$ scaling scheme proposed elsewhere in the application. The second fabric studied was arch-SVDT, using a single supply voltage for the entire FPGA, but the teachings explored dual-$V_t$ technique for lookup tables (LUT) and programmable FPGA interconnects. The SRAM cells in a LUT are designed with higher threshold voltage than the rest of the logic circuits in the LUT.

Although the LUT design involves dual threshold voltage, arch-SVDT can still be viewed as a uniform fabric at logic block level. Further, for all the configuration SRAM cells for interconnects in arch-SVDT, we used our low-leakage SRAM with high $V_t$. All the interconnect buffers and routing switches used normal $V_t$ values to maintain performance. The last fabric described was arch-DVDT which used the same dual-$V_t$ technique as arch-SVDT, but further applies dual-$V_{dd}$ at the logic block level. There are two types of logic blocks in arch-DVDT: $V_{ddH}$ logic block and $V_{ddL}$ logic block ($V_{ddH}$ and $V_{ddL}$ must be different in arch-DVDT). The physical locations of these logic blocks define the dual-$V_{dd}$ layout pattern.

The present invention also provides for decoding of the configuration bits for power gating and $V_{dd}$ control when only certain combinations are allowable. For example two configuration bits can be used for controlling the state of three switches. The decoding aspect can be applied at various levels to selecting $V_{dd}$ and power gating without departing from the teachings of the present invention.

Row-based and interleaved layout patterns are compared. The ratio between $V_{ddL}$ row (cell) number and $V_{ddH}$ row (cell) number is an architectural parameter. For all the three fabrics, a LUT size 4 is used and logic block size 10 in these tests. Before we present the complete experimental results, we need to determine the ratio between $V_{ddL}$ row (cell) number and $V_{ddH}$ row (cell) number for arch-DVDT. We decide the ratio according to the dual-$V_{dd}$ assignment. Table 4 shows the percentage of logic blocks assigned with $V_{ddL}$ for 20 benchmark circuits. The assignment constraint is set to zero delay-increase compared to corresponding arch-SVDT with a uniform supply voltage $V_{ddH}$. Voltages $V_{ddH}$ and $V_{ddL}$ are set to 1.3 v and 0.8 v, respectively. On average, we can assign approximately 75% of logic blocks with $V_{ddL}$ in these tests. It clearly shows that circuits implemented on uniform FPGA fabric have a large amount of surplus timing slack, which can be utilized for power reduction. According to the dual-$V_{dd}$ assignment results, the ratio between $V_{ddL}$ row (cell) number and $V_{ddH}$ row (cell) number should be set to approximately 3:1, in this example. However, the layout pattern constraint for placement increases critical path delay and we usually cannot achieve the ideal ratio. Therefore, we set the ratio to 2:1 in our tests for both row-based and interleaved layout patterns.

We carried out experiments on 20 MCNC benchmarks for the three FPGA fabrics. Both row-based and interleaved layout patterns in FIGS. 8A, 8B have been tried for arch-DVDT. However, our experimental results show no significant power and performance difference between these two layout patterns. Considering that row-based layout pattern is easier to route the power/ground network, we only present the test results of row-based layout pattern for arch-DVDT.

Figure 12:
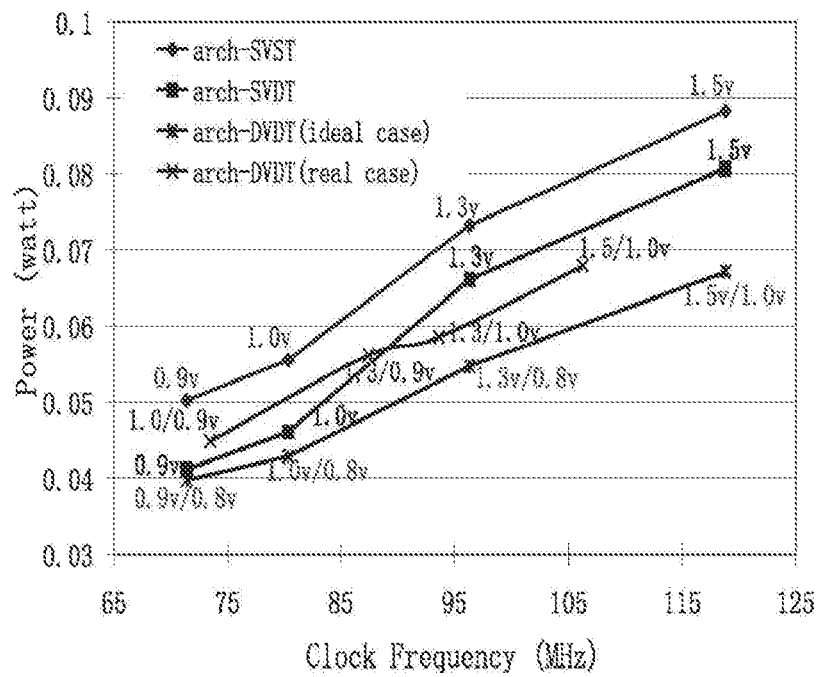
FIG. 12 is a graph of power versus delay for circuit alu4 comparing different supply and threshold architectures.
Figure 13:
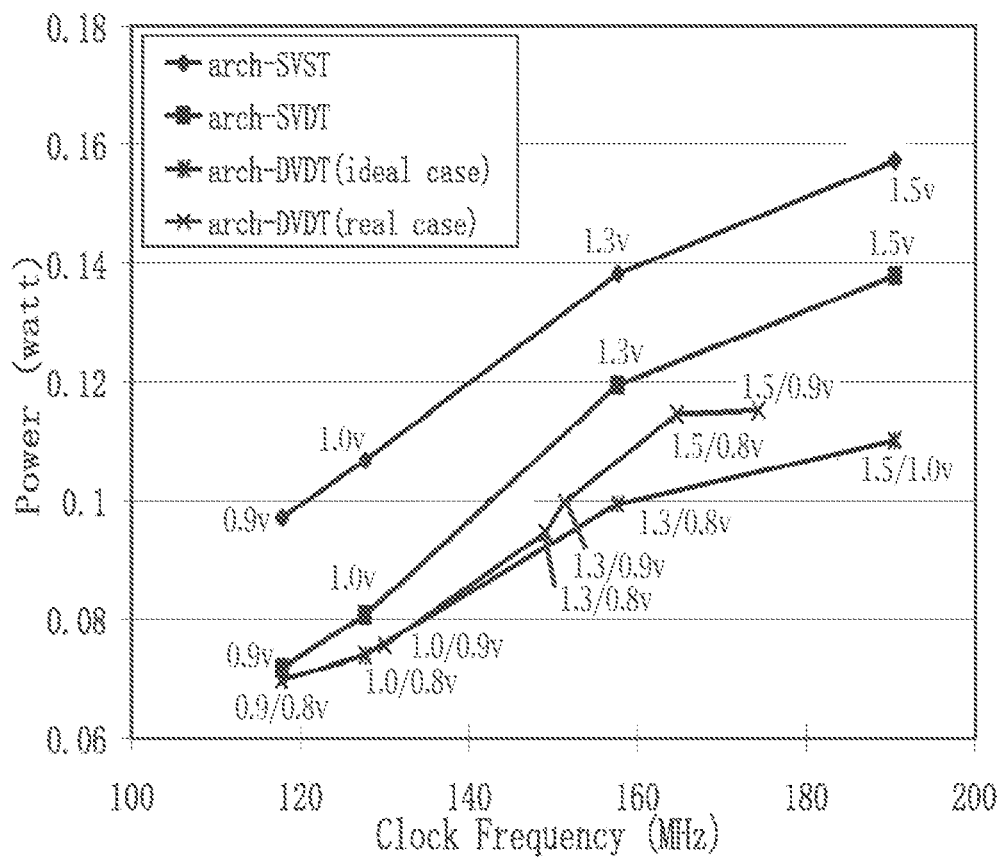
FIG. 13 is a graph of power versus delay for circuit bigkey comparing different supply and threshold architectures.

FIG. 12 and FIG. 13 show the experimental results for a combinational circuit alu4 and a sequential circuit bigkey, respectively. The X-axis of the graph is the clock frequency calculated as the reciprocal of critical path delay, while the Y-axis is the total power consumption. There are four curves in each figure. The first two curves represent the two single-$V_{dd}$ FPGA fabrics. We show the power and performance trend as we scale down the supply voltage. The supply voltages are marked in both figures. Because we use constant-leakage scaling, the leakage power is kept almost the same during voltage scaling for arch-SVST. At lower supply voltage, the proportion of leakage power for arch-SVST increases because the dynamic power is reduced quadratically as voltage scales down. Because arch-SVDT mainly reduces leakage power via dual-$V_t$, the power saving obtained by arch-SVDT increases as the leakage portion increases. For the $V_{dd}$ range in our experiments, arch-SVDT achieves power saving from 9% to 18% for circuit alu4 and from 12% to 26% for circuit bigkey. Note that our arch-SVDT has virtually no performance loss compared to uniform fabric arch-SVST. The last two curves in both figures are for dual-$V_{dd}$ fabric arch-DVDT. One depicts the ideal case result which is the power and performance for dual-$V_{dd}$ BC-net list without considering pre-defined layout pattern.

The ideal case curves were obtained as follows. A target clock frequency is set as the delay constraint in dual-$V_{dd}$ assignment. After voltage assignment considering several different $V_{ddH}/V_{ddL}$ combinations, the inferior data points were pruned (i.e., those with larger power consumption and smaller clock frequency). The other curve is the real case result obtained after our entire design flow, which considers the dual-$V_{dd}$ layout pattern. Similarly, several different $V_{ddH}/V_{ddL}$ combinations are tried and inferior solutions pruned. The $V_{ddH}/V_{ddL}$ combinations are also labeled in both figures. FIG. 12 shows that arch-DVDT can further obtain more power reduction at the higher clock frequency by applying dual-$V_{dd}$ to arch-SVDT. The graph illustrates the benefit of employing dual-$V_{dd}$ techniques in FPGAs. However, the dual-$V_{dd}$ technique does have some extra overhead. Level converters inserted between $V_{ddL}$ block and $V_{ddH}$ block consume extra power. The pre-determined layout pattern of dual-$V_{dd}$ fabric imposes placement constraint, which can increase the delay and further reduce the power saving calculated at a target frequency. As shown in the lower frequency region of FIG. 12, the overhead of dual-$V_{dd}$ fabric exceeds the benefit it can bring and arch-DVDT achieves less power savings compared to arch-SVDT.

FIG. 13 presents the similar comparison for benchmark circuit bigkey and arch-DVDT obtains consistently better power savings than arch-SVDT. For both benchmarks, we do see a gap between the real case curve and ideal case curve for arch-DVDT. This gap implies that not all the potential power reduction via introducing dual-$V_{dd}$ is achieved by our current fabric and CAD algorithms. We present the experimental results for 10 combinational benchmarks and 10 sequential benchmarks in Table 5. For the sake of presentation simplicity, we choose the maximum clock frequency achieved by arch-DVDT for each individual benchmark, and present the corresponding power savings at the maximum clock frequency. Compared to fabric arch-SVST using uniform $V_{dd}$ and $V_t$, the dual-$V_t$ fabric arch-SVDT obtains 11.6% and 14.6% power saving on average for combinational and sequential circuits, respectively. The dual-$V_{dd}$ fabric arch-DVDT achieves 13.6% and 14.1% power saving on average for combinational and sequential circuits, respectively. For individual circuits, the dual-$V_{dd}$ fabric arch-DVDT can achieve up to 10% additional power savings compared with arch-SVDT (see circuits spla and bigkey). However, the dual-$V_{dd}$ fabric is not always effective to achieve power reduction as the pre-defined layout pattern introduces no-negligible delay penalty. For several benchmarks, the overhead of applying dual-$V_{dd}$ and the associated layout constraint in arch-DVDT offset its benefit, and power savings are smaller compared to arch-SVDT which uses dual-$V_t$ but single $V_{dd}$. The potential power reduction offered by introducing dual-$V_{dd}$ will be more fully discussed later.

In concluding this section it will be recognized that we have developed FPGA circuits, fabrics and CAD algorithms for employing dual-$V_{dd}$ and dual-$V_t$ to reduce dynamic and leakage power in FPGAs. We described constant leakage $V_{dd}$ scaling to effectively reduce dynamic power consumption without increasing FPGA leakage power. We have also designed low-leakage SRAM cells and dual-$V_t$ LUTs without runtime delay penalty. We have then developed a leakage-efficient dual-$V_t$ fabric, using low-leakage SRAM cells for programmable interconnects and dual-$V_t$ LUTs for logic blocks. Furthermore, we have designed a dual-$V_{dd}$ FPGA fabric containing logic clusters of different $V_{dd}$ levels. Finally, to leverage the new fabrics, we have developed CAD algorithms including sensitivity-based $V_{dd}$ assignment and simulated annealing based placement considering predefined dual-$V_{dd}$ layout pattern.

Compared to the conventional FPGA fabric using uniform $V_{dd}$ and $V_t$, our new fabric using dual-$V_t$ obtains 11.6% and 14.6% total power reduction on average for combinational and sequential circuits, respectively. Our dual-$V_{dd}$ and dual-$V_t$ fabric obtains 13.6% and 14.1% total power reduction on average for combinational and sequential circuits, respectively. For individual benchmark, our new dual-$V_{dd}$ dual-$V_t$ fabric can achieve up to 22% power reduction compared to the conventional FPGA fabrics. Note that all the power reductions are obtained by comparing the power consumption of different fabrics at a same clock frequency. Our tests have shown that there is a significant power gap between the pre-defined dual-$V_{dd}$ layout pattern and the ideal dual-$V_{dd}$ case without considering layout constraints. Such gap is due to the fact that the pre-defined dual-$V_{dd}$ pattern leads to an extra constraint of matching $V_{dd}$ level during placement of clusters, which introduces non-negligible delay penalty, in turn, non-negligible power penalty to achieve the target clock frequency.

Figure 14:
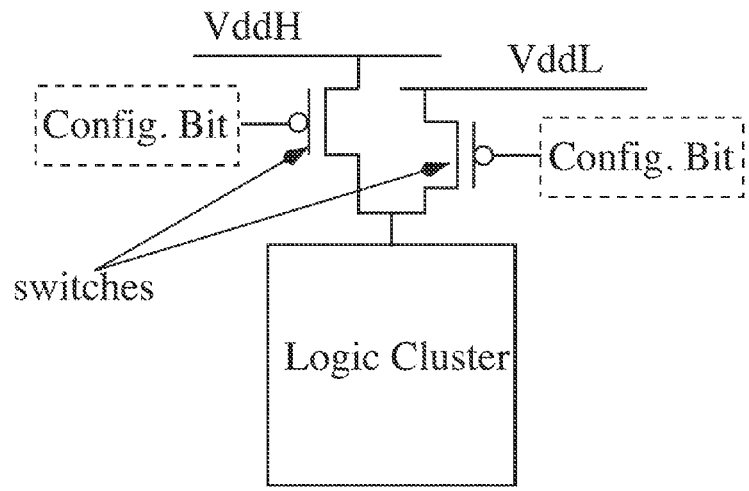
FIG. 14 is a schematic for a $V_{dd}$-programmable logic cluster according to an aspect of the present invention.

FIG. 14 illustrates a schematic as one possible solution to reduce the delay/power penalty by providing programmability of the supply voltage. The figure presents a schematic for a $V_{dd}$-programmable logic cluster. Two transistor switches can be configured to obtain the desired $V_{dd}$ level for any logic cluster. This removes the constraint to match $V_{dd}$ level during cluster placement. Certainly, the extra programmability added to the existing FPGA fabric is associated with additional circuit-level power and delay overhead. For example, a level converter is required for every $V_{dd}$-programmable logic block. A preliminary study has shown that $V_{dd}$-programmability can achieve power saving very close to the ideal case power saving. Interconnect power is a large portion of total power in FPGAs. Therefore dual-$V_t$ has been applied to FPGA interconnects to reduce leakage power without introducing run time delay penalty.

When the two transistors are controlled by two independent bits, they select the $V_{dd}$ level from high $V_{dd}$, low $V_{dd}$, and $V_{dd}$ gating. When the two transistors are controlled by one independent bit, they select between high $V_{dd}$, or low $V_{dd}$, or between one pre-defined $V_{dd}$ level (high or low) and no $V_{dd}$ supply (i.e., $V_{dd}$ gating or power gating). In addition, the logic cluster may be replaced by any convenient circuit element to obtain the same programmability (high, low, or no $V_{dd}$ supply).

2. FPGA Power Reduction Using Configurable Dual-$V_{dd}$.

This section presents the first in-depth study of FPGA circuits, architectures and CAD algorithms considering configurable dual-$V_{dd}$ for power reduction. It is believed herein that a holistic research and development involving circuits, architectures and CAD algorithms is able to achieve the highest power efficiency for FPGAs. A higher supply voltage leads to a higher performance but larger power. Leveraging this, $V_{dd}$ scaling lowers the supply voltage of the entire design or a circuit module to reduce power. Alternatively, dual-$V_{dd}$ applies high supply voltage ($V_{ddH}$) to logic on critical paths and low supply voltage ($V_{ddL}$) to logic not on critical paths. For given performance constraints, dual-$V_{dd}$ is able to achieve more power reduction than $V_{dd}$ scaling for ASICs. The ASIC designer is able to customize $V_{dd}$ layout for different applications, but such flexibility does not exist for the existing FPGA circuits and architectures.

Figure 15:
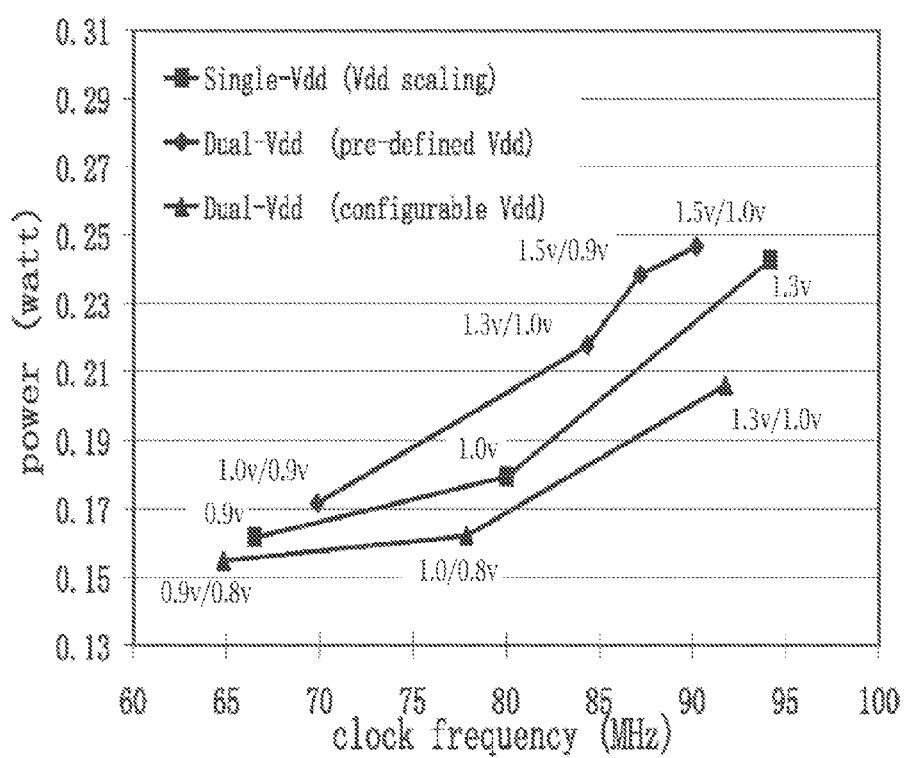
FIG. 15 is a graph comparing three power reduction solutions for benchmark circuit s38584 according to an aspect of the present invention.

FIG. 15 illustrates power reduction for MCNC benchmark circuit s38584 using $V_{dd}$ scaling and dual-$V_{dd}$. The figure assumes a generic cluster-based FPGA architecture for which power and performance curves were obtained. We decide a uniform $V_{dd}$ level for all clusters in $V_{dd}$ scaling and use a pre-determined $V_{dd}$ level in dual-$V_{dd}$ as described in the last section. It turns out that this type of dual-$V_{dd}$ consumes more power than $V_{dd}$ scaling at the same clock frequency for this circuit. Such power inefficiency is due to the fact that the pre-defined dual-$V_{dd}$ fabric imposes extra placement constraints and increases interconnect delay (and power). In contrast, we also present the power and performance curve with a fully configurable dual-$V_{dd}$ proposed in this section. The configurable dual-$V_{dd}$ reduces power significantly compared to $V_{dd}$ scaling. The first primary contribution of this section is to show that configurability of the power supply is required to achieve FPGA power reduction when using dual-$V_{dd}$. Other contributions include developing FPGA circuits, architectures and CAD algorithms considering configurable dual-$V_{dd}$ for power reduction.

The following describes dual-$V_{dd}$ FPGA circuits and architectures. We start off looking at the logic block design.

Figure 16C:
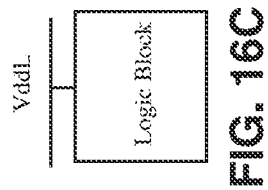
FIG. 16C is a schematic of an L-block connected to High $V_{dd}$ supply voltage.
Figure 16D:
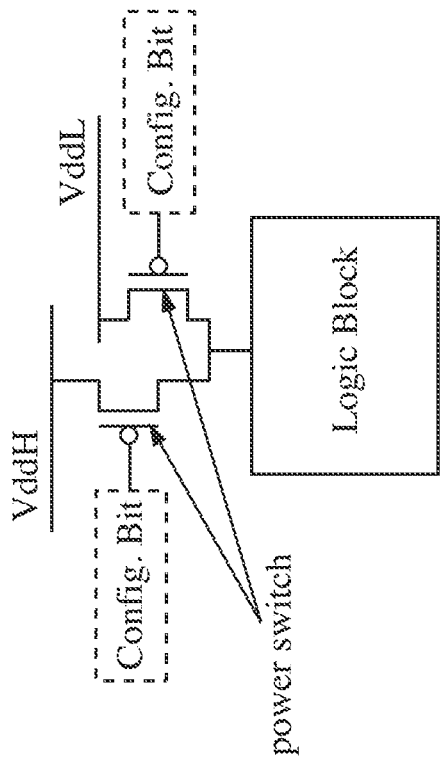
FIG. 16D is a schematic of a P-block connected for selective connection to either $V_{ddH}$ or $V_{ddL}$.
Figure 16B:
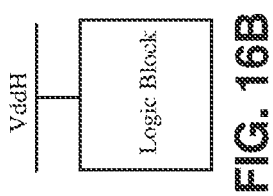
FIG. 16B is a schematic of an H-block connected to High $V_{dd}$ supply voltage $V_{ddH}$.
Figure 16A:
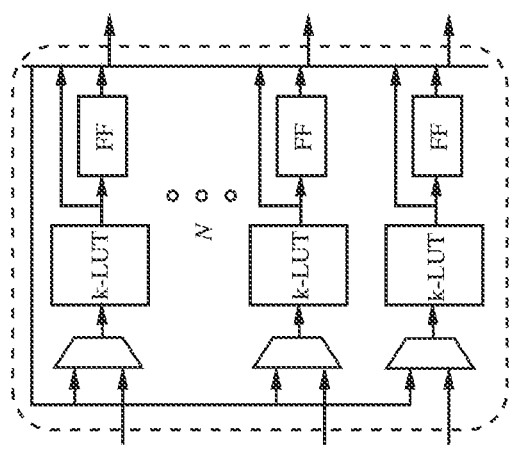
FIG. 16A is a schematic of logic blocks in a configurable dual-$V_{dd}$ FPGA according to an aspect of the present invention.

FIG. 16A-FIG. 16D illustrates logic blocks used in a dual-$V_{dd}$ architecture of the invention. FIG. 16A shows a generic logic cluster (also called a logic block). A LUT and a flip-flop together form a basic element in a logic block. The output of the LUT can be programmed to be a registered output or a combinational output. A logic block consists of N basic elements fully connected by the local interconnects and multiplexers.

FIG. 16B-FIG. 16D illustrates three types of logic blocks designed for use in our dual-$V_{dd}$ architecture. The first two types, H-block (FIG. 16B) and L-block (FIG. 16C), are connected to supply voltages $V_{ddH}$ and $V_{ddL}$, respectively. An H-block has the highest performance, and an L-block reduces power consumption but increases delay. The third type is the $V_{dd}$-programmable logic block, named P-block in FIG. 16D. The P-block is implemented by inserting two PMOS transistors between the $V_{ddH}/V_{ddL}$ rails and a logic block. The PMOS transistors are called power switches, and configuration bits are used to control the power switches so that an appropriate supply voltage can be chosen for the P-block. Using one configuration bit to turn off only one of the power switches allows customizing the $V_{dd}$ level for a P-block. In addition, using two configuration bits to turn off both power switches enables power gating for an unused P-block.

The power switch is similar to the sleep transistor for power gating. An important design aspect is how to determine the trade-off between sleep transistor size and circuit delay. In our design, the area overhead is controlled due to power switches in three ways. First, sleep transistors enable forced stacking to reduce leakage in standby mode and they are usually designed with high $V_t$ to achieve even more leakage reduction. Transistors with high $V_t$ have larger on-resistance and their size must be increased to achieve the specified performance. Power switches are designed with normal $V_t$ so that the transistor area overhead can be reduced.

Figure 17:
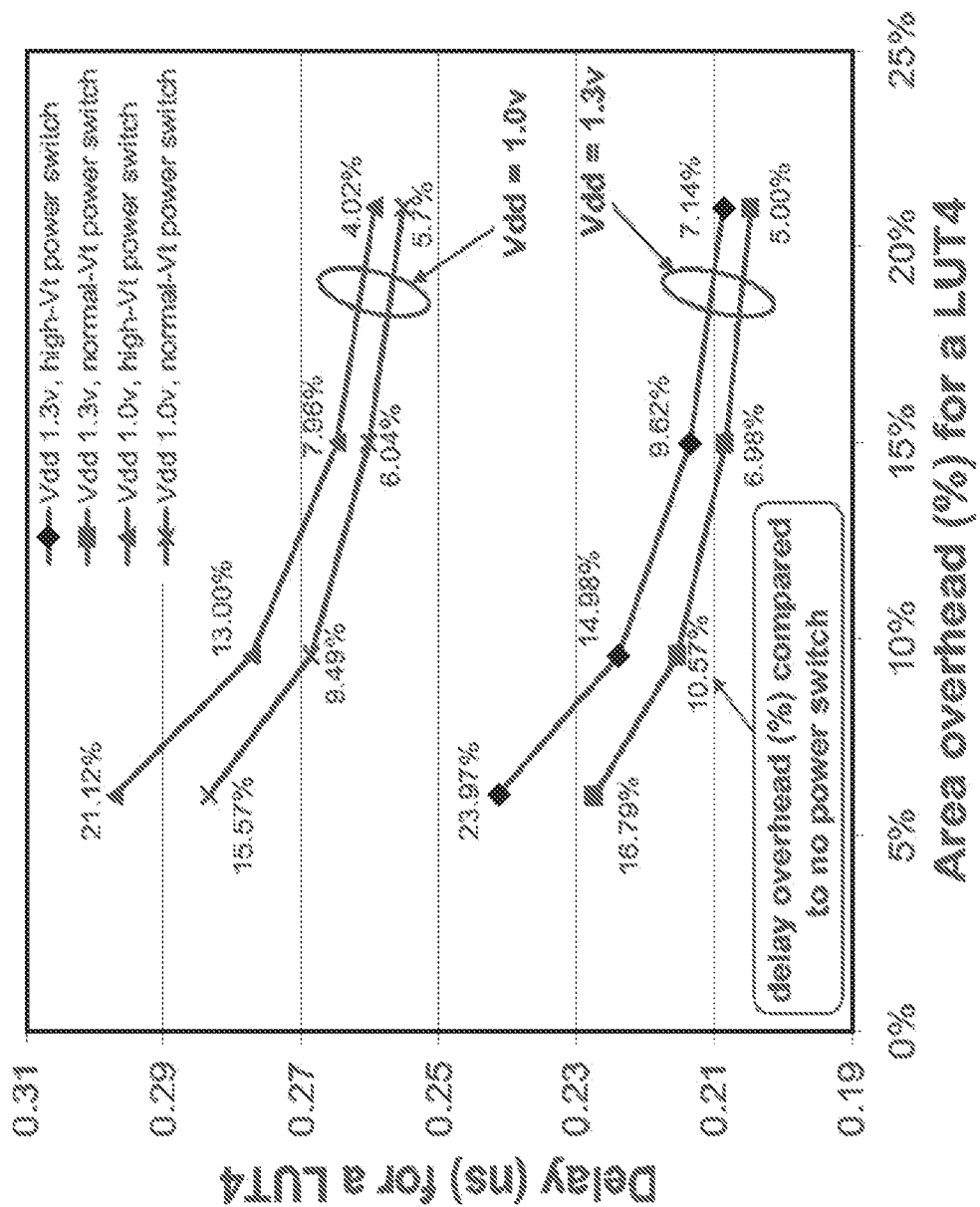
FIG. 17 is a graph of area and delay overhead of the power switch for a 4-input LUT.

FIG. 17 presents SPICE simulation results for a 4-input LUT with a power switch in 100 nm technology. The X axis is the power switch area in the percentage of original LUT4 area and Y-axis is the corresponding circuit delay. The area is calculated as the equivalent number of minimum width transistors. The delay overhead due to power switch insertion is labeled beside each data point. Clearly, for a same area overhead, a power switch with normal $V_t$ has a smaller delay compared to a power switch with high $V_t$.

Our simulation shows that, compared to 4-input LUT without any power switch at the same $V_{dd}$ level, an optimized 4-input LUT with a power switch has 5% extra delay and 21% transistor area overhead. Compared to high $V_t$, normal $V_t$ for the power switch leads to a relatively higher leakage. To compensate for this gate boosting is introduced for power switches. When a power switch is turned off a gate voltage one $V_t$ higher than the $V_{dd}$ at its source node is applied. Table 6 shows that a gate-boosted power switch can reduce leakage by two orders of magnitude compared to normal power switches with the same transistor size. There is neither technology nor design barrier to gate-boosting as it has been used in commercial Xilinx FPGAs to compensate the logic '1' degradation of NMOS pass transistors in routing switches.

To further reduce the power switch area the fact that peak current for different parts of a circuit normally do not occur at the same time is leveraged. Power switches are inserted for each logic block and then a SPICE simulation carried out. For a logic block with cluster size of 10, only 12% area overhead is required to achieve the same 5% performance loss. Therefore, large granularity significantly reduces the power switch size and the area overhead. Therefore, we inserted power switches at the logic block level. Two power switches per logic block are needed for dual-$V_{dd}$ selection. According to FIG. 17, the area of a power switch for the same delay increase is not sensitive to the $V_{dd}$ level. Therefore, a P-block logic cluster requires 24% area overhead for a bounded delay increase of 5%. Finally, the percentage of P-blocks in our dual-$V_{dd}$ architecture can be reduced and hence reduce the number of power switches and area overhead in the entire FPGA.

Power switches also introduce extra power dissipation. The power to charge and discharge source/drain capacitors of power switches is almost ignorable, as the power switch transistor stays either ON or OFF during normal operation and almost no charging or discharging arises. The primary extra power dissipation arises from the need for additional configuration SRAM cells to control the power switches. SRAM-based FPGAs use a large number of SRAM cells and our dual-$V_{dd}$ FPGA further introduces more SRAM cells for supply configuration. Because configuration cells constantly stay in the read status after FPGAs are programmed (excluding dynamically reconfigurable designs), their read or write delays are irrelevant to the design performance. We can increase $V_t$ as much as possible to achieve maximal leakage reduction without performance loss, but high $V_t$ increases the configuration time and affects the signal integrity in SRAM cells. In one embodiment of our design, we increase $V_t$ of SRAM cells for 15× leakage reduction while maintaining the signal integrity and increasing the configuration time by 13%. It should be appreciated that because the configuration time is not critical in most FPGA applications, this trade-off is typically justified.

The following describes using these three types of logic blocks within our dual-$V_{dd}$ FPGA architecture. Different supply voltages are applied to logic blocks while $V_{ddH}$ is used uniformly for the routing resources. There is a $V_{dd}$ level converter at each output of a L-block as an interface between $V_{ddL}$ logic block and $V_{ddH}$ routing channels to avoid excessive DC power.

Figure 18A:
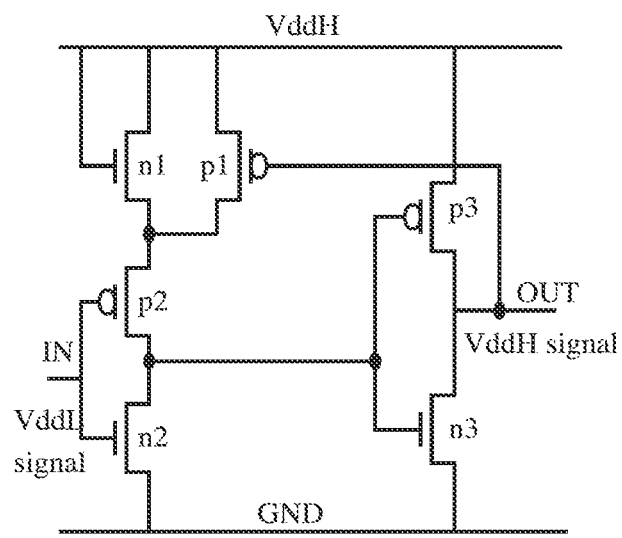
FIG. 18A is a schematic of a level converter according to an aspect of the present invention.
Figure 18B:
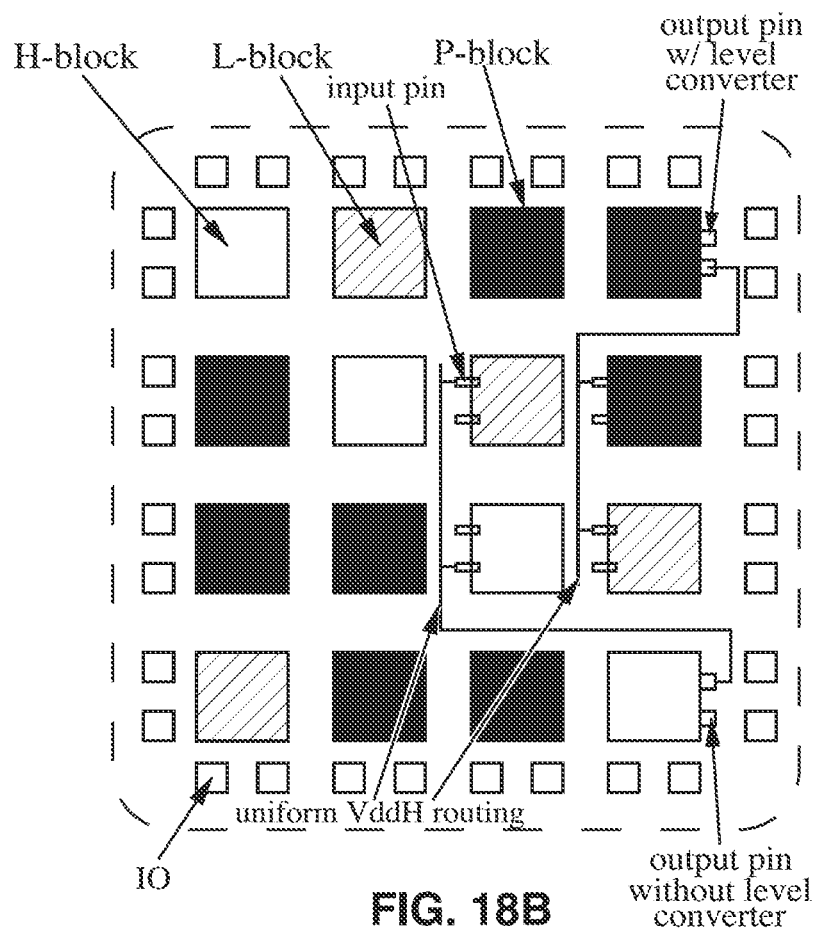
FIG. 18B is a connection topology for an Interleaved dual-$V_{dd}$ layout pattern according to an aspect of the present invention, showing ratio: H-block/L-block/Pblock=1/1/2 wherein the interleaved sequence is obtained by shifting one block between adjacent rows.

FIG. 18A-FIG. 18B illustrates a level converter and topology of an interleaved dual-$V_{dd}$ pattern. The asynchronous level converter shown in FIG. 18A is utilized to achieve a bounded delay with minimum power consumption. Table 7 presents the delay and power of the sized level converter. There is also a level converter at each output of a P-block, and the output can be programmed to either go through the level converter or bypass it. No level converters are necessary for an H-block. Because our smallest $V_{dd}$ region is a logic block, we need to design the layout pattern using the three types of logic blocks. In this section, we assume interleaved layout pattern as in FIG. 18B. H-blocks, L-blocks and P-blocks are interleaved in a fixed sequence within each row (H-block→L-block→P-block in the figure). The ratio between different types of blocks is an architectural parameter, determining the length of the repetitive sequence (in FIG. 18B, the ratio of H-block/L-block/P-block is 1/1/2 and sequence length is four logic blocks). For two adjacent rows, the starting point of the interleaved sequence is shifted by one logic block. Compared to the pre-defined dual-$V_{dd}$ fabric described previously, such interleaving makes it much easier to place a logic block close to the needed $V_{dd}$ rail. The ratio between three types of logic blocks provides a trade-off between power switch area and flexibility of the FPGA architecture.

Figure 19:
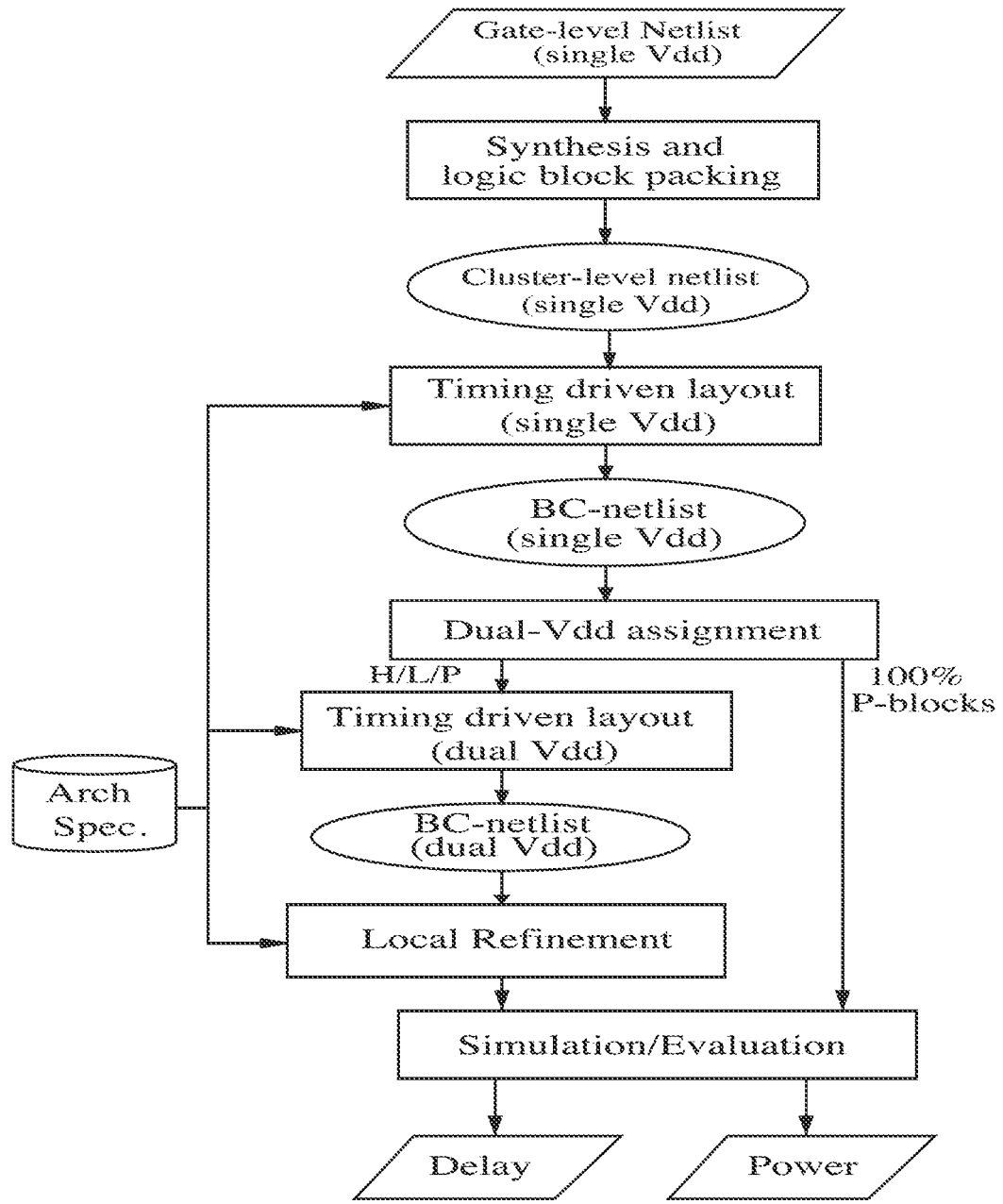
FIG. 19 is a design flow diagram for dual-$V_{dd}$ FPGAs according to an aspect of the present invention.

FIG. 19 illustrates a design flow process for dual-$V_{dd}$ FPGAs. The following describes a design flow process according to another aspect of the invention. We developed the design flow of FIG. 19 to leverage the new dual-$V_{dd}$ architecture. Given a single-$V_{dd}$ gate-level net list, we first apply single-$V_{dd}$ technology mapping and timing driven packing to obtain a cluster-level net list. We then perform single-$V_{dd}$ timing-driven placement and routing by VPR and generate the basic circuit net list (BC-net list). The BC-net list is defined in and it is annotated with capacitance, resistance, and switching activity for each node.

As the first step to consider dual-$V_{dd}$ in our design flow, $V_{dd}$ assignment is performed to obtain a dual-$V_{dd}$ BC net list. A dual-$V_{dd}$ BC-net list is extended from the original BC-net list by annotating supply voltage for each logic block. Layout pattern constraints are not considered for dual-$V_{dd}$ assignment as a sensitivity-based algorithm is applied. Power sensitivity with respect to supply voltage, i.e., $\Delta P/\Delta V_{dd}$ is calculated for logic blocks. The total FPGA power P includes both switching power $P_{sw}$ and leakage power $P_{lkg}$. For each node i, we have switching power $P_{sw}(i)=0.5f\cdot\hat{E}_i\cdot C_i\cdot V_{dd}^2$ (as per Eq. 1 above) where $\hat{E}_i$ is the effective transition density considering glitches and $C_i$ is the load capacitance. Leakage power is given by $P_{lkg}(i)=I_{lkg}(V_{dd})\cdot V_{dd}$. We pre-characterize $I_{lkg}$ and logic block delay at each $V_{dd}$ level using SPICE simulation.

FIG. 6 presents the sensitivity-based assignment algorithm. After the dual-$V_{dd}$ assignment, we have two different design paths. If there are 100% P-blocks in the architecture, the dual-$V_{dd}$ BC-net list generated by the $V_{dd}$ assignment is simulated to obtain the delay and power. We enhance the FPGA evaluation package fpgaEva-LP for our power and delay evaluation. When a parameterized dual-$V_{dd}$ architecture contains H-blocks or L-blocks, layout pattern constraint applies because the supply voltages for H-blocks and L-blocks are not configurable. The corresponding design path goes through additional steps of dual-$V_{dd}$ placement and local refinement. Our dual-$V_{dd}$ placement is based on the simulated annealing algorithm in VPR. It models an FPGA as a set of legal slots at which logic blocks or I/O pads can be placed via a simulated annealing procedure. Moves are defined as either swapping two logic blocks or moving a logic block to an empty slot. The placement cost function is changed to consider dual-$V_{dd}$ architecture. The cost of moving a logic block j to an empty slot is as follows.

$$\text{Cost(move)}=\text{term1}+\alpha\cdot\Delta\text{matched}(j)+\gamma\cdot(1-\text{matched}(j))+\beta\cdot\Delta\text{proj}(j)+\theta\cdot\text{proj}(j) \quad (6)$$

In which term1 is the original cost function in VPR considering both congestion and wire length. Variable matched(j) is a Boolean function describing the $V_{dd}$-matching state of a logic block in the new slot and is defined by the following.

$$\text{matched}(j)\begin{cases} 1 & V_{ddL} \text{ block } j \text{ in slot of } L\text{-block or } P\text{-block} \\ 1 & V_{ddH} \text{ block } j \text{ in slot of } L\text{-block or } P\text{-block} \\ 0 & \text{Otherwise} \end{cases}$$

If the $V_{dd}$ assigned to block j matches the $V_{dd}$ at its physical location, matched(j) returns value '1'. Otherwise, it returns '0'. Because the power supply of a P-block is configurable, any logic block placed in a P-block slot returns a matched value. Value matched(j) is the difference of matched(j) to penalize moving block j from a $V_{dd}$-matched location to an unmatched location. The term 1-matched(j) penalizes moving block j from a $V_{dd}$-unmatched location to another unmatched location. Considering the power and delay overhead of a P-block, we further penalize the $V_{dd}$-matched location at a P-block slot other than a H-block or L-block slot. Similar to matched(j), proj(j) is the Boolean function that designates whether the current location of block j is a P-block slot or not. The term $\Delta$proj(j) penalizes moving block j from a $V_{dd}$ non-programmable slot to a $V_{dd}$-programmable slot, and the term proj(j) penalizes moving block j from a $V_{dd}$-programmable slot to another $V_{dd}$-programmable slot. Weights α, β, γ and θ are determined experimentally for better power performance trade-off. The cost of swapping two logic blocks is the sum of the costs given by Eq. 6 for the two blocks.

After dual-$V_{dd}$ placement, we perform local refinement to further reduce power or enhance performance. We go through all P-blocks in the architecture and perturb their power supply configurations. Two types of perturbation are performed. First, if a P-block programmed to can use $V_{ddL}$ without increasing critical path delay, we re-program it to $V_{ddL}$. This perturbation reduces power without delay penalty and is always beneficial. Second, we re-program all $V_{ddL}$ P-blocks on critical paths to $V_{ddH}$. This perturbation increases circuit performance at the cost of larger power consumption. In these tests the critical path consists of only a small number of logic blocks due to large interconnect delay in FPGAs. Therefore, our second perturbation can improve the circuit performance with only little power increase.

A number of tests were carried out to compare the three architectures: arch-SV, arch-DV and ideal-DV. We use low-leakage SRAM cells for configuration bits in all three architectures and therefore our comparison does not include SRAM leakage power savings. Architecture arch-SV is the conventional single-$V_{dd}$ architecture considering uniform-$V_{dd}$ scaling and correspondent $V_t$ scaling. Architecture arch-DV is our dual-$V_{dd}$ architecture and two types of arch-DV are studied in this section, one is the arch-DV with 100% P-blocks, and the other is the arch-DV with a fixed mixture of L-blocks, H-blocks and P-blocks, which is referred to herein as ratioed "arch-DV". Architecture ideal-DV does not have any P-blocks but assumes that the mixture and placement of H-blocks and L-blocks can be perfectly customized for each individual application. Compared to arch-DV with 100% P-blocks for customizing power supply for every logic block, ideal-DV has neither power and delay overhead associated with P-blocks nor the capability to turn off the unused logic blocks by power-gating.

The ratio of three types of logic blocks is determined in a ratioed arch-DV by profiling benchmarks. We perform dual-$V_{dd}$ assignment to MCNC benchmark circuits and obtain the percentage of logic blocks assigned with $V_{ddL}$. The percentage varies from 53% to 96% and the average is around 75%. To cover this wide range of variation while limiting the overhead due to P-blocks, we set the ratio H-block/L-block/P-block (or H/L/P) 2 to 1/1/3. Table 8 presents the transistor area overhead due to the power switches for P-blocks. Architecture arch-DV with 100% P-blocks has power switch area around 24% of total logic block transistor area. The overhead is reduced to 14% by using the ratio H/L/P=1/1/3. Because FPGA area is mainly dominated by routing area in the channels, such area overhead does not necessarily lead to the same amount of chip area increase.

In the following we consider local refinement before we present the complete evaluation results, we show the effectiveness of the local refinement by comparing the results before and after refinement. Columns 2-3 in Table 9 show the number of P-blocks configured as $V_{ddL}$. After the local refinement, we increase the number of $V_{ddL}$ P-blocks by 6.52% on average and intuitively reduce the logic power. Local refinement also reduces critical path delay by 4.23% (see columns 5-7 of Table 9). Therefore, our local refinement is effective to improve circuit performance and reduce power consumption in logic blocks.

Figures 20, 21:
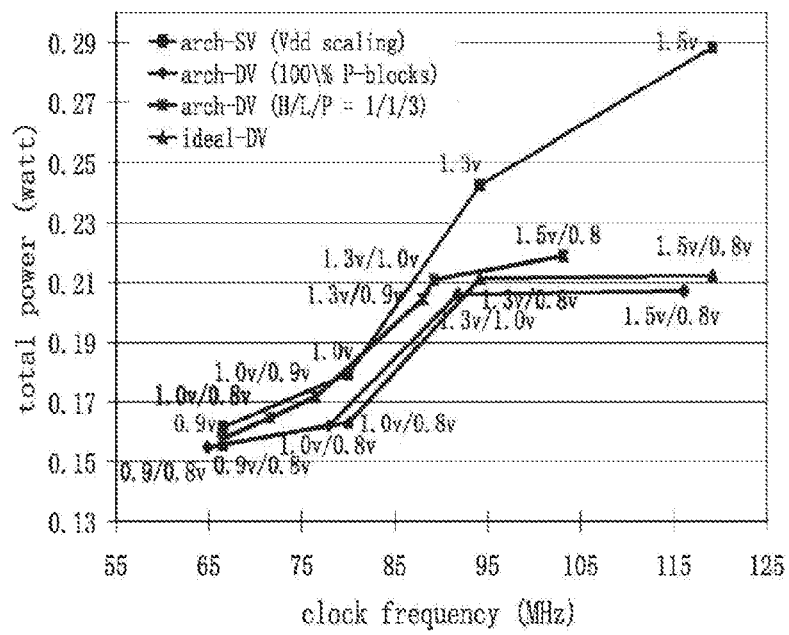
FIG. 20 is pseudo-code for implementing a method of sensitivity-based dual-assignment according to an aspect of the present invention.
FIG. 21 is a graph of total power versus frequency which evaluates results for benchmark FPGA circuit s38584 comparing aspects of the present invention.

In comparing architectures we carry out evaluation experiments on MCNC benchmark circuits. Architecture arch-DV with 100% P-blocks and ratioed arch-DV with H/L/P=1/1/3 are compared to arch-SV. FIG. 21 presents the evaluation result for benchmark circuit s38584. The X-axis is the clock frequency calculated as the reciprocal of critical path delay. The Y-axis is the total power consumption. The four power-performance trade-off curves in each figure correspond to arch-SV, the two types of arch-DV and ideal-DV. For arch-SV, we show the power and performance trend as we perform the $V_{dd}$ scaling. Architecture arch-SV also serves as our baseline for the power savings of arch-DV. To obtain the power performance curves for arch-DV, we try different dual-$V_{dd}$ combinations. After we get all the data points, we prune the inferior data points (i.e., those with larger power consumption and lower clock frequency). These remaining solutions form the spectrum of power-performance trade-off using different $V_{ddH}/V_{ddL}$ combinations. We label the $V_{ddH}/V_{ddL}$ combination for each data point.

For the two types of arch-DV, it is clear that arch-DV with 100% P-blocks provides improved power reduction compared to arch-DV with ratio H/L/P as 1/1/3, but requires more area for power switches as shown in Table 8. In the clock frequency range of our experiments, the power saving by arch-DV is larger at the higher frequency end. This is because high clock frequency usually requires high supply voltage and more surplus timing slack can be utilized at the logic block level. Architecture arch-DV with full supply programmability closely approaches the benefits of ideal-DV. For benchmark s38584, our arch-DV with 100% P-blocks even beats ideal-DV at high frequency because the benefit of power-gating capability in our architecture exceeds the power overhead of dual-$V_{ddH}/V_{ddL}$.

Table 10 summarizes the evaluation for all the benchmarks. For each benchmark circuit, we preferably choose the maximum clock frequency achieved by arch-DV (H/L/P ratio of 1/1/3) among all $V_{ddH}/V_{ddL}$ combinations and present the corresponding power saving at that clock frequency. On average, arch-DV with 100% P-blocks achieves 35.46% logic power saving and arch-DV with ratioed H/L/P achieves 28.62% logic power saving. We further break down the logic power saving into two parts: power reduction due to power-gating of unused logic blocks and power reduction due to dual-$V_{dd}$ for utilized logic blocks. Table 10 shows that power-gating of unused blocks has very limited contribution in our overall logic power saving. The bulk of the logic power savings is in response to the dual-$V_{dd}$ utilized for logic blocks. The average logic power saving due to power-gating for the two types of arch-DV is 4.20% and 7.00%, respectively. Because VPR uses the smallest chip size that just fits a benchmark for placement and routing, we have a high average logic utilization of 84% in our experiments. But in reality, the saving by power gating can be much larger due to the much lower utilization in FPGAs. Our arch-DV provides power reduction for logic blocks because it uses uniform $V_{ddH}$ for routing resources. As shown in Table 10, the average total FPGA power savings for arch-DV with 100% P-blocks and arch-DV with ratioed H/L/P are 14.29% and 9.04%, respectively.

It has been shown that configurable $V_{dd}$ is required to obtain a satisfactory performance and power trade-off in FPGAs. Circuits and logic fabrics according to the present invention using programmable dual-$V_{dd}$ have been described, and a CAD flow developed to leverage such circuits and logic fabrics. We have carried out a highly quantitative study using area, delay and power models obtained from detailed circuit design and SPICE simulation in 100 nm technology. Compared to single-$V_{dd}$ FPGAs with $V_{dd}$ level optimized for the same target clock frequency, dual-$V_{dd}$ FPGAs with full supply programmability for logic blocks reduce logic power by 35.50% and increase logic block area by 24%. Dual-$V_{dd}$ FPGAs with partial supply programmability reduce logic power by 28.62% and increase logic block area by 14%. Because FPGA chip area is mainly determined by routing area, such logic area increase is not significant.

Power supply network to support configurable $V_{dd}$ or dual-$V_{dd}$ may introduce extra routing congestion. Leveraging our recent research on optimal synthesis of sleep transistors and power supply network we study power delivery design and optimization for configurable dual-$V_{dd}$ FPGAs. In this section we only describe the application of configurable $V_{dd}$ to logic blocks. The total power reduction percentage for dual-$V_{dd}$ FPGAs is significantly lower than the logic power reduction percentage.

3. $V_{dd}$-Programmability to Reduce FPGA Interconnect Power.

The use of configurable dual-$V_{dd}$ for FPGAs has been described for reducing FPGA power. However, these teachings are mainly directed at reducing logic block power, while the total FPGA power reduction is limited because the dominant interconnect power has not been optimized.

Figure 22:
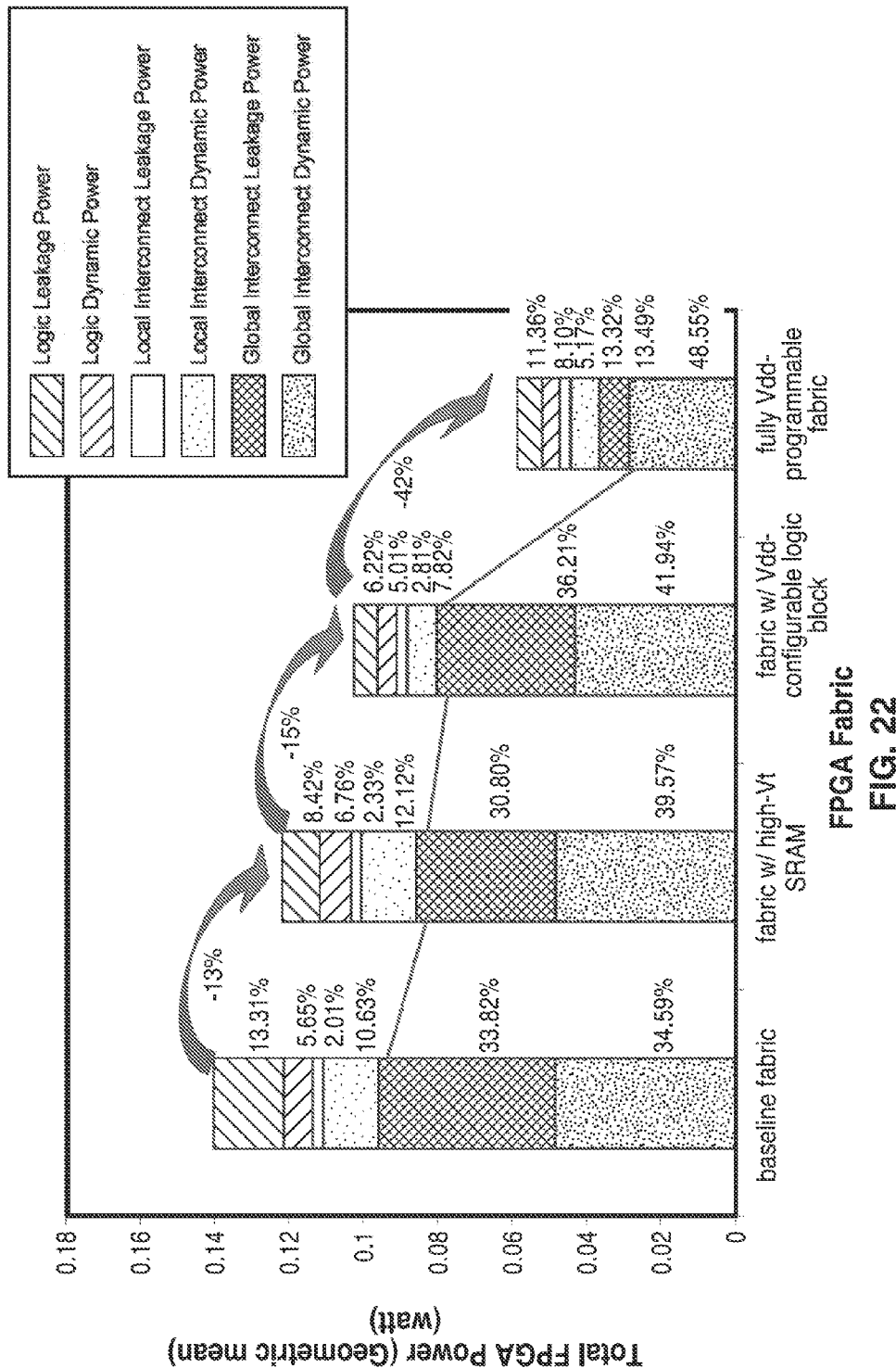
FIG. 22 is a graph of FPGA power breakdown after applying the existing power optimization techniques as well as the techniques according to the present invention, showing power and power reduction percentage as reported in geometric mean over the MCNC benchmark suite.

FIG. 22 is an example of FPGA power dissipation for different architectures which breaks down the power draws from the various sources. As an example, consider the first three bars in the figure which show the power breakdown of a conventional (also baseline) FPGA architecture and the component-wise power saving after applying power saving techniques which have been taught above. The logic power is the power of LUTs, flip-flops and MUXes in logic blocks. The local interconnect power is the power of internal routing wires and buffers within logic blocks. Routing wires outside logic blocks, programmable interconnect switches in routing channels and their configuration SRAM cells contribute to global interconnect power.

The figure shows that global interconnect power, which comprises 68% of total FPGA power, is dominant before applying any power reduction technique. By using high $V_t$ SRAMs for configuration bits in LUTs and interconnects to reduce leakage, the total FPGA power is reduced by 13% compared to the baseline FPGA. When the configurable dual-$V_{dd}$ for logic blocks is further applied, the power of logic and local interconnect is reduced significantly and the total FPGA power is reduced by 15% compared to the FPGA with high $V_t$ SRAMs for configuration bits. As a result of using the power reduction techniques described above the portion of global interconnect power shifts to become 78% of the total power. Clearly, interconnect power minimization is the key to effectively reduce total FPGA power and is the focus of this section. \

There is limited study on interconnect power reduction for FPGAs. One such study involved the use of low swing circuits with long interconnects. However, low swing circuits are complicated to design and are less robust. They have not been widely used in either full custom designs or FPGA designs. Similar to low swing circuits that apply reduced $V_{dd}$ to FPGA interconnects to reduce power, in this section we selectively apply low $V_{dd}$ to interconnect circuits such as routing and connection switches. Our interconnect circuits are still the same as conventional FPGA circuits but with a reduced $V_{dd}$ level and the effort to design special low swing circuits is avoided. The $V_{dd}$ selection for different applications is obtained by programmable dual-$V_{dd}$. In addition, we also show that the utilization rate of interconnect switches is extremely low due to the interconnection programmability (12% when using the smallest FPGA array that just fits for a given application). Therefore we develop our programmable dual-$V_{dd}$ technique with capability of power gating for extra leakage power reduction. In contrast to what is described above, where programmable $V_{dd}$ is used only for logic blocks, we apply programmable dual-$V_{dd}$ to both logic blocks and interconnects, and name the resulting FPGA fabric as fully $V_{dd}$-programmable FPGA fabric. On average, the new fabric reduces total power by 50.55% in the tests conducted.

Figure 23A:
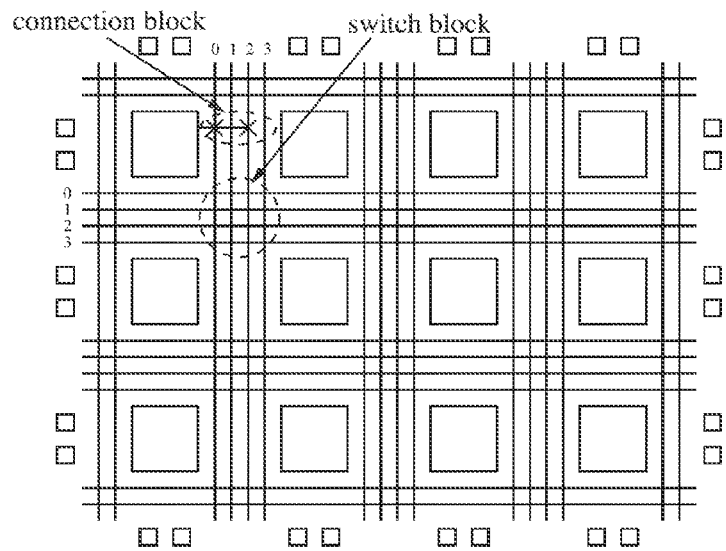
FIG. 23A is a connection topology for island style routing.
Figure 23B:
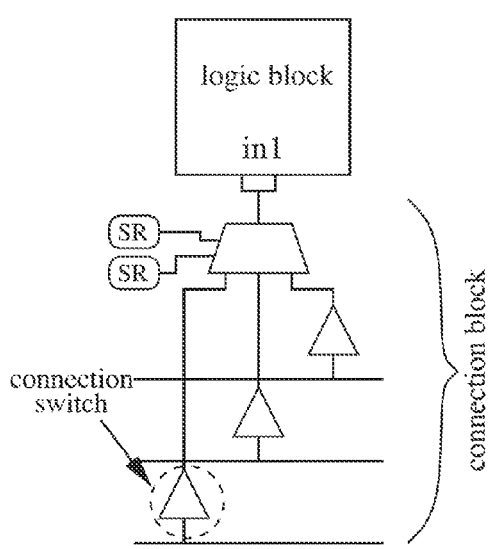
FIG. 23B is a schematic of a connection block according to an aspect of the present invention.
Figure 23C:
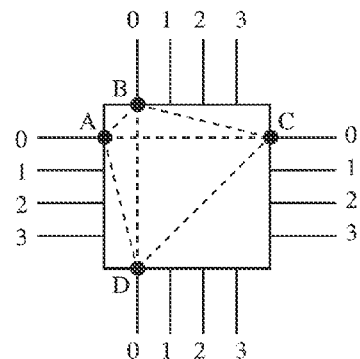
FIG. 23C is a path routing diagram of a switch block according to an aspect of the present invention.
Figure 23D:
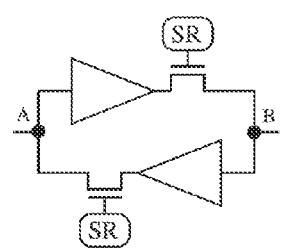
FIG. 23D is a schematic of routing switches according to an aspect of the present invention.

FIG. 23A through FIG. 23D shows aspects of the traditional island style routing architecture, which is one format of interconnect fabric described herein. It should be appreciated that interconnects consume most of the area and power of FPGAs. Referring to FIG. 23A it can be seen that the logic blocks are surrounded by routing channels consisting of wire segments. The input and output pins of a logic block can be connected to the wire segments in the surrounding channels via a connection block as shown in FIG. 23B. There is a routing switch block at each intersection of a horizontal channel and a vertical channel. FIG. 23C shows a subset switch block in which the incoming track can be connected to the outgoing tracks with the same track number. The connections in a switch block (represented by the dashed lines in FIG. 23C are programmable routing switches. Routing switches can be implemented by tri-state buffers and each connection preferably utilizes two tri-state buffers so that it can be programmed independently for either direction. FPGA interconnect power is the power consumed by the programmable switches in both switch blocks and connection blocks and the routing wires driven by the switches.

In this section, we decide the routing channel width W in a conventional manner, for example W=1.2$W_{min}$, where $W_{min}$ is the minimum channel width required to route the given circuit successfully. The channel width W represents a "low stress" routing situation that usually occurs in commercial FPGAs for 'average' circuits. For each given circuit, we also use the smallest FPGA array that just fits the circuit for logic cell placement. We assume that the LUT size is 4 and cluster (i.e., logic block) size is 10, and use interconnect structure with 100% tri-state buffers, instead rather than a mix of buffers and pass transistors. It should be appreciated that many variations of this can be implemented.

The configurable Dual-$V_{dd}$ technique makes use of the timing slack in the circuit to minimize power. It applies high supply voltage ($V_{ddH}$) to devices on critical paths to maintain the performance, and applies low supply voltage ($V_{ddL}$) to devices on non critical paths to reduce power. The configurable dual-$V_{dd}$ technique was described above to provide $V_{dd}$-programmability for logic blocks (refer back to FIG. 14). The $V_{dd}$-programmable logic block is obtained by inserting two extra PMOS transistors, called power switches, between the conventional logic block and the dual-$V_{dd}$ power rails for $V_{dd}$ selection and power gating. The same $V_{dd}$-programmable logic block used above is also assumed in this section, but we further explore $V_{dd}$-programmable FPGA interconnects.

Figure 24A:
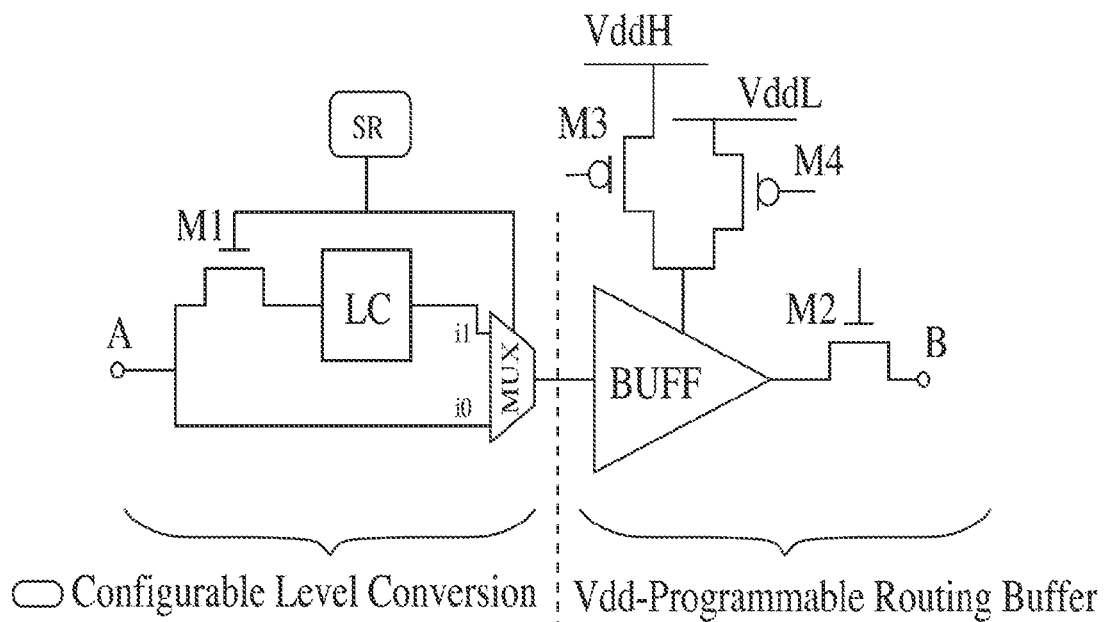
FIG. 24A is a schematic of a $V_{dd}$-programmable routing switch according to an aspect of the present invention.
Figure 24B:
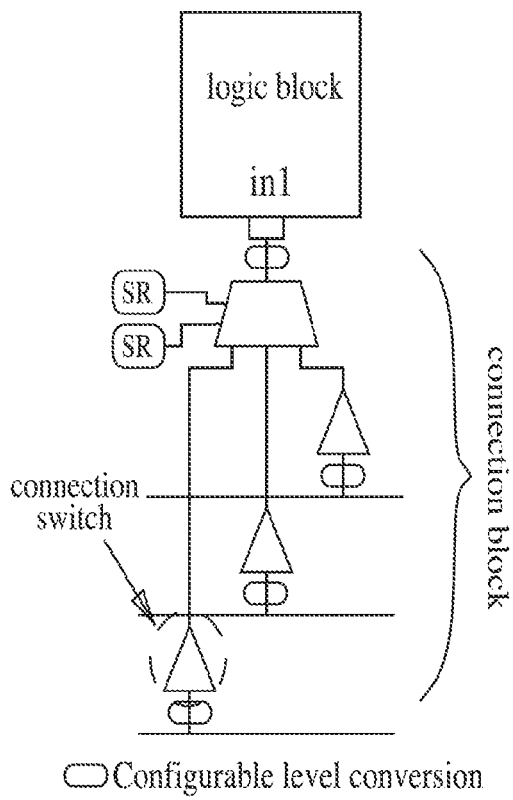
FIG. 24B is a schematic of a $V_{dd}$-programmable connection block according to an aspect of the present invention, showing SRAM cells (SR) and level converters (LC).

FIGS. 24A, 24B illustrate $V_{dd}$-programmable elements according to the present invention. We apply programmable dual-$V_{dd}$ to each interconnect switch (either a routing switch or a connection switch). Our $V_{dd}$-programmable routing switch is shown in FIG. 24A, with the left portion providing a configurable level converter and right portion being a $V_{dd}$-programmable routing buffer. On the tri-state buffer in the routing switch, we insert two PMOS transistors M3 and M4 between the tri-state buffer and $V_{ddH}$, $V_{ddL}$ power rails, respectively. Similar to what was described above, turning off one of the two power switches can select a $V_{dd}$ level for the routing switch. In this case, we only need one configuration cell and name this scheme as one-bit control implementation of programmable $V_{dd}$ Considering the extremely low interconnect utilization rate (an average of 11.90% as shown in Table 11 for MCNC benchmark set), we can turn off both power switches and power gate an unused routing switch. In that case, we need two configuration cells to provide three $V_{dd}$ states: high $V_{dd}$, low $V_{dd}$ and power gating. We name this scheme as the two-bit control implementation of programmable $V_{dd}$.

The two bit control implementation is very attractive because our SPICE simulation shows that power gating of the routing switch can reduce its leakage power by a factor of over 300. We also consider the power and delay overhead associated with the power switch insertion. The dynamic power overhead is almost ignorable (See energy per switch in Table 12). This is because the power switches stay either ON or OFF and there is no charging and discharging at their source/drain capacitors. The main power overhead is the leakage power of the extra configuration cells for $V_{dd}$ selection. We use the same high $V_t$ SRAM cells as we described above to reduce configuration cell leakage. Further, the $V_{dd}$ programmable routing switch has an increased delay compared to the conventional routing switch because the power switches are inserted between the buffer and power supply. We properly size the power switches for the tri-state buffer to achieve a bounded delay increase. For a routing architecture with all wire segments spanning four logic blocks, we assume 7× minimum width tri-state buffers for this embodiment and achieve 6% delay increase by inserting 25× minimum width power switches when compared to conventional $V_{dd}$ non-programmable routing switches.

The left part of the circuit in FIG. 24A is the level converter. When we apply dual-$V_{dd}$ to the routing switches, we need a level converter whenever a $V_{ddL}$ routing switch drives a $V_{ddH}$ routing switch. Because each routing switch can be programmed to either $V_{ddH}$ or $V_{ddL}$, a level converter must be pre-inserted in the fabric for any pair of wire segments that can be connected through a routing switch block. We insert the level converter right before the routing switch and use a multiplexer to either select this level converter or bypass it. The transistor M1 is used to prevent signal transitions from propagating through the level converter when it is bypassed, and therefore eliminate the dynamic power of an unused level converter. Only one configuration bit is needed to realize the level converter selection and signal gating for unused level converters. We use the same asynchronous level converter circuit as we described in earlier sections and size the level converter as to achieve a bounded delay with minimum power consumption. The leakage of the sized level converter is around 6.4% of the leakage for a 7× min width tri-state routing buffer.

Another type of routing resources are the connection blocks as shown in FIG. 24B. The multiplexer based implementation chooses only one track in the channel and connects it to the logic block input pin. The buffers between the routing track and the multiplexer are connection switches. Programmable $V_{dd}$ is also applied to the connection switch and, similarly, the configurable level conversion circuits are inserted before the connection switch. Because we apply programmable $V_{dd}$ to both logic blocks and programmable interconnect switches, it is possible that a $V_{ddL}$ connection switch connects to a $V_{ddH}$ logic block. To ensure that there is supply level conversion for this type of connection, we also insert the configurable level conversion circuit before each logic block input pin.

Figure 25:
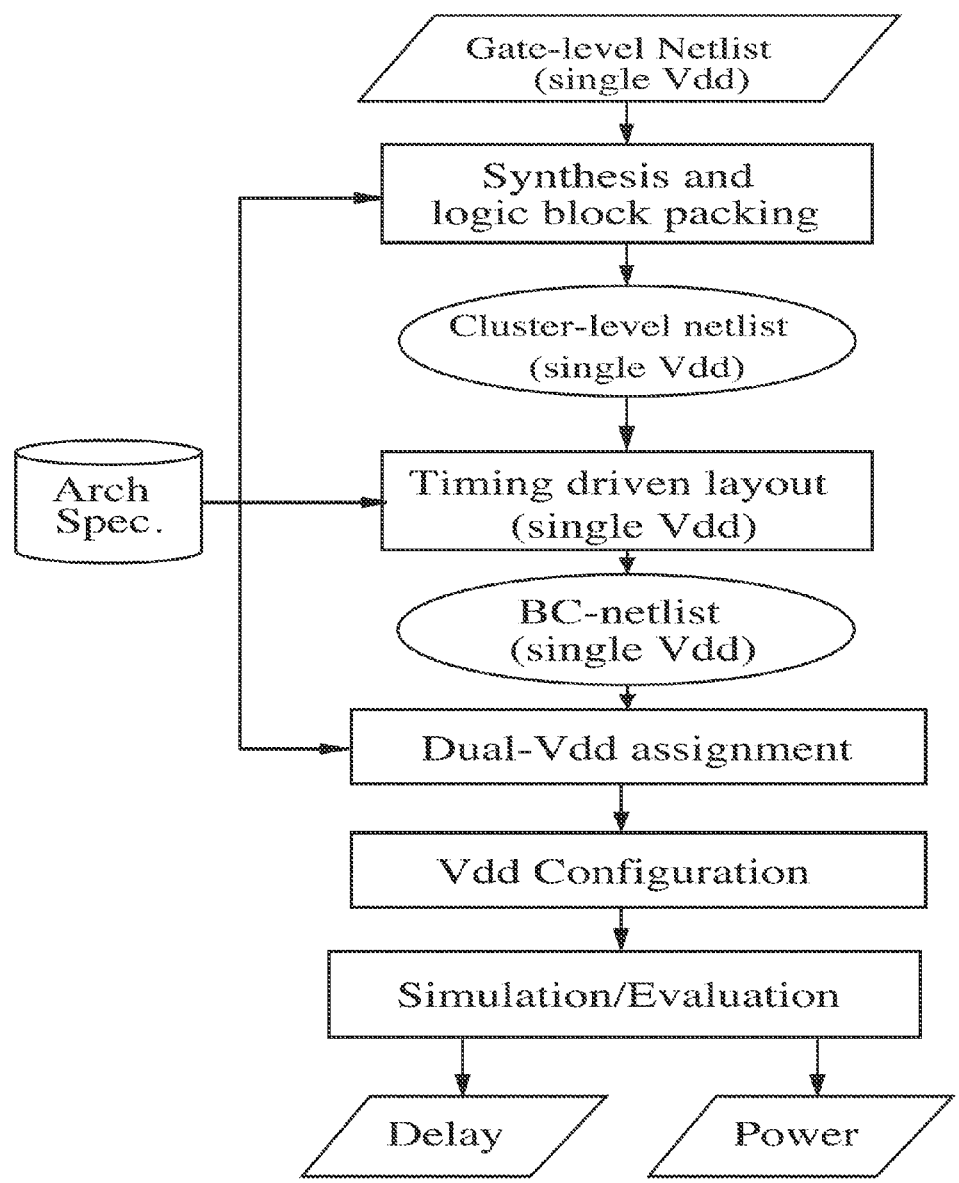
FIG. 25 is a design flow diagram for the fully $V_{dd}$-programmable FPGA fabric according to an aspect of the present invention.

FIG. 25 illustrates an example of design flow according to the present invention. In this section we develop a simple CAD flow to leverage the fully $V_{dd}$-programmable fabric. Starting with a single $V_{dd}$ gate level net list, we apply technology mapping and timing driven packing to obtain the single $V_{dd}$ cluster level net list. We then perform single $V_{dd}$ timing driven placement and routing by VPR and generate the basic circuit net list (BCnet list). The BC net list is annotated with capacitance, resistance and switching activity for each node. After that, dual-$V_{dd}$ assignment is performed on the BC net list and $V_{dd}$ configuration is decided for each used logic block and programmable interconnect switches. Power gating is applied to all unused logic blocks and programmable switches. Finally, we perform the power and delay evaluation for the dual-$V_{dd}$ design. Compared to the traditional FPGA design flow, we only introduce one extra step (highlighted in FIG. 5) and none of the original steps is changed. This is because the full $V_{dd}$-programmability in our new FPGA fabric eliminates any extra layout constraint in placement and routing. In contrast, both predefined dual-$V_{dd}$ fabric and partially $V_{dd}$-programmable fabric described earlier significantly complicate the CAD flow by either adding extra design steps or changing the original placement/routing. We therefore apply our sensitivity-based algorithm to perform the dual-$V_{dd}$ assignment.

It should be appreciated that a circuit element is defined as either a logic block or a routing/connection switch. Power sensitivity of a circuit element is the FPGA power consumption change due to the $V_{dd}$ level change for that circuit element. Assuming that all the circuit elements are initially assigned to $V_{ddH}$, we iteratively carry out the following steps. Timing analysis is performed to obtain the circuit elements on the path with the largest timing slack. We then calculate the power sensitivity of those circuit elements and assign $V_{ddL}$ to the element with the largest power sensitivity. The configurable level converter can be enabled as needed. After updating the circuit timing, we accept the assignment if the critical path delay does not increase. Otherwise, we reject the assignment and restore the circuit element supply voltage to $V_{ddH}$. In either case, the circuit element will be marked as 'tried' and will not be revisited in subsequent iterations. After the dual-$V_{dd}$ assignment, we obtain a dual-$V_{dd}$ BC net list without degrading the system performance.

In this section, we outline the results of tests conducted on the MCNC benchmark set and compare three architectures, arch-SV, arch-PV-logic and arch-PV-fpga. Architecture arch-SV scales down the supply voltage $V_{dd}$ as well as the transistor threshold voltage $V_t$ for the entire FPGA. It achieves power reduction at the cost of performance loss, while arch-PV-logic is the FPGA architecture using programmable dual-$V_{dd}$ for logic blocks. The architecture arch-PV-fpga is our fully $V_{dd}$-programmable fabric applying programmable dual-$V_{dd}$ to both logic blocks and interconnects.

In the following we consider ideal low $V_{dd}$ utilization rate. In Table 3, we present the ideal low $V_{dd}$ utilization rate obtained by the dual-$V_{dd}$ assignment algorithm for MCNC benchmarks 85% of used interconnect switches and 75% of used logic blocks are assigned to $V_{ddL}$ without increasing the circuit delay. This shows that circuits implemented in a single $V_{dd}$ FPGA can have large amount of surplus timing slack, and intuitively justifies that the application of programmable dual-$V_{dd}$ to both interconnects and logic blocks can greatly reduce FPGA power. Certainly, power evaluation needs to be performed to obtain the power reduction considering the power overhead of level converters. The results presented in the rest of this section all consider power and delay impact of programmable dual-$V_{dd}$ and level converters.

Figure 26:
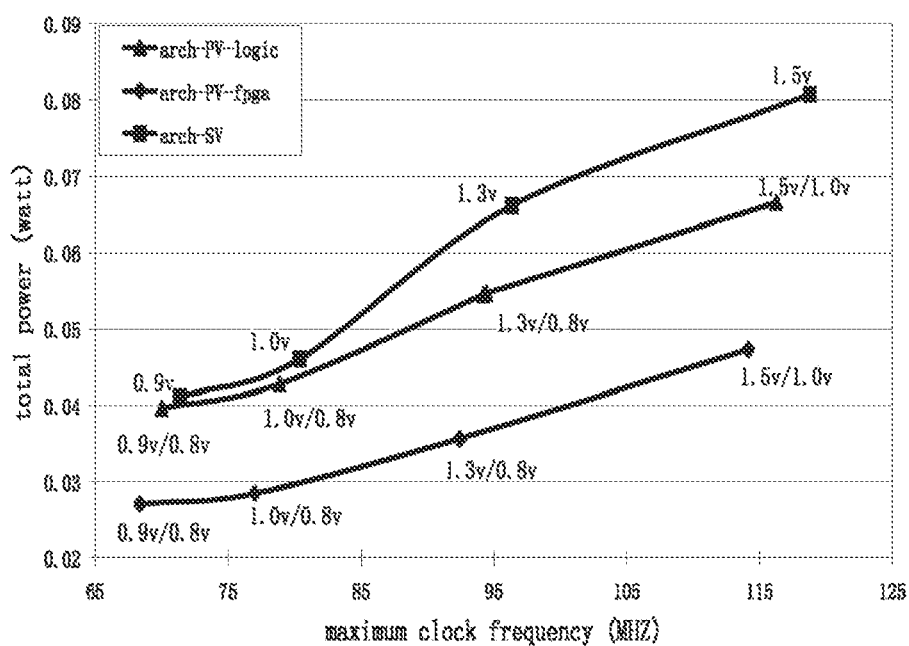
FIG. 26 is a graph of a power versus performance curve for the combinational benchmark FPGA circuit alu4 according to an aspect of the present invention.
Figure 27:
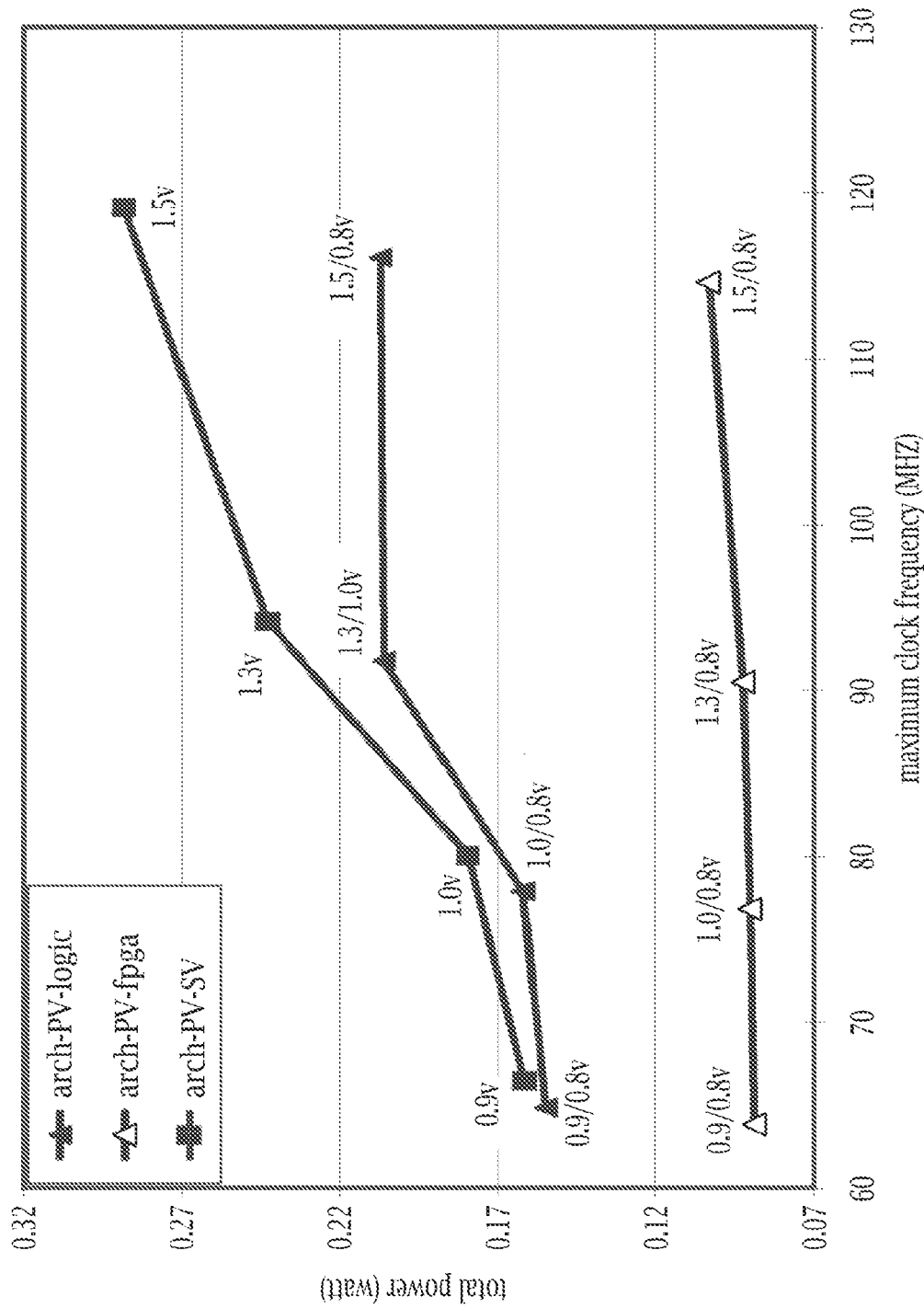
FIG. 27 is a graph of a power versus performance curve according to an aspect of the present invention for the sequential benchmark FPGA circuit s38584.

FIG. 26 and FIG. 27 provide architecture comparisons of power and performance for aspects of arch-PV in relation to arch-SV for combinatorial circuits (i.e., combinational benchmark alu4) sequential circuits (i.e., sequential benchmark s38584). The X axis of these graphs is the maximum clock frequency decided by the critical path delay. The Y axis is the total FPGA power consumption. There are three curves in each figure, corresponding to FPGA architectures arch-SV, arch-PV-logic and arch-PV-fpga. For arch-SV, we present the power and performance trend as we scale down $V_{dd}$ for the entire FPGA. The $V_{dd}$ level is labeled beside each data point. When comparing two adjacent data points of arch-SV, e.g. $V_{dd}$=1.5 v and $V_{dd}$=1.3 v, one can see that the maximum clock frequency ability is degraded significantly when the $V_{dd}$ is reduced. For arch-PV-logic and arch-PV-fpga, we try different $V_{ddH}/V_{ddL}$ combinations and obtain all the data points. After the inferior data points (i.e., those with larger power consumption and lower maximum clock frequency) are pruned, the remaining solutions give the spectrum of power performance trade-off using different $V_{ddH}/V_{ddL}$ combinations. We also label the $V_{ddH}/V_{ddL}$ combination for each data point in both figures. Compared to arch-SV with $V_{ddH}$ as the uniform supply voltage, the performance degradation in dual-$V_{dd}$ architectures (arch-PV-logic or arch-PV-fpga) is negligible. The lack of impact is because we select $V_{ddH}$ for devices on critical paths to maintain performance but reduce power significantly by selecting $V_{ddL}$ for devices on non-critical paths.

Compared to arch-PV-logic with $V_{dd}$-programmability only for logic blocks, our fully $V_{dd}$-programmable architecture arch-PV-fpga reduces total FPGA power by a larger margin (see FIG. 26 and FIG. 27). This significant improvement is due to the much reduced interconnect power in our new fabric. The power saving by both arch-PV-logic and arch-PV-fpga decreases at lower clock frequency. It is because that lower clock frequency generally implies lower supply voltage and therefore less timing slack can be utilized for power optimization. In addition, the power performance curve is relatively flat for sequential circuit s38584 because it is a much larger circuit than alu4 and therefore has more timing slack to achieve a larger power reduction in dual-$V_{dd}$ optimization.

Considering power dissipation at the highest clock frequency, we present the complete evaluation results for MCNC benchmark set in Table 14. For each circuit, we choose the highest clock frequency achieved by arch-PV-fpga under all $V_{ddH}/V_{ddL}$ combinations and present the corresponding power saving at that clock frequency. The power consumption for the baseline arch-SV is presented in columns 23, and the power saving by arch-PV-logic from is shown in column 4 for the purpose of comparison. For our fully $V_{dd}$-programmable architecture arch-PV-fpga, we present the results of both one bit control and two bit control implementations. The one bit control only provides $V_{dd}$ selection but the two bit control has the additional power gating capability. Compared to arch-SV, our fully $V_{dd}$-programmable fabric with one-bit control achieves an average of 22.21% total power reduction. The power reduction ratio increases to 50.55% when two-bit control is used. The extra power saving (on average 32% of total interconnect power saving) is obtained via power gating of unused logic blocks and interconnect switches. In contrast, arch-PV-logic reduces total FPGA power merely by 14.29% because it provides $V_{dd}$-programmability only for logic blocks. We further present the interconnect power saving by our arch-PV-fpga with two-bit control in Table 15, in which column 2 is the interconnect power and column 3 is the percentage of interconnect leakage power among total interconnect power. It can be seen that this circuit reduces interconnect leakage power by 80.14% (see column 5) and reduce interconnect dynamic power by 38.81% (see column 6). The interconnect leakage power reduction is mainly obtained by power gating a large number of unused interconnect switches.

We have shown that interconnect power reduction is the key to reduce FPGA total power. We have described embodiments of $V_{dd}$-programmable interconnect circuits and fabrics which significantly reduce interconnect power. There are three states for our interconnect switches: high $V_{dd}$, low $V_{dd}$ and power gating. We developed a simple design flow to apply high $V_{dd}$ to critical paths and low $V_{dd}$ to non-critical paths and to power gate unused interconnect switches. We performed a highly quantitative study by placing and routing benchmark circuits in 100 nm technology. Compared to single $V_{dd}$ FPGAs with $V_{dd}$ level optimized for the same target clock frequency, our new fabric with power gating capability reduces FPGA interconnect power by 56.51% and total FPGA power by 50.55%. In contrast, the previous configurable dual-$V_{dd}$ techniques used only for logic blocks reduces total FPGA power merely by 14.29%. Because of the extremely low utilization rate of interconnect switches. (12% in our profiling using MCNC benchmarks), power gating reduces total FPGA interconnect power by 32%. We use the smallest FPGA array that just fits a given circuit for placement in our experiments. In reality, the FPGA chip size can be significantly larger than that needed by the application circuit. Therefore, power gating of unused interconnect switches can provide greater power reductions in general. Power supply network to support configurable $V_{dd}$ or dual-$V_{dd}$ can introduce extra routing congestion.

4. Routing Track Duplication with Fine-Grained Power-Gating.

The aforementioned work mainly focuses on logic block power reduction, but the total power reduction is not optimized. For example, when configurable dual-$V_{dd}$ is applied to logic blocks the logic and local interconnect power is reduced by 37.94% but the total FPGA power is reduced only by 14.29%. Therefore, global interconnect is a major focus of our FPGA power reduction efforts described herein. Aspects of the invention described in previous sections introduced extending programmable $V_{dd}$ to individual FPGA interconnect switches to achieve significant total power reductions. However, a large transistor area overhead is associated with the use of fine-grained $V_{dd}$-programmable interconnections. The $V_{dd}$-programmable routing switch described in a previous section requires two power switches, one configurable level converter and extra configuration SRAM cells.

One aspect of the invention was that of introducing programmable fine-grained power gating for interconnects without adding extra SRAM cells. We design a novel circuit using the existing SRAM cell in the conventional tri-state buffer to program power gating. In addition the number of power switches is reduced almost by half for the same channel width because we only provide power gating capability. This fine granularity obtains the largest leakage power reduction, equivalent to the total power reduction of 38.18% for the FPGA in 100 nm technology, but without introducing any extra routing constraint. Furthermore, the low leakage interconnect enables interconnect dynamic power reduction.

Another aspect of the invention is that of designing a routing channel containing abundant or duplicated routing tracks with 50% using high $V_{dd}$ ($V_{ddH}$) and other 50% using low $V_{dd}$ ($V_{ddL}$) respectively, and develop routing algorithm using $V_{ddL}$ for non-critical routing to reduce dynamic power. The track-duplicated routing channel has small leakage power by using fine-grained power gating and increases the FPGA power reduction to 45.00%. It is significantly higher than the total power reduction of 14.29% as described in a previous section where only the power of logic blocks is reduced.

The following considers leakage power reductions. It should first be understood that interconnects are the largest area and power consumer in FPGAs, referring back to FIG. 23A which showed the traditional island style routing architecture, in which the logic blocks are surrounded by routing channels consisting of wire segments. There is a routing switch block at each intersection of a horizontal channel and a vertical channel. Some of the wire segments incident to a switch block can be connected together to form longer connections by programming the routing switches in the switch block. The input and output pins of a logic block can be connected to the wire segments in the surrounding channels via a connection block. The switch block flexibility $F_s$ is defined as the number of outgoing tracks to which an incoming track can be connected. This can be seen in FIG. 23C which presented a switch with $F_s=3$. The connection pattern relating the incoming track and three outgoing tracks defines the switch block type. The switch block in FIG. 23C is a subset switch block. The incoming track can be only connected to the outgoing tracks with the same track number. The connections in a switch block (i.e., the dashed lines in FIG. 23C) are programmable routing switches. A routing switch as in FIG. 23D can be implemented by a tri-state buffer and each connection needs two tri-state buffers to be programmed for either direction.

Another type of routing resource is the connection block (see FIG. 23B). The multiplexer based implementation chooses only one track in the channel and connects it to the logic block input pin. The tri-state buffers between the routing track and the multiplexer are connection switches. The utilization rate of FPGA interconnect switches is extremely low. As shown in Table 16, the average utilization rate for MCNC benchmark suite is only 11.90%. Note that for each given benchmark, we use the smallest FPGA array that just fits the circuit for placement. In reality, the chip size can be significantly larger than necessary for a given circuit, and the utilization rate can be even lower. Due to this extremely low utilization rate for interconnect switches, a large portion of the interconnect leakage power is consumed by those unused interconnect switches. We develop novel FPGA interconnects with fine-grained power gating to reduce leakage power for unused interconnect switches.

Figure 28A:
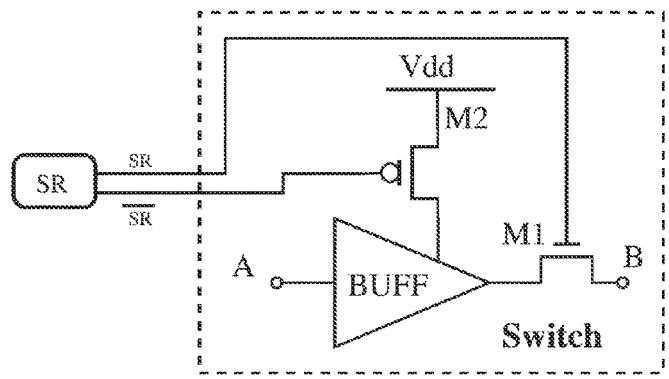
FIG. 28A is a schematic of a power-gating capable switch according to an aspect of the present invention.
Figure 28B:
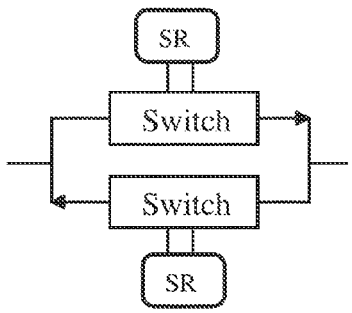
FIG. 28B is a schematic of power-gating capable routing switches according to an aspect of the present invention.
Figure 28C:
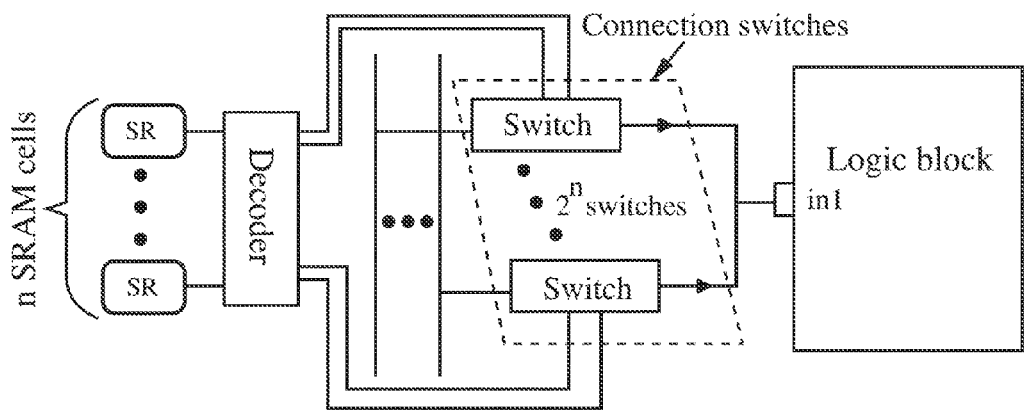
FIG. 28C is a schematic of power-gating capable connection switches according to an aspect of the present invention.

FIG. 28A through FIG. 28C illustrate power gating according to this aspect of the invention in which FPGA interconnects are described utilizing fine-grained power gating. The granularity of the FPGA interconnects to apply power gating is individually programmable with a switch (e.g., routing switch or connection switch). FIG. 28A shows the circuit design for a power gating capable switch. Based on a conventional tri-state buffer, a PMOS transistor M2 is inserted between the power rail and the tri-state buffer for power gating. When a switch is not used, transistor M1 is to be turned off by the SRAM cell SR. At the same time, M2 can be turned off to perform power gating for the unused switch. Similarly, both M1 and M2 are to be turned on by the SRAM cell SR when the switch is used. Thus, an extra SRAM cell for power gating does not need to be introduced.

FIG. 28B is depicted the power gating capable routing switches according to this embodiment of the invention. The SPICE simulation shows that power gating of the routing switch can achieve leakage power reduction by a factor of over 300. There is delay overhead associated with the M2 insertion in series. Transistor M2 is sized for the tri-state buffer to achieve a bounded delay increase compared to a normal tri-state buffer. As shown in Table 17, delay increase bound of 6% is achieved by using 25× minimum width transistor M2. We also show the dynamic power in energy per signal switch for both conventional routing switch and our new routing switch. Because M2 is always ON when the routing switch is used and no charging or discharging occur at its source/drain capacitors, the power overhead due to transistor M2 is almost negligible. Similarly, power gating is also applied to connection switch to reduce leakage power.

FIG. 28C shows the design of power gating capable connection switches. We only need n SRAM cells to control 2 n connection switches in a connection block via a decoder and provide power gating capability for connection switch. Note that a power gated switch has virtually no leakage in either routing or connection switches.

Tests were conducted for the MCNC benchmark suite compare three architectures, arch-SV, arch-PV and arch-PVPG. Architecture arch-SV represents single $V_{dd}$ scaling for the conventional FPGA. It scales down the supply voltage $V_{dd}$ as well as the transistor threshold voltage $V_t$ for the entire FPGA, and achieves power reduction at the cost of performance degradation. arch-PV is the FPGA architecture using programmable dual-$V_{dd}$ for logic fabric. Architecture arch-PVPG is our new architecture that uses the same logic fabric as and further uses power gating capable interconnects. Table 18 presents the experimental results. For each circuit, we choose the largest clock frequency achieved by arch-PVPG under all $V_{ddH}/V_{ddL}$ combinations and present the corresponding power saving at that clock frequency. The power consumption for the baseline arch-SV is presented in column 1, and the power saving by arch-PV in is shown in column 2 for the purpose of comparison. As shown in column 3, our arch-PVPG achieves 38.18% total power saving on average compared to arch-SV, In contrast, arch-PV in reduces total FPGA power only by 14.29% because it only reduces FGPA logic power.

The dual-$V_{dd}$ technique of the invention makes use of the circuit timing slack to minimize dynamic power. High $V_{dd}$ ($V_{ddH}$)) is applied to devices on the critical paths to maintain the performance while low $V_{dd}$ ($V_{ddL}$) is applied to devices on non-critical paths to reduce power. It should be recognized that most FPGA applications have a substantial amount of surplus timing slack. Dual-$V_{dd}$ architectures may be applied to FPGA interconnect fabric to leverage the surplus timing slack to reduce interconnect dynamic power.

Figure 29:
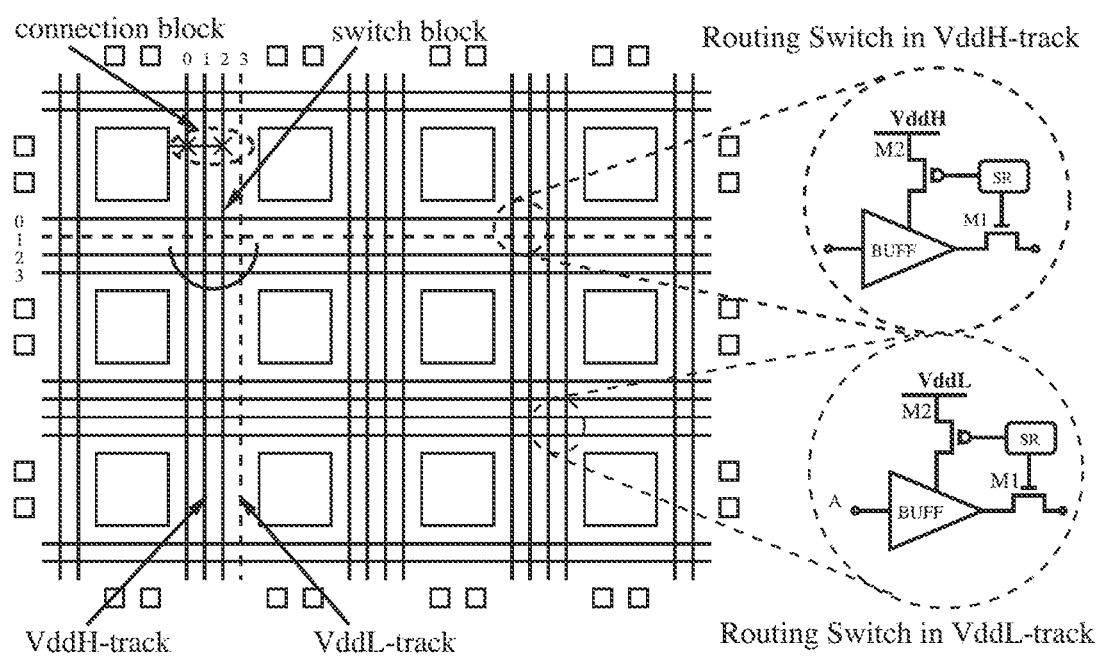
FIG. 29 is a schematic of island routing as a dual-$V_{dd}$ FPGA routing architecture according to an aspect of the present invention.

FIG. 29 illustrates an example embodiment of our predetermined dual-$V_{dd}$ FPGA routing architecture. The routing channel is partitioned into $V_{ddH}$ and $V_{ddL}$ regions. We use $V_{ddH}$-track and $V_{ddL}$-track to denote the track in $V_{ddH}$ and $V_{ddL}$ regions respectively. The same circuit design for interconnect switches from the earlier section is used in the dual-$V_{dd}$ routing architecture. The only difference between a routing switch in $V_{ddH}$-track and that in $V_{ddL}$-track is the $V_{dd}$ level. The ratio between number of tracks in $V_{ddH}$ and $V_{ddL}$ regions is an architectural parameter. To apply dual-$V_{dd}$ to FPGA interconnects, we need to perform a dual-$V_{dd}$ assignment and decide the $V_{dd}$ level of each circuit element. A routing tree includes driving logic block, driven logic blocks, wire segments and connection/routing switches which connect logic blocks. Subset switch blocks are used in this section. As the incoming track can be only connected to the outgoing tracks with the same track number via a subset switch block, a $V_{ddH}$ track can never be connected to a $V_{ddL}$-track. No level converter is needed in switch blocks. Therefore a routing tree provides a natural granularity in dual-$V_{dd}$ assignment as we do not need to change $V_{dd}$ level inside the routing tree. Table 19 shows that an average of 54.54% routing trees can be assigned with $V_{ddL}$ without degrading system performance if there is no layout constraint, i.e., we have the freedom to decide $V_{dd}$ level of each routing tree. The ratio between $V_{ddH}$ and $V_{ddL}$ routing trees without considering layout constraint is close to 1:1, which reflects the roughly equal demand for $V_{ddH}$ and $V_{ddL}$ routing resources. We decide the percentage of $V_{ddH}$-tracks and $V_{ddL}$-tracks in FPGA routing channel for this embodiment to be approximately 50%, respectively.

A new design flow is developed for the invention to leverage the fixed dual-$V_{dd}$ interconnect FPGA fabric. A single $V_{dd}$ gate level net list is given as the input. Technology mapping is applied and timing driven packing to obtain the single $V_{dd}$ cluster level net list. A single $V_{dd}$ timing driven placement and routing by VPR is then performed and the basic circuit net list (BCnet list) is generated. A sensitivity-based $V_{dd}$ assignment algorithm is also preferably used to obtain a dual-$V_{dd}$ assignment BCnet list. Voltage $V_{ddH}$ or $V_{ddL}$ is assigned to each routing tree without consideration of layout constraint. Power sensitivity $\Delta P/\Delta V_{dd}$ with respect to supply voltage is calculated for the routing tree. The total FPGA power P includes both switching power $P_{sw}$ and leakage power $P_{lkg}$. For each node i, we have switching power $P_{sw}(i)= 0.5f \cdot \hat{E}_i \cdot C_i \cdot V_{dd}^2$ (as per Eq. 1 from a previous section), where $\hat{E}_i$ is the effective transition density considering glitches and $C_i$ is the load capacitance. Leakage power is given by $P_{lkg}(i)= I_{lkg}(V_{dd}) \cdot V_{dd}$. We pre-characterize $I_{lkg}$ and device delay at each $V_{dd}$ level using SPICE simulation. After the dual-$V_{dd}$ assignment, we have two different design paths. If the channel width is set to 2.0W, where W is the nominal channel width to route the benchmark circuit successfully, then the dual-$V_{dd}$ assignment for routing trees is always feasible given there is enough $V_{ddH}/V_{ddL}$ routing resources. It should be noted that we define nominal routing channel width W in this section as 1.2× minimum channel width using configurable dual-$V_{dd}$ for all logic blocks, and the placement algorithm does not need to consider layout constraints.

The dual-$V_{dd}$ BC net list with this feasible $V_{dd}$ assignment is generated and simulated to obtain the power and delay. An FPGA evaluation package is created based on fpga Eva-LP which is configured for our power and delay evaluation. When the channel width in dual-$V_{dd}$ architecture is less than 2.0W, layout pattern constraint applies because we may not have sufficient $V_{ddH}$ and $V_{ddL}$-tracks. The corresponding design path goes through an additional step of dual-$V_{dd}$ routing. We develop our dual-$V_{dd}$ routing based on the timing driven routing algorithm in VPR. A directed routing resource graph is constructed to perform global and detailed routing. Logic block pins and wire segments are modeled as vertices and potential connections, such as connection/routing switches being modeled as edges in the routing resource graph.

To route a k terminal net, a wave expansion algorithm is invoked k−1 times to connect the net source to each of the net's k−1 sinks in the order of non-increasing criticality. The neighbors of wire vertex with minimum cost at the wave front will be expanded first. The cost TotalCost(n) of routing net T through wire segment n to the target sink j is given by the following relation.

$$\text{TotalCost}(n) = \text{PathCost}Dv(n) + \alpha \cdot \text{ExpectedCost}Dv(n, j) + \beta \cdot \text{Matched}(T, n) \quad (7)$$

where PathCostDv(n) is the total cost of the path from the current partial routing tree to wire segment n and ExpectedCostDv(n,j) is the estimated total remaining cost from the current wire segment n to the target sink j. PathCostDv(n) and ExpectedCostDv(n,j) are modified from PathCost(n) and ExpectedCost(n,j) in VPR with consideration of dual-$V_{dd}$ architecture according to the present invention. Function Matched(T,n) is a Boolean function describing the $V_{dd}$ matching state of a net T on the wire segment n and is defined by the following.

$$\text{matched}(T, n) = \begin{cases} 1 & V_{ddL} \text{ net } T \text{ is routed on } V_{ddL} \text{ wire } n \\ 1 & V_{ddH} \text{ net } T \text{ is routed on } V_{ddH} \text{ wire } n \\ 0 & \text{Otherwise} \end{cases}$$

If the $V_{dd}$ assigned to net T matches the $V_{dd}$ at its physical wire segment n, Matched(T,n) returns value '1'; otherwise, it returns '0'. Weights α and β are determined experimentally for better power performance trade-off. The experimental result is discussed in the following.

These portions of the invention were tested on the MCNC benchmark set to compare four architectures, arch-SV, arch-PV, arch-PVPG and arch-DVPG, where arch-DVPG is the architecture using configurable dual-$V_{dd}$ for logic blocks and predetermined dual-$V_{dd}$ interconnect fabric with power gating capability.

Figure 30:
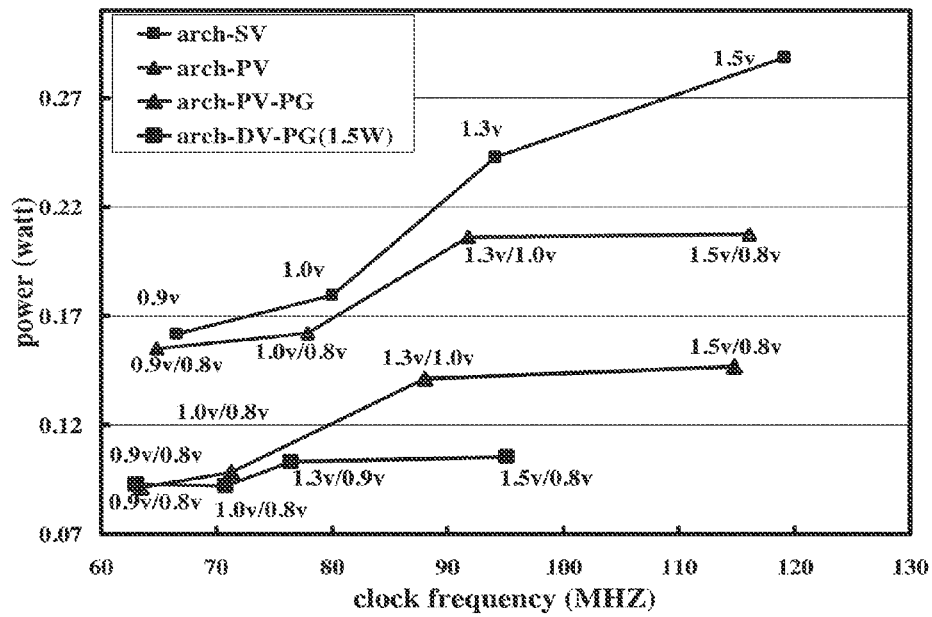
FIG. 30 is a graph of power versus performance according to an aspect of the present invention for benchmark FPGA circuit s38584.

FIG. 30 illustrates by way of example a comparison of the architectures for evaluating power and delay results for benchmark circuit s38584. The X axis of the graph is the maximum clock frequency and the Y axis represents the total power. The four curves presented in the figure correspond to FPGA architectures arch-SV, arch-PV, arch-PVPG and arch-DVPG. We always use nominal channel width 1.0W for arch-SV, arch-PV and arch-PVPG. The use of conventional routing architecture and the nominal channel width within the embodiments of these three architectures has provided a beneficial power performance trade-off.

For our predetermined dual-$V_{dd}$ routing architecture arch-DVPG presented in FIG. 30 a channel width 1.5W was selected to provide sufficient $V_{ddH}$ and $V_{ddL}$ routing resources. Comparing these two low leakage interconnect architectures arch-PVPG and arch-DVPG, it is clear that we can further reduce FPGA power consumption by using dual-$V_{dd}$ interconnect with abundant routing resources. By increasing the channel width to 2.0W for arch-DVPG, we can further reduce the total FPGA power due to the increased $V_{dd}$-matched rate for routing trees. The gap between power performance curve arch-DVPG and arch-PVPG decreases at lower clock frequency. It is because that lower clock frequency generally implies lower supply voltage and therefore less timings lack can be utilized for power optimization.

For our dual-$V_{dd}$ architecture arch-DVPG, we present the complete evaluation results for MCNC benchmark set in Table 20. For each circuit, we choose the largest clock frequency achieved by arch-DVPG under all $V_{ddH}/V_{ddL}$ combinations and present the corresponding power saving at that clock frequency. The power consumption by the baseline arch-SV is presented in column 1, and the power saving by arch-PV from is shown in column 2 for the purpose of comparison. The power saving by arch-DVPG with channel width 2.0W is presented in column 5. We have already taught that arch-PVPG can achieve average total power reduction of 38.18%, and by using routing track duplication with fine-grained power gating, arch-DVPG can achieve total power reduction of 45.00%. In contrast, arch-PV reduces total FPGA power only by 14.29% because it only reduces FGPA logic power by $V_{dd}$-programmability for logic blocks.

Figure 31:
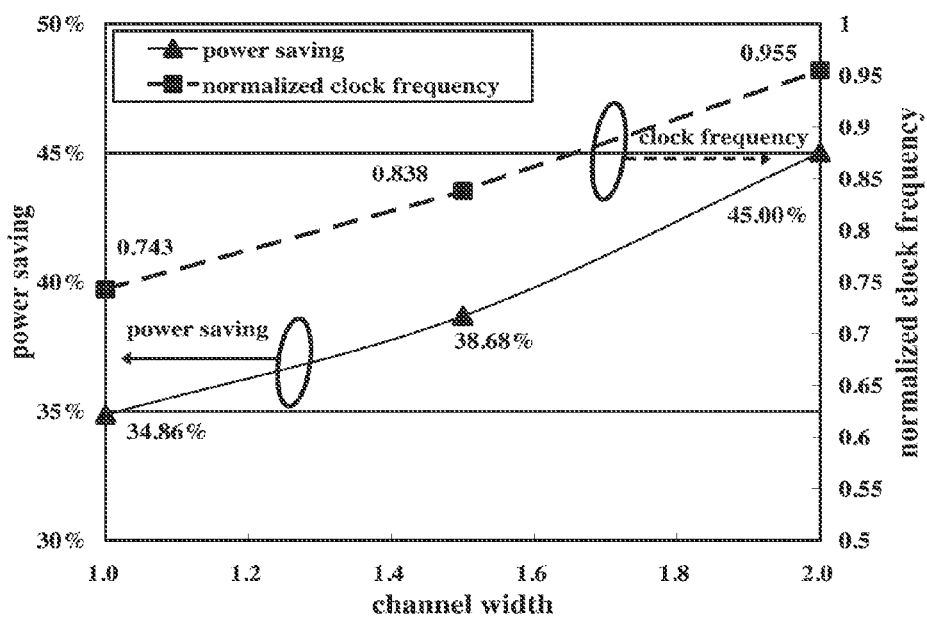
FIG. 31 is a graph of power reduction and normalized clock frequency versus channel width for arch-DVPG ($V_{ddH}$=1.5V) according to an aspect of the present invention.

FIG. 31 illustrates by way of example power reduction for different channel widths for our new architecture arch-DVPG. The X axis of FIG. 31 is the channel width, and the right Y axis is the clock frequency achieved by arch-DVPG using the best $V_{ddH}/V_{ddL}$ combination normalized to the maximum clock frequency at single $V_{dd}$. The left Y axis is the total power reduction at that clock frequency compared to baseline arch-SV. There are two curves in the figure. The upper curve presents the normalized clock frequency with arch-DVPG. The normalized clock frequency is around 0.743 with 1.0× channel width, increases to 0.838 with 1.5× channel width and further increases to more than 0.955 with 2.0× channel width.

It can be seen that the system maximum clock frequency is subject to improvement by providing more routing tracks for $V_{dd}$ matched routing trees. It is because the number of $V_{dd}$ matched routing trees increases, as well as the number of routing detours, that the $V_{dd}$ level reduces as channel width increases. Normalized clock frequency '1' is not readily achieved due to the overhead of configurable dual-$V_{dd}$ logic blocks and switches with power gating capability. The lower curve presents the power saving with arch-DVPG. The average total power saving ratio is 34.86% with 1.0× channel width, and increases to 38.68% with 1.5× channel width and 45.00% with 2.0× channel width. It can be seen that the total power saving also increases with increased channel width. The improved total power reduction is principally in response to the improved interconnect dynamic power reduction.

Table 20 presents the total power saving as well as power saving breakdown with channel width 1.0W, 1.5W and 2.0W for arch-DVPG in column 35. The interconnect dynamic power saving is 11.48% with channel width 1.0W, i.e., we cannot achieve interconnect dynamic power saving at the same clock frequency without increasing channel width. It is because that there is not sufficient tracks for $V_{dd}$ matched routing trees and the system performance degrades 25.7% with channel width 1.0W. The interconnect dynamic power saving increases to 9.78% with channel width 1.5W and 24.78% with 2.0W. By providing more tracks for $V_{dd}$ matched routing trees, we can achieve more interconnect dynamic power saving due to the increase of $V_{dd}$ matched rate for routing trees and the clock frequency. In general, the increase of channel width will introduce more unused interconnect switches and result in more leakage consumption.

As shown in Table 20, the interconnect leakage power reduction is 83.42% with channel width 1.0W and slightly decreases to 81.56% with 1.5W and 79.69% with 2.0W. It should also be noted that the interconnect leakage power reduction is only slightly decreased in response to channel width increases. By applying power gating techniques to our dual-$V_{dd}$ FPGA interconnect fabric, we can achieve interconnect dynamic power saving and control leakage at the same time. The track duplicated dual-$V_{dd}$ channel with fine-grained power gating achieves the best total FPGA power reduction.

Routing track duplication increases the routing area and further amplifies the area overhead due to sleep transistor insertion for fine-grained power gating. This section studies the total area overhead of $V_{dd}$ gateable interconnect fabric with routing track duplication. Assuming that two metal layers are available and the wires can be routed over the devices, the larger area of (a) routing wire area and (b) routing device area determines the final routing area. Channel width, wire width and spacing are used to decide the routing wire area. Table 22 shows the wire width and spacing that we use for 100 nm technology. To obtain the device area in square microns, the same area model is used in VPR to get the number of minimum width transistor areas and multiply it by the square microns per minimum width transistor in 100 nm technology.

For all benchmark circuits, we have found that the routing device area is larger than the routing wire area. Previous work also showed that the area of typical commercial FPGAs is dominated by device area. Therefore, total FPGA area is calculated as the sum of routing device area and logic device area. The total FPGA area is compared for different FPGA architectures in Table 21. As the routing channel width increases, the area overhead for our arch-DVPG increases from 57% to 186%.

The use of fine-grained $V_{dd}$-programmable FPGA interconnects have been described to provide $V_{dd}$ selection and power gating to reduce both interconnect dynamic and leakage power. Compared to those teachings, our $V_{dd}$ gateable interconnect with routing track duplication (i.e., channel width 2.0W) also reduces both leakage and dynamic power, but it is subject to less area overhead (refer to columns 5 and 6 in Table 21). The reduced area overhead arises because fine-grained $V_{dd}$-programmability requires two sleep transistors for each routing switch, one configurable $V_{dd}$ level converter before each routing switch and associated SRAM cell for configuration, but our arch-DVPG needs only one sleep transistor for each routing switch and no $V_{dd}$ level converters in routing channels since only power gating capability is provided. Because our $V_{dd}$ gateable interconnect architecture does not have the leakage overhead of level converters, it achieves larger total power saving compared to $V_{dd}$-programmable interconnect architecture, for example 45% by our $V_{dd}$ gateable interconnect architecture as compared with 26% by $V_{dd}$ prommable interconnect architecture as verified by the power model in this section.

It has been shown in this section that interconnect power is the bottleneck of reducing total FPGA power. Because the FPGA interconnect circuit has an extremely low utilization rate (~12%) for the purpose of programmability, we designed area efficient circuits for fine-grained power gating of interconnects without introducing extra configuration cells to program power gating. Each unused interconnect switch is power gated to reduce total FPGA power by 38.18% compared to the case without power gating. Furthermore, the low leakage interconnects enable interconnect dynamic power reduction. A routing channel embodiment was described containing abundant or duplicated routing tracks with predetermined high and low $V_{dd}$, and a corresponding dual-$V_{dd}$ routing algorithm developed using low $V_{dd}$ for non-critical routing to reduce interconnect dynamic power. The track duplicated channel with fine-grained power gating reduces interconnect dynamic power by 24.78% and total FPGA power by 45.00%, with an area overhead of 186%. In contrast, as verified by the power model in this section, the previous $V_{dd}$-programmable FPGA interconnect only reduces total FPGA power by 26% due to the large leakage overhead of $V_{dd}$ level converters in routing channels and has an area overhead of 220%. To further bring down the area overhead for our $V_{dd}$ gateable FPGA interconnect, we can reduce the size of the sleep transistors and increase $V_{dd}$ level to avoid performance losses.

5. Power Modeling and Architecture Evaluation for FPGA.

In this section, we improve the power model to achieve high accuracy and fidelity and introduce new $V_{dd}$-programmable FPGAs within several architecture classes for $V_{dd}$-programmable FPGAs, which dramatically reduce the area overhead for $V_{dd}$-programmability. The effects of cluster and LUT sizes are examined for their effect on FPGA energy consumption and delay, and the power saving for our new $V_{dd}$-programmable architecture classes are evaluated in comparison to single-$V_{dd}$ FPGAs.

Figure 32A:
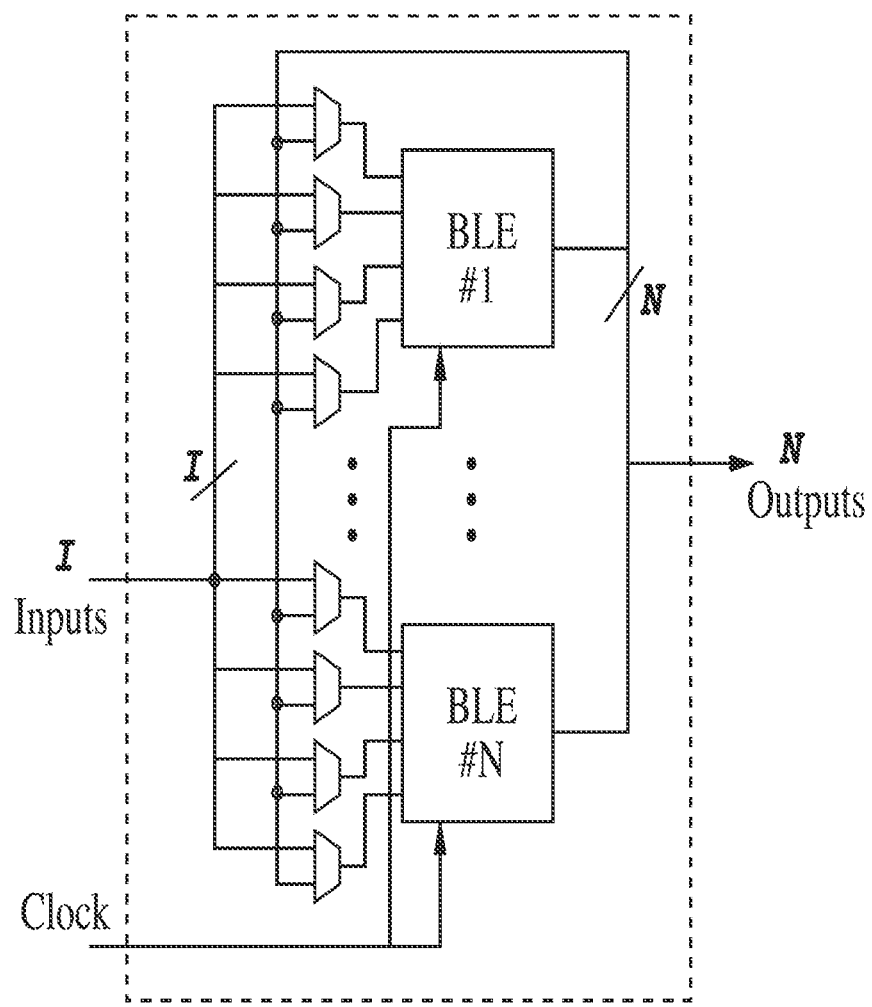
FIG. 32A-32B are schematics of an FPGA logic block and basic logic element according to an aspect of the present invention.
Figure 32B:
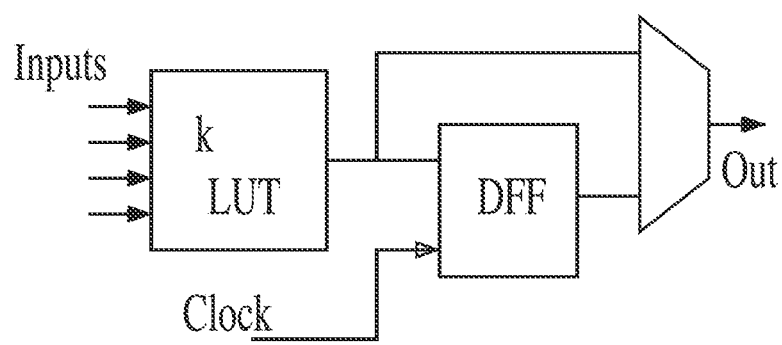

FIGS. 32A, 32B illustrate cluster-based FPGA aspects according to the invention. In this section, the FPGA is considered to follow a cluster based island style architecture for all classes of FPGAs. FIG. 32A shows the cluster based logic block, which includes N fully connected Basic Logic Elements (BLEs). FIG. 32B illustrates an example in which each BLE includes one k input lookup table (LUT) and one flip-flop (FF), for example a data FF (D-FF). The combination of cluster size N and LUT size k are the architectural parameters we evaluate in this section. The routing structure is of the island style previously described in FIG. 23A-FIG. 23D. It can be seen from those figures the logic blocks are surrounded by routing channels consisting of wire segments. The input and output pins of a logic block can be connected to the wire segments in the channels via a connection block (see FIG. 23B). A routing switch block is located at the intersection of a horizontal channel and a vertical channel. FIG. 23C shows a subset switch block in which the incoming track can be connected to the outgoing tracks with the same track number. The connections in a switch block (represented by the dashed lines in FIG. 23C are programmable routing switches. Routing switches are implemented by tri-state buffers and use two tri-state buffers for each connection so that it can be programmed independently for either direction. The routing channel width W is decided in the same way as the architecture study, i.e., W=1:2 $W_{min}$ and $W_{min}$ is the minimum channel width required to route the given circuit successfully.

Two FPGA power evaluation frameworks have been proposed recently, and this section utilizes fpgaEVALP as the evaluation framework but improves its power model. Framework fpgaEVALP includes a BC-net list generator and a cycle accurate power simulator. The BC net list generator takes the VPR placement and routing result and generates the Basic Circuit net list (BC net list) annotated with post layout capacitances and delay. The power simulator then performs cycle accurate simulation on the BC net list to obtain FPGA power consumption. The mixed level power model in the power simulator applies switch level model to interconnects and macro model to Lookup Tables (LUTs).

Five circuits from the MCNC benchmark set are used for illustrating the accuracy and fidelity of the improved fpgaEVALP compared to SPICE simulation. The five circuits are chosen so that the circuit size is within the capability of SPICE simulation. They are mapped into 4-LUTs and packed into clusters with a cluster size of four. (Without loss of generality, we assume subset switch blocks are used in this section.)

Figure 33:
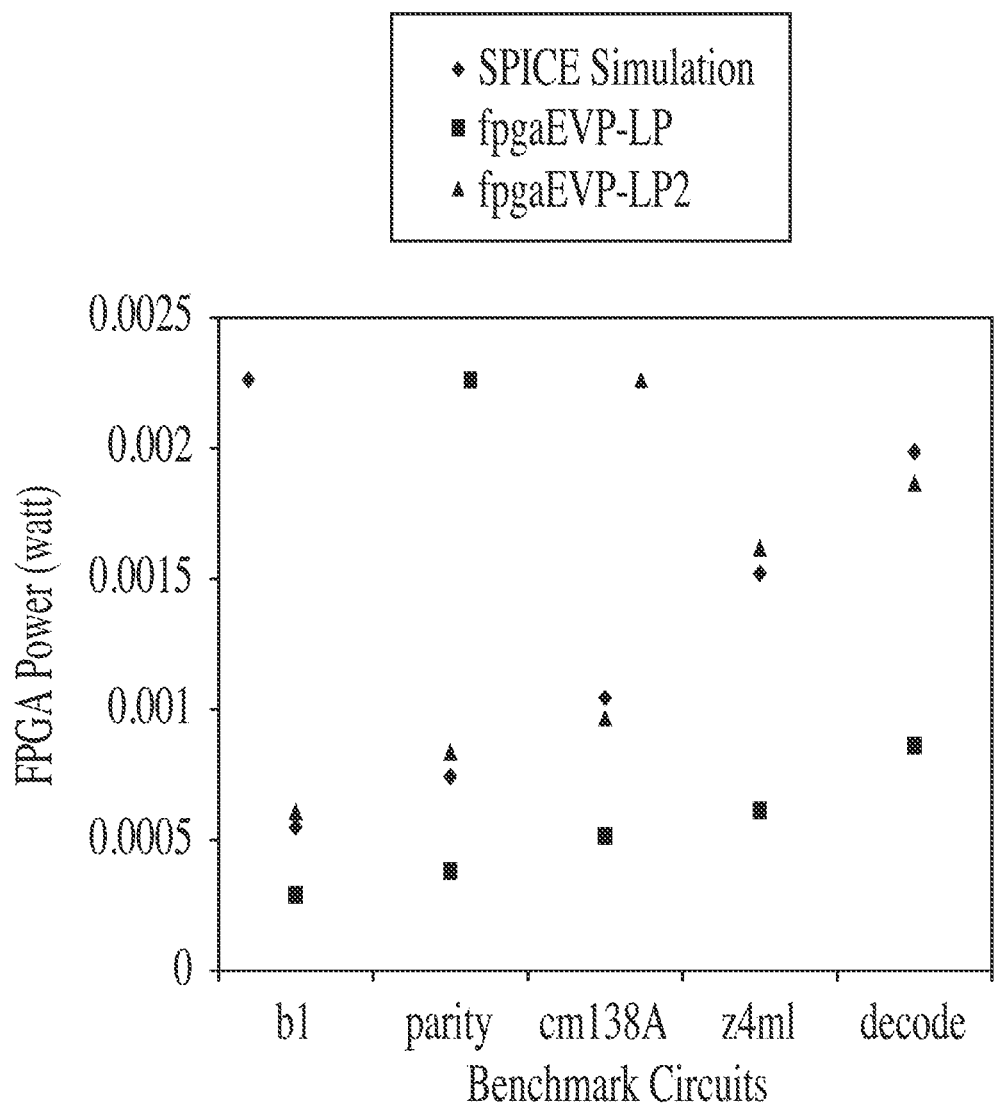
FIG. 33 is a graph comparing SPICE simulation and cycle-accurate power simulation for an embodiment of the present invention, showing that the new power model significantly improves accuracy and still achieves high density.

FIG. 33 illustrates a comparison between conventional fpgaEVA-LP simulation and fpgaEVA-LP2 enhanced simulation according to the present invention. According to this example, the largest circuit occupies six clusters and the smallest circuit occupies two clusters. As shown by the comparison in FIG. 33, fpgaEVALP with the original power model achieves high fidelity but consistently underestimates total FPGA power. In fpgaEVALP2 we have improved the power model. Previous research upon which fpgaEVALP was based made the assumption that the short circuit power of a routing buffer is a constant percentage of buffer switching power. In reality, a different signal transition time leads to different short circuit power. One set of prior research considered that short circuit power is proportional to the signal transition time for a given load capacitance, however, it considers only an average transition time wherein accuracy is compromised.

In one aspect of our embodiment, we have stored the relation between the percentage of short circuit power in buffer switching power and the signal transition time (under the Elmore delay model), and calculate the short circuit power value according to the signal transition time. Additionally, the prior work assumed that the output signal transition time is twice that of the buffer delay. This simplistic assumption was originally used in gate sizing and it is valid when the input signal is a step function and the output signal is a ramp function. In our model we use SPICE to simulate a typical routing path in an FPGA, where a routing switch drives a wire segment and other routing switches. The input signal is no longer a step function because it is from the output of a routing switch in the previous stage. The output signal under a large load capacitance, which is usually the case in FPGAs, is not a perfect ramp function and the 10%-90% transition time for the output signal can be significantly larger than twice of the buffer delay.

In theory, the output signal transition time $t_r$ can be expressed as $t_r = \alpha * t_{buffer}$ with $t_{buffer}$ as the buffer delay. We use SPICE simulations to determine the parameter $\alpha$ for different buffer delays, which covers the cases of various input signal transition time and different load capacitance. Table 23 presents the values of $\alpha$ decided by our experiments and used in fpgaEVALP2. Finally, our FPGA circuits only apply gate boosting to routing switches in the channels. The output of multiplexers in logic clusters can have a voltage level degradation and the local buffers at the multiplexer output will have larger leakage power. We modify the power model in fpgaEVALP so that it can also consider local multiplexers without gate boosting.

FIG. 33 compares SPICE simulation with fpgaEVALP2, which indicates that our model clearly still achieves high fidelity but improve accuracy significantly. The average of absolute error is 8.26% for the five test circuits. In this section, Berkeley predictive device model is used and ITRS predictive interconnect model for semi global interconnects at the 100 nm technology node. Table 24 summarizes the values of some key model parameters. The device and interconnect models are used throughout the rest of the section.

The following discusses evaluation methodology and results for the baseline architecture class. Our architecture evaluation methodology starts with VPR placement and routing results. For a given FPGA architecture and benchmark circuit, VPR can generate different placement and routing results by using different seeds in its placement algorithm.

Figure 34:
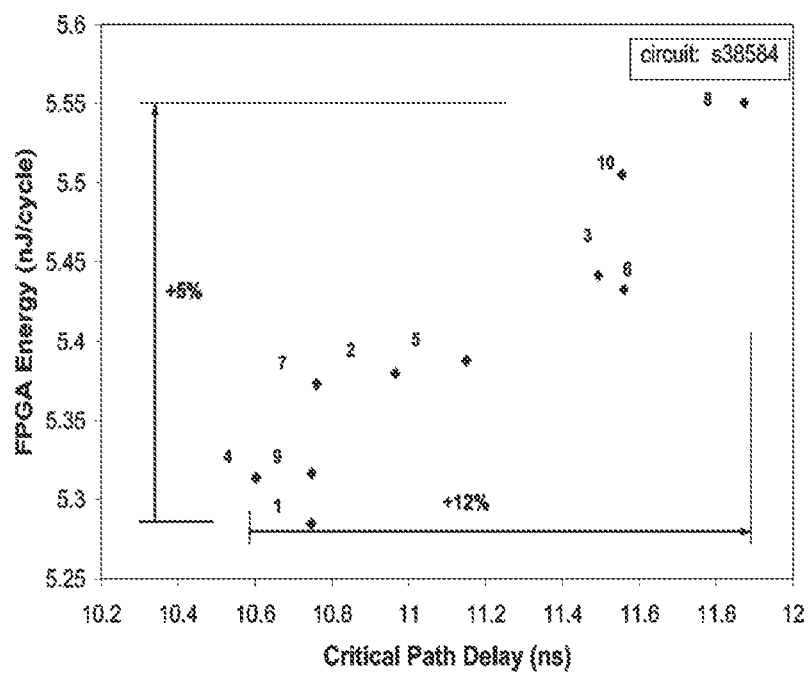
FIG. 34 is a graph of the impact of random seeds on FPGA energy and delay according to an aspect of the present invention.

FIG. 34 illustrates FPGA energy and delay using ten different VPR seeds for the same circuit s38584, labeled with seed values beside each data point. The delay variation was found to be 12% and the energy variation is 5%. This variation due to VPR seeds may affect architecture evaluation. Because the delay variation is more sensitive to the VPR seeds than the energy variation, it was decided to use the minimum delay solution among all VPR seeds for every benchmark circuit. Note that the minimum delay solution often consumes lower energy as well. For the architecture evaluation in this section, Energy (E), Delay (D) and Energy Delay Product (ED) are always the geometric mean of those values over 20 MCNC benchmark circuits.

Using the above methodology, architectures are evaluated for the single-$V_{dd}$ dual-$V_t$ FPGA architectures, also referred to herein as "FPGA Class 0". The entire FPGA uses the uniform supply voltage 1.3V, but high $V_t$ is applied to all the FPGA configuration SRAM cells to reduce SRAM leakage power. The high $V_t$ configuration cells do not incur runtime performance degradation because they are constantly in read status after an FPGA is configured, and their read and write are irrelevant to the run time performance. This high $V_t$ SRAM technique has already been used in commercial FPGAs.

Figure 35:
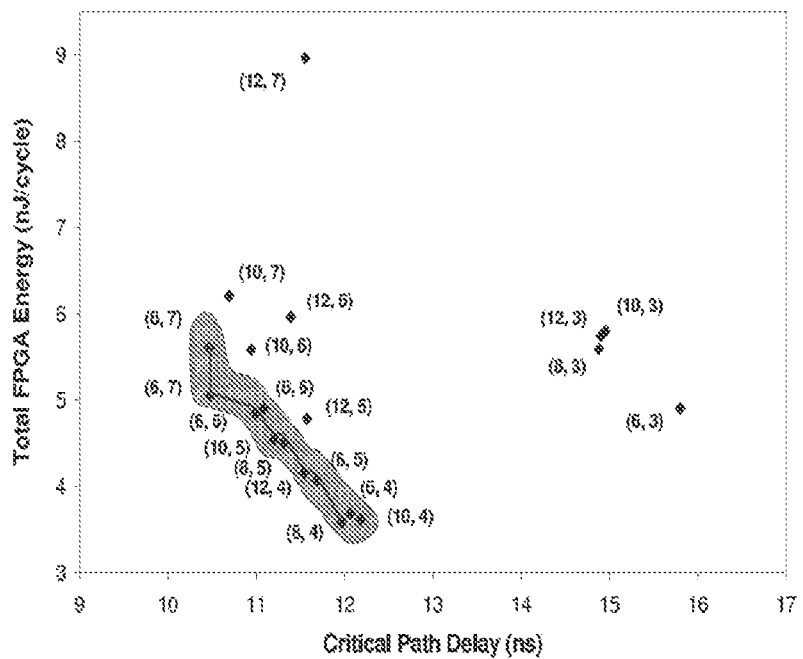
FIG. 35 is a graph of energy-delay trade-off or single-$V_{dd}$ dual-$V_t$ FPGA class (Class 0), with the polyline representing the strictly dominant architectures and the enclosed area covering the relaxed dominant architectures.

FIG. 35 presents the evaluation results for FPGA Class 0, with each data point in the figure being an FPGA architecture represented by a tuple (N; k), where N is the cluster size and k is the LUT size.

If one architecture (N1; k1) has smaller delay and less energy consumption than another architecture (N2; k2), we say that architecture (N1; k1) is superior to (N2; k2). We define strictly energy-delay dominant architectures as the set of superior data points in the entire energy delay trade-off space. Those architectures are highlighted by the polyline in FIG. 5. Our results also show that some of the architectures may have fairly similar energy and delay such as architectures (N=8; k=4), (N=6; k=4) and (N=10; k=4), and all of them can be valid real world solutions.

To avoid pruning out architectures with similar energy and delay, we further define relaxed energy-delay dominant architectures. If architectures (N1; k1) and (N2; k2) have both energy and delay difference less than r % (relaxation parameter), then neither of them can dominate the other one. With r=2 in this section, the relaxed dominant architectures are data points inside the enclosed curve in FIG. 5. Min-delay and min-energy architectures are the two extreme cases among those energy delay dominant architectures. The min delay architecture is (N=8; k=7) and the minimum energy architecture is (N=8; k=4) for the FPGA Class 0 in FIG. 35, and the energy and delay differences between the two extreme cases are 57% and 14%, respectively. These tests indicate that a significant trade-off between energy and delay can be obtained by varying cluster size and LUT size. Note that our minimum energy architecture (N=8; k=4) is also the minimum area architecture as found by others. Commercial FPGAs such as Xilinx VirtexII coincidentally use a cluster size of 8 and a LUT size of 4, and therefore their architectures may have used min-area solutions which resulted in a min-energy architecture in the single-$V_{dd}$ architecture class.

Supply $V_{dd}$-programmability has been introduced in previous sections as it applied to logic blocks to reduce FPGA power. In this section, $V_{dd}$-programmability is defined as the flexibility to select $V_{dd}$ levels for one used circuit element and the capability to power gate an unused circuit element. An embodiment of $V_{dd}$-programmable logic block was previously depicted in FIG. 14, comprising two extra PMOS transistors, called power switches, inserted between the conventional logic block and the dual-$V_{dd}$ power rails for $V_{dd}$ selection and power gating. The circuit can be further extended to provide programmable dual-$V_{dd}$ interconnect switches.

Figure 36A:
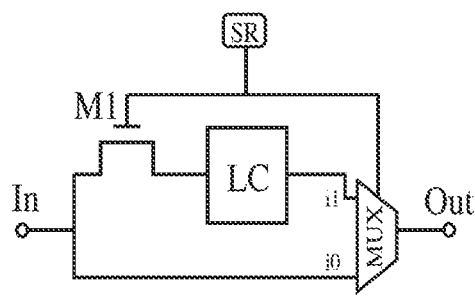
FIG. 36A is a schematic of configurable level conversion according to an aspect of the present invention.
Figure 36B:
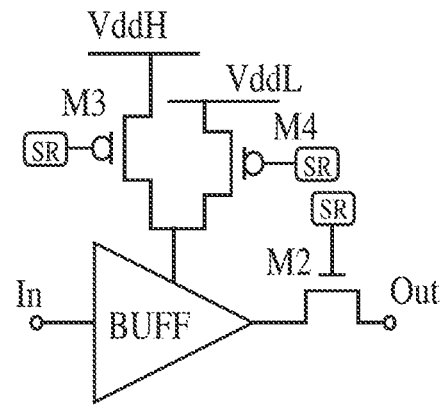
FIG. 36B is a schematic of $V_{dd}$-programmable routing switch according to an aspect of the present invention.
Figure 36C:
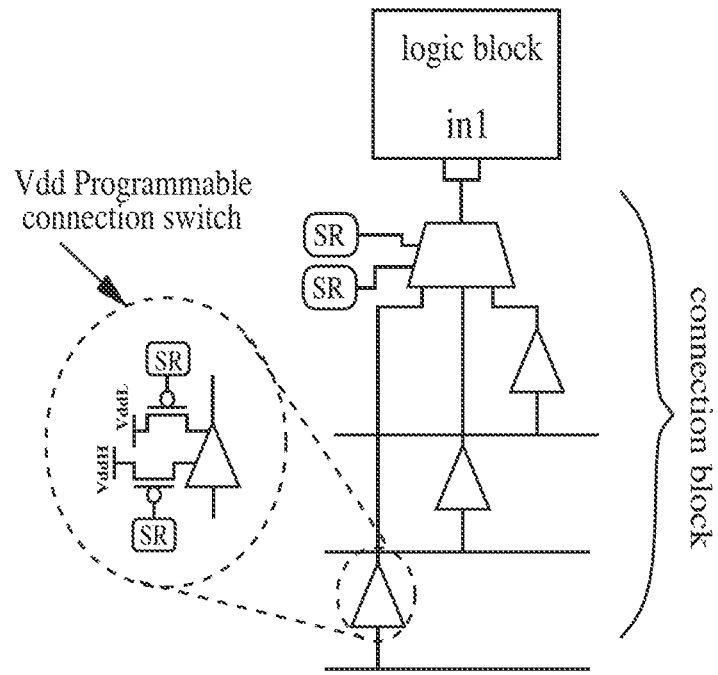
FIG. 36C is a schematic of a $V_{dd}$-programmable connection block according to an aspect of the present invention, showing SRAM cells (SR) and level converter (LC).

FIG. 36A through FIG. 36C depict the original design of $V_{dd}$-programmable interconnect switches (both a routing switch and connection switch). A level converter is needed whenever a low $V_{dd}$ ($V_{ddL}$) interconnect switch drives a high $V_{dd}$ ($V_{ddH}$) interconnect switch. In other cases, the level converter can be bypassed. As shown in FIG. 36A, a pass transistor M1 and a MUX together with a configuration SRAM cell can be used to implement a configurable level conversion. For the $V_{dd}$-programmable routing switch as shown in FIG. 36B, two PMOS power switches M3 and M4 are inserted between the tri-state buffer and $V_{ddH}$, $V_{ddL}$ power rails, respectively. Turning off one of the power switches can select a $V_{dd}$ level for the routing switch. By turning off both power switches, an unused routing switch can be power gated.

SPICE simulation shows that power gating the routing switch can reduce leakage power by a factor of over 300. As power switches stay either ON or OFF after configuration and there is no charging and discharging at their source/drain capacitors, the dynamic power overhead is almost negligible. The delay overhead associated with the power switch insertion can be bounded by around 6% when the power switch is properly sized.

Another type of routing resource is the connection block as shown in FIG. 36C. The multiplexer based implementation chooses only one track in the routing channel and connects it to the logic block input pin. The buffers between the routing track and the multiplexer are connection switches. Similar to the routing switch, programmable $V_{dd}$ is also applied to the connection switch. However, a large number of configuration SRAM cells must be introduced to provide $V_{dd}$-programmability for interconnect switches according to previous methodology.

In this section, we design two new types of interconnect switches, $V_{dd}$-programmable switch and $V_{dd}$-gateable switch, which can be implemented with a reduced number of configuration SRAM cells, wherein the devices are referred to herein as "SRAM efficient circuits". An SRAM efficient $V_{dd}$-programmable switch provides three states which are $V_{ddH}$, $V_{ddL}$ and power gating.

In contrast to that our SRAM efficient design reduces the number of extra SRAM cells for $V_{dd}$-programmability, wherein it reduces SRAM leakage. Different from a $V_{dd}$-programmable switch, a $V_{dd}$-gateable switch only has two states, to be programmed as being supplied with a predetermined $V_{dd}$ level or being power gated when unused, but it can dramatically reduce the number of SRAM cells required for $V_{dd}$-programmability. The detailed circuit designs of SRAM efficient $V_{dd}$-programmable and $V_{dd}$-gateable switches are discussed in the following sections.

The use of a conventional $V_{dd}$-programmable interconnect switch introduces a large number of extra configuration SRAM cells. As shown in FIG. 36, there are three SRAM cells for each $V_{dd}$-programmable routing switch. For a connection block containing N $V_{dd}$-programmable connection switches, there are 2N+⌈$\log_2$ N⌉ configuration SRAM cells, among which ⌈$\log_2$N⌉ SRAM cells are for the multiplexer and the other 2N extra SRAM cells are for N $V_{dd}$-programmable connection switches.

Figure 37A:
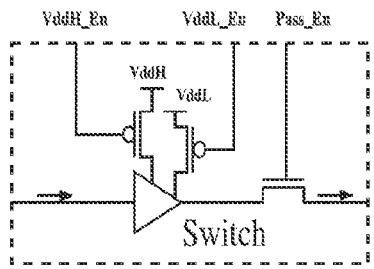
FIG. 37A is a schematic of a $V_{dd}$-programmable switch according to an aspect of the present invention.
Figure 37B:
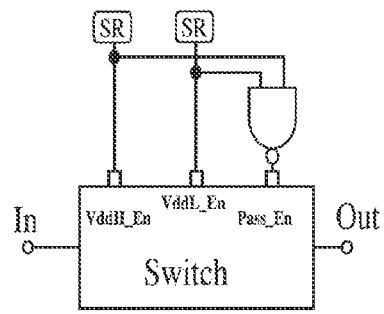
FIG. 37B is a schematic of an SRAM-efficient $V_{dd}$-programmable routing switch according to an aspect of the present invention.
Figure 37C:
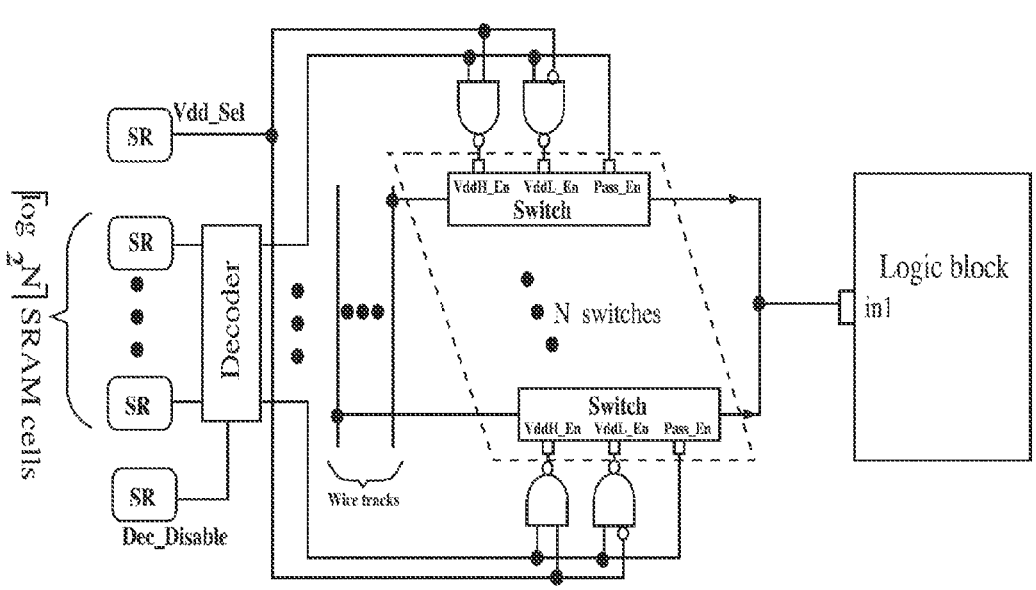
FIG. 37C is a schematic of an SRAM-efficient $V_{dd}$-programmable connection block.

FIG. 37A through FIG. 37C illustrates the use of $V_{dd}$-programmable switches in an SRAM efficient design according to the present invention. It should be appreciated that combinational logic can be used, such as a decoder, to reduce the number of extra SRAM cells introduced by $V_{dd}$-programmability. As shown in FIG. 37A, a $V_{dd}$-programmable switch module is first defined with three signal ports, $V_{ddH}$–En, $V_{ddL}$–En and Pass_En. By setting these three control signals, we can program the $V_{dd}$-programmable switch between $V_{dd}$ selection and power gating. An SRAM efficient $V_{dd}$-programmable routing switch embodiment aspect of the invention is shown in FIG. 37B. Pass_En can be generated by $V_{ddH}$–En and $V_{ddL}$–En with a NAND2 gate. Table 25 summarizes the configurations and relevant control signals for $V_{dd}$-programmable routing switch.

Similarly, FIG. 37C shows the SRAM efficient design of $V_{dd}$-programmable connection block. For a connection block containing N connection switches, we use a ⌈$\log_2$N⌉:N decoder and 2N NAND2 gates as the control logic. There is a disable signal Dec_Disable for each decoder. Each decoder output is connected to Pass_En of one connection switch. Setting Pass_En of a connection switch to '0' can power gate this switch by setting both $V_{ddH}$–En and $V_{ddL}$–En to '1' with NAND2 gates.

When the whole connection block is not used, all N outputs of the decoder are set to '0' to power gate all the connection switches by asserting Dec_Disable. When the connection block is in use, Dec_Disable is not asserted. By using ⌈$\log_2$ N⌉ configuration bits for the decoder, only one Pass_En is set to '1' and others are set to '0', for example only one connection switch inside the connection block is selected and connects the one track to logic block input, and other unused connection switches are power gated. Another configuration bit Vdd_Sel is used to select the $V_{dd}$ level for the selected connection switch. Table 26 summarizes the truth table of configurations and relevant control signals for the $V_{dd}$-programmable connection switch.

For a connection block containing N connection switches, only ⌈$\log_2$ N⌉+2 configuration SRAM cells are needed to provide $V_{dd}$ selection and power gating capability for each individual connection switch inside the connection block. Compared to a conventional connection block, only two extra configuration SRAM cells are introduced for $V_{dd}$ selection and power gating. Similar to the SRAM cell high $V_t$ transistors are used for control logic to reduce leakage overhead as the delay of control logic will not affect system run-time performance. Similarly, minimum width transistors are utilized for control logic to reduce area overhead. Table 27 shows the comparison of the number of configuration SRAM cells, leakage and area between the original designs of $V_{dd}$-programmable routing switch/connection block in FIG. 36C and our SRAM efficient designs in FIG. 37C. As shown in Table 27, we can see that the SRAM efficient designs of $V_{dd}$-programmable routing switch and connection block give us smaller area and less leakage. In the remainder of this section, we only consider SRAM efficient design for $V_{dd}$-programmable interconnect switches.

Figure 38A:
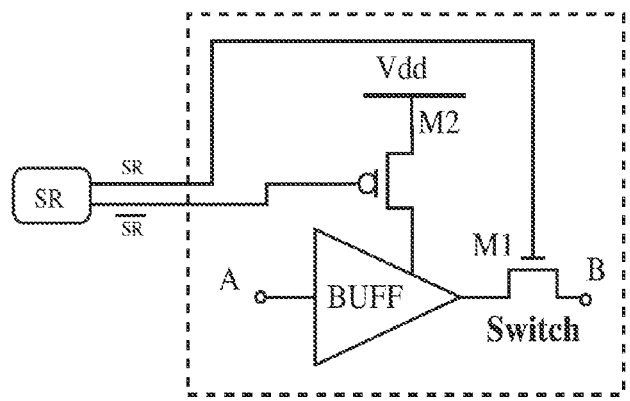
FIG. 38A is a schematic of a $V_{dd}$-gateable switch according to an aspect of the present invention.
Figure 38B:
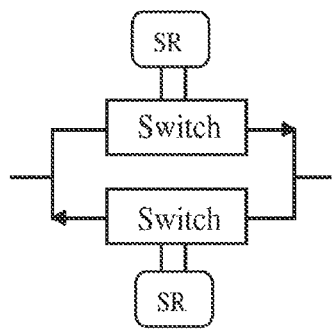
FIG. 38B is a schematic of a $V_{dd}$-gateable routing switches according to an aspect of the present invention.
Figure 38C:
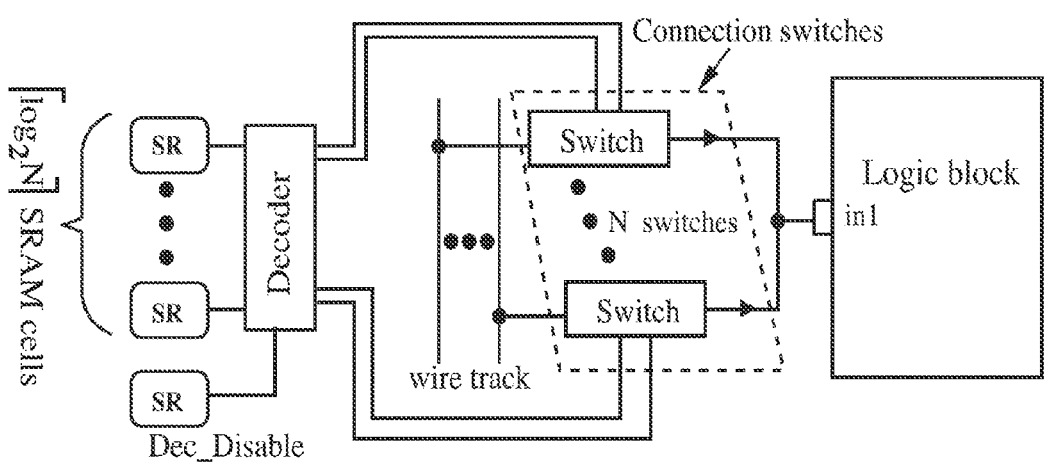
FIG. 38C is a schematic of $V_{dd}$-gateable connection switches according to an aspect of the present invention.

FIG. 38A through FIG. 38C illustrate, by way of example and not limitation, gateable switch configurations according to embodiments of the present invention. Compared to a $V_{dd}$-programmable switch a $V_{dd}$-gateable interconnect switch only provides two states between a predetermined $V_{dd}$ level and power gating, but it can dramatically reduce the number of extra SRAM cells necessary to provide $V_{dd}$-programmability.

FIG. 38A shows the circuit design for a $V_{dd}$-gateable switch. Based on a conventional tri-state buffer, a PMOS transistor M2 is inserted between the power rail and the tri-state buffer to provide the power gating capability. When a switch is not used, transistor M1 is turned off by the configuration cell SR. At the same time, M2 can be turned off to perform power gating for the unused switch. Similarly, both M1 and M2 are turned on by the configuration cell SR when the switch is used. Thus, the present aspect of the invention makes it unnecessary to introduce an extra SRAM cell for power gating capability.

FIG. 38B presents $V_{dd}$-gateable routing switches. In considering this aspect of the invention it should be appreciated that we have achieved leakage power reductions by a factor of over 300 for an unused switch when it is power gated. However, there is a delay overhead associated with the insertion of transistor M2 in the $V_{dd}$-gateable routing switch. The size of M2 for the tri-state buffer is properly selected to achieve a delay increase bounded by 6%. Similar to $V_{dd}$-programmable switch, dynamic power overhead associated with the insertion of PMOS M2 is almost negligible because transistor M2 is always ON when the routing switch is used and there is no charging or discharging occurring at its source/drain capacitors.

The design of a $V_{dd}$-gateable connection block is shown in FIG. 38C. In this embodiment only ⌈$\log_2$ N⌉ configuration SRAM cells are necessary to control N connection switches in a connection block via a decoder and achieve the power gating capability for each connection switch at the same time. Another configuration bit, Dec_Disable, is used for disabling the decoder when we apply power gating to the whole connection block. Similar to the SRAM efficient design of $V_{dd}$-programmable switch, we use high $V_t$ and minimum width transistor for the decoder to reduce leakage and area overhead. Alternatively, N configuration SRAM cells can be used to control the same number of connection switches without using the decoder. Table 28 shows the comparison of the number of SRAM cells, leakage and area for a non decoder-based and decoder-based connection block containing 32 connection switches. As shown in Table 28, the decoder based $V_{dd}$-gateable connection block consumes less area and leakage power compared to the non-decoder-based design. In the remaining portion of this section, we only consider the use of decoder-based $V_{dd}$-gateable connection blocks that introduce only a single extra configuration SRAM cell.

In this section, we first evaluate two architecture classes Class 1 and Class 2 for $V_{dd}$-programmable FPGAs. Class 1 applies programmable dual-$V_{dd}$ to all the logic blocks and routing switches, and inserts a configurable level conversion circuit in front of each routing switch as well as at the inputs/outputs of the logic blocks. This fully $V_{dd}$-programmable architecture style has been adapted with SRAM efficient circuit design according to the invention for routing and connection switches to reduce the number of SRAM cells required to achieve $V_{dd}$-programmability.

FPGA Class 2 applies programmable dual-$V_{dd}$ only to the logic blocks, and uses $V_{dd}$-gateable routing/connection switches in FPGA interconnects. Therefore, the interconnect switches in architecture Class 2 only have two configurable states: high $V_{dd}$ ($V_{ddH}$) and power-gating. As we use $V_{ddH}$ for interconnects in architecture Class 2, level converters are only needed at the logic block outputs, but not at the logic block inputs nor in the routing channels. Similar to the baseline architecture Class 0 described earlier, the configuration SRAM cells in both architecture classes use the high $V_t$ SRAM design. All these architecture classes (with Class 3 to be subsequently presented) are summarized in Table 29.

In our architecture evaluation framework, we used a simple design flow starting with a single $V_{dd}$ gate level net list, to which we apply technology mapping and timing driven packing to obtain the single-$V_{dd}$ cluster level net list. We then perform single-$V_{dd}$ timing driven placement and routing by VPR and generate the basic circuit net list (BC net list). We assume that the initial $V_{dd}$ level is $V_{ddH}$ everywhere, and calculate power sensitivity $\Delta P/\Delta V_{dd}$, which is the power reduction that arises by changing $V_{ddH}$ to $V_{ddL}$ for each circuit element. The total power P includes both switching power and leakage power $P_{lkg}$.

Figures 39, 40:
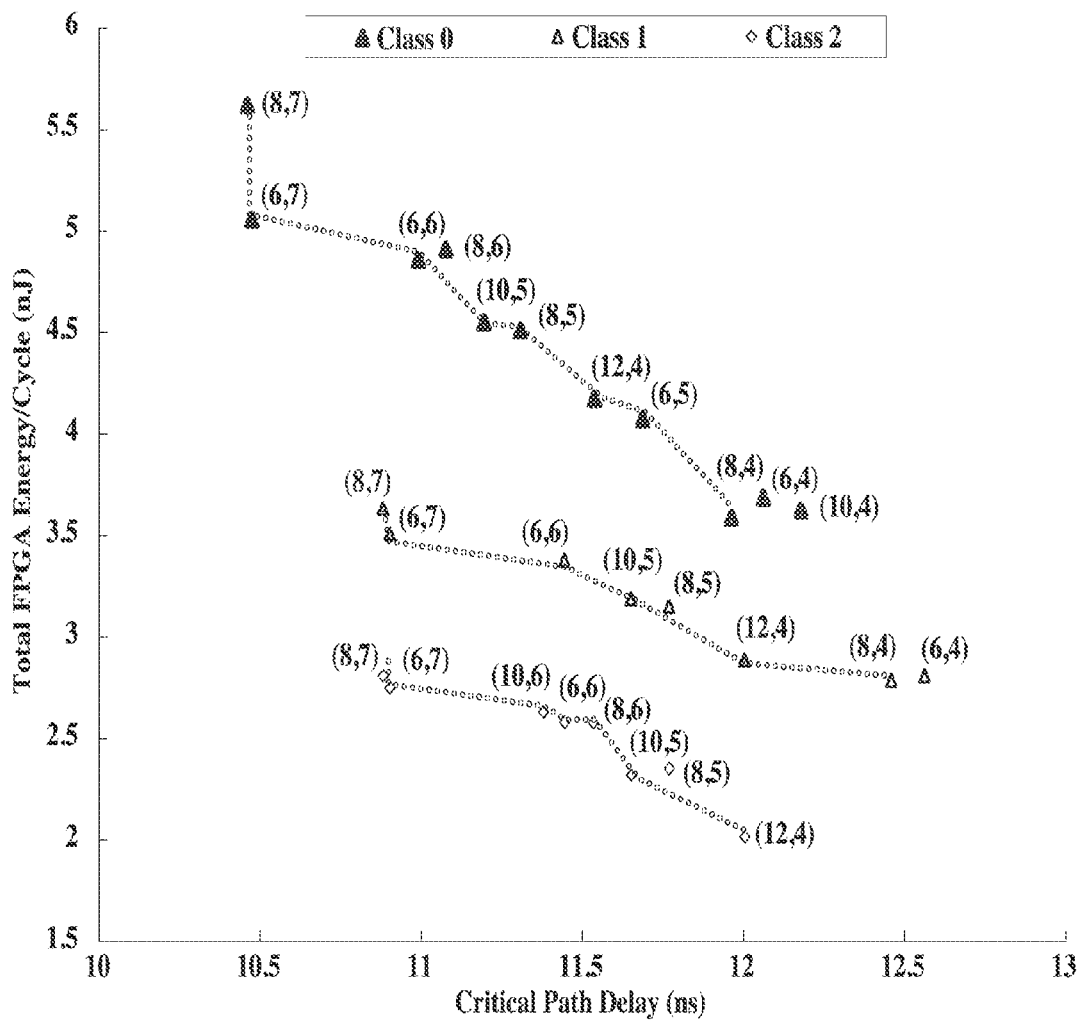
FIG. 39 is pseudo-code for implementing a method of sensitivity-based dual-$V_{dd}$ assignment algorithm according to an aspect of the present invention.
FIG. 40 is a graph of energy and delay trade-offs for the base-line single-$V_{dd}$ dual-$V_t$ FPGA (Class 0) and the two classes of $V_{dd}$-programmable FPGAs (Class 1 and Class 2).

FIG. 39 illustrates an example of a greedy algorithm which is carried out for $V_{dd}$ assignment considering iteratively updated timing slack. Note that $V_{dd}$ assignment is performed after single $V_{dd}$ ($V_{ddH}$) routing, and the placement and routing solution is the same in all FPGA classes for each benchmark circuit. For FPGA Class 1, the $V_{dd}$ assignment unit is a logic block or an interconnect switch. For FPGA Class 2, the $V_{dd}$ assignment unit is a logic block. For both Class 1 and Class 2, power gating is applied to all unused logic blocks and programmable switches. Finally, we perform the energy and delay evaluation for the dual-$V_{dd}$ design.

FIG. 40 presents the energy delay trade-off in terms of different architectures, i.e., different combinations of cluster size N and LUT size k, for three FPGA classes: Class 0, Class 1 and Class 2. Considering that the optimal $V_{ddL}/V_{ddH}$ ratio was found by others to be approximately 0.6-0.7, we use 1.3 v for high $V_{dd}$ and 0.8 v for low $V_{dd}$ in our tests. We only show the relaxed dominant architectures in the figure and the polyline represents the strictly dominant architectures. Similar to the baseline FPGA Class 0, the min-delay architecture is (N=8; k=7) for both Class 1 and Class 2. The min-energy architecture is (N=8; k=4) for Class 1 and (N=12; k=4) for Class 2. This shows that LUT size 7 gives the best performance and LUT size 4 leads to the lowest energy consumption for these $V_{dd}$-programmable FPGAs.

We then use the metrics of energy E, delay D and energy delay product ED to compare the two classes of $V_{dd}$-programmable FPGAs (Class 1 and Class 2) and the baseline FPGA (Class 0). We use the min-energy (min-delay) architecture within each FPGA architecture class and obtain the energy saving (delay increase) by $V_{dd}$-programmable FPGAs. Compared to the baseline architecture class, FPGA Class 1 obtains an energy saving of 22.63% and FPGA Class 2 obtains an energy saving of 44.42%. The delay increase due to $V_{dd}$-programmability is only 4% for both FPGA Class 1 and Class 2. As the routing solution is the same for each benchmark in single-$V_{dd}$ FPGA Class 0 and $V_{dd}$-programmable FPGA Class 1, Class 2, this system level performance degradation reflects the impact of delay increase due to $V_{dd}$-programmability in circuit level. We also use the min-ED (i.e., the minimum energy delay product) architecture within each architecture class and obtain the ED product reduction. FPGA Class 1 reduces ED product by 19.48% and Class 2 reduces ED product by 44.14%.

The $V_{dd}$-programmability increases the total number of SRAM cells required to store those extra configuration bits. However, SRAM cells are vulnerable to soft errors and the total number of SRAM cells should be minimized. Table 31 presents the increase in SRAM cell number and the total device area overhead due to $V_{dd}$-programmability. The SRAM cells include those used in LUTs and the total device area includes both logic block and interconnect device area. Only dominant architectures are shown in the table. The $V_{dd}$-programmable FPGA Class 1 increases the SRAM cell number by 132%. This shows that fully $V_{dd}$-programmable FPGAs need a large number of extra SRAM cells to provide $V_{dd}$-programmability. FPGA Class 2 only increases SRAM cell number by 3% because only two states ($V_{ddH}$ and power gating) are provided for FPGA interconnect switches and the original SRAM cells for interconnection programmability can be shared for $V_{dd}$-programmability. Considering total device area overhead including the extra SRAM cells, power switches and level converters, FPGA Class 1 has a 178% area overhead and FPGA Class 2 has a 48% area overhead.

By using $V_{dd}$ programmable interconnects, we can reduce the interconnect dynamic energy which is not achievable by means of $V_{dd}$-gateable interconnects. However, as presented in a previous section, FPGA fully $V_{dd}$-programmable architecture Class 1 consumes more energy than FPGA architecture Class 2 which uses $V_{dd}$-gateable interconnects. This is because of the leakage overhead of the large number of level converters in routing channels, which provides $V_{dd}$-programmability for each individual interconnect switch. To achieve better energy delay trade-off, we design an improved fully $V_{dd}$-programmable FPGA architecture Class 3. It uses the same SRAM efficient interconnect switches as FPGA architecture Class 1, but inserts level converters only at logic block inputs and outputs. Since there is no level converter in the routing channels, we need a CAD algorithm to guarantee that no $V_{ddL}$ interconnect switch drives a $V_{ddH}$ interconnect switch. We tackle the problem by choosing the routing tree as the $V_{dd}$ assignment unit. Similar to FPGA Class 1, the same design flow and the sensitivity-based $V_{dd}$ level assignment algorithm in FIG. 39 is used to decide the $V_{dd}$ level for each routing tree. The only difference is that we use a routing tree as the assignment unit for FPGA Class 3 while an interconnect switch is used as the assignment unit for Class 1. Since two routing trees will not intersect with each other in routing channels, we do not need level converters in routing channels. Same as FPGA Class 1, the $V_{dd}$ assignment is performed after single $V_{dd}$ ($V_{ddH}$) routing and using a routing tree as the assignment unit does not impose any additional routing constraint.

Figure 41:
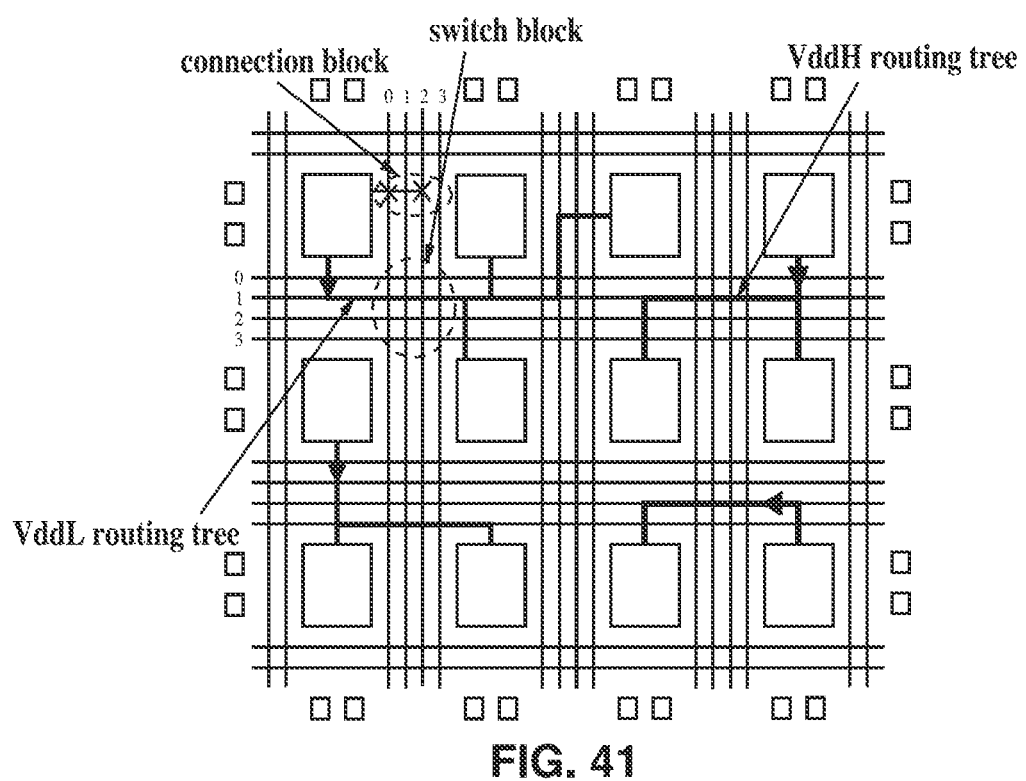
FIG. 41 is a connection topology for a fully $V_{dd}$-programmable FPGA architecture denoted as Class 3 according to an aspect of the present invention, shown without level converters in the routing tracks.

FIG. 41 illustrates the situation that a $V_{ddH}$ routing tree and $V_{ddL}$ routing tree can share a same track without level converters in routing channels.

In this section, we evaluate our improved fully $V_{dd}$-programmable architecture Class 3.

Figure 42:
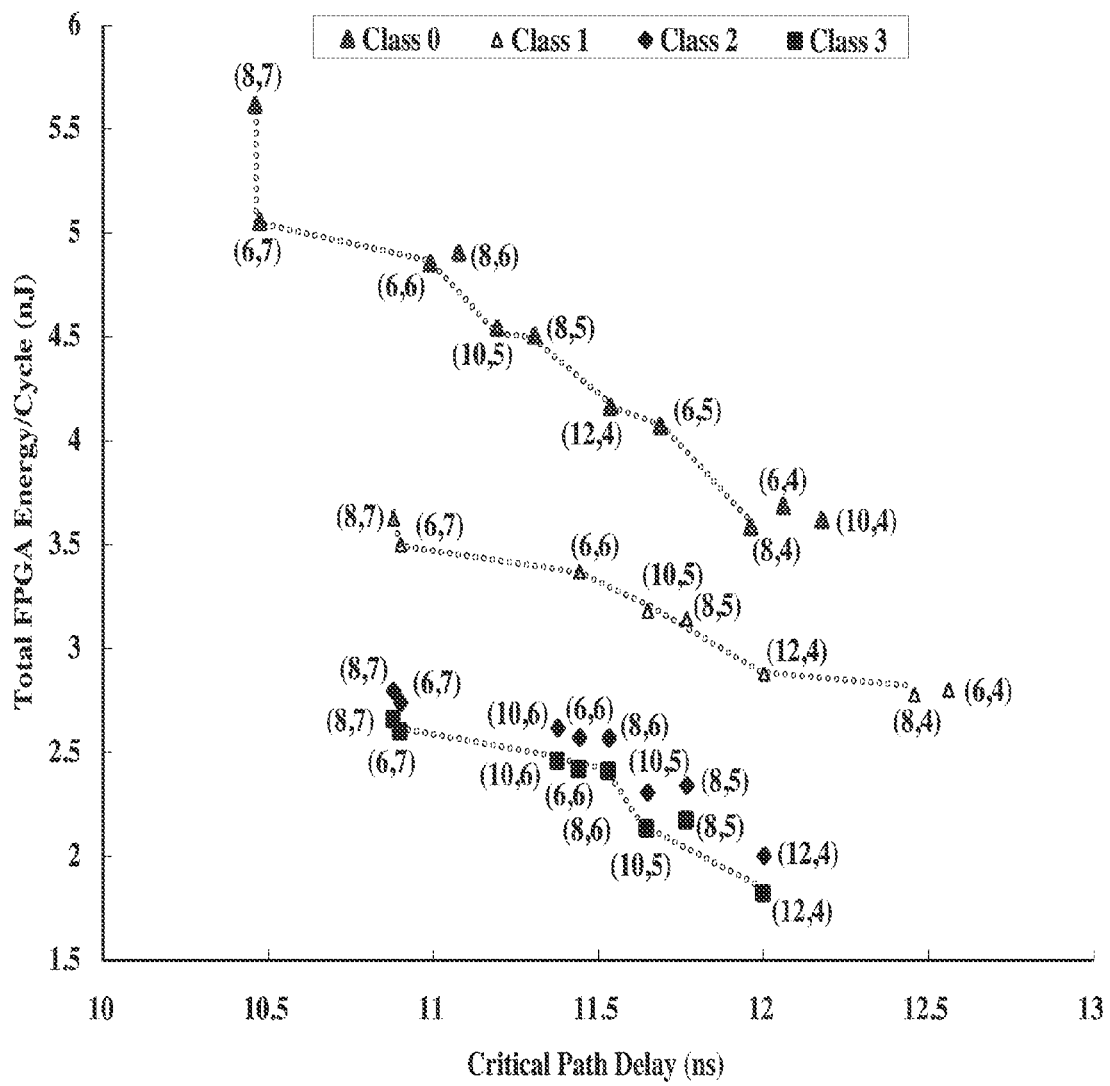
FIG. 42 is a graph of energy and delay trade-offs for the base-line single-$V_{dd}$ dual-$V_t$ FPGA (Class 0) and the three classes of $V_{dd}$-programmable FPGAs (Class 1, Class 2 and Class 3).

FIG. 42 shows the energy delay evaluation for our improved architecture Class 3 compared to the evaluation results for architecture Class 0, Class 1 and Class 2. As shown in the figure, we can see that the improved architecture Class 3 can achieve improved energy delay trade-offs than architecture Class 1, and even better than Class 2. This is because FPGA Class 3 removes the level converters in the routing channels but still can reduce interconnect dynamic energy requirements, which is not available in architecture Class 2 that relies on $V_{dd}$-gateable interconnect switches. Similar to Class 0, the min-delay architecture is (N=8; k=7) for Class 3. The min-energy architecture is (N=12; k=4) for Class 3. The case of (N=12; k=4) also gives the minimum energy delay product ED in architecture Class 3.

We can see that for our improved FPGA architecture Class 3, LUT size 7 always yields the best performance and LUT size 4 always leads to the lowest energy consumption. Compared to the min-energy (min-delay) architecture within baseline architecture Class 0, the min-energy architecture in Class 3 obtains an energy reduction of 49.41%, and the min-delay architecture in Class 3 has a 4% delay overhead due to $V_{dd}$-programmability. The min-ED architecture in FPGA Class 3 reduces energy delay product ED by 49.21%. As shown in Table 30, FPGA Class 3 yields the lowest energy as well as the lowest energy delay product ED. The total number of configuration SRAM cells and the total device area of FPGA Class 3, compared with FPGA Class 0, Class 1 and Class 2, are presented in Table 31.

FPGA Class 3 increases the number of configuration SRAM cells by 28.25% and the device area by 124% for $V_{dd}$-programmability. Both Class 2 and Class 3 introduce smaller number of extra configuration SRAMs and give a smaller device area over head while providing increased energy reduction as compared to Class 1. Compared to FPGA Class 2, Class 3 reduces more energy as well as ED while introducing more configuration SRAM cells and having a larger area overhead.

We have developed an improved FPGA power model with high fidelity and accuracy, and designed novel $V_{dd}$-programmable and $V_{dd}$-gateable interconnect switches with significantly reduced number of configuration SRAM cells compared to previous architectures. Using the new switches, we have evaluated three new classes of $V_{dd}$-programmable FPGA architectures. Class 1 applies $V_{dd}$-programmability to both logic blocks and interconnects, where $V_{dd}$ level converters are inserted before each interconnect switch. Class 2 uses $V_{dd}$-programmable logic blocks and $V_{dd}$-gateable interconnects. Similar to Class 1, Class 3 applies $V_{dd}$-programmability to both logic blocks and interconnects, but it does not insert any $V_{dd}$ level converter in routing channels. The baseline for comparison is Class 0, which uses high $V_{dd}$ for both logic blocks and interconnects. High $V_t$ is applied to configuration SRAM cells for all four architecture classes, and the same dual-$V_{dd}$ levels are applied to Classes 1-3.

Using the metric of Energy Delay product (ED) measured as a geometric mean over the MCNC benchmark set, the ED reduction for the min-ED architecture in Class 1, Class 2 and Class 3 was found to be 19.48%, 44.14% and 49.21%, respectively. The SRAM cell overhead introduced by $V_{dd}$-programmability for Class 1, Class 2 and Class 3 is 132%, 3% and 28%, respectively. The total device area overhead for Class 1, Class 2 and Class 3 is 178%, 48% and 124%, respectively.

Both FPGA Class 2 and Class 3 achieve more energy reduction with less SRAM and area overhead compared to FPGA Class 1. Note that Class 1 is similar to one $V_{dd}$-programmable FPGA architecture proposed in some recent industry work, however, our new circuit has an architecture which operates using less power and a smaller device area due to the new circuit design. While FPGA Class 3 provides the lowest energy consumption, FPGA Class 2 achieves comparable energy reduction with significantly reduced number of SRAM cells and device area overhead. We conclude that Class 2 is generally the best of these architecture classes when considering area, power and performance trade-offs (although in select applications the other Classes may provide benefits which over-ride, or alter, these considerations). Our evaluation results also show that, within each architecture class, LUT size 4 provides the lowest energy consumption while LUT size 7 leads to the highest performance. In this section, area is represented by the number of minimum width transistor area.

It will be appreciated that these teachings can be extended to developing CAD algorithms and architectures to increase power reduction and decrease SRAM cell and area overhead due to $V_{dd}$-programmability. Particularly, because high $V_{dd}$ wire segments may drive low $V_{dd}$ wire segments without using $V_{dd}$ level converters, we will apply dual-$V_{dd}$ levels within a routing tree. This may reduce more dynamic power compared to using high $V_{dd}$ in the entire tree. Additionally, similar to a mix of high $V_{dd}$, low $V_{dd}$, and programmable $V_{dd}$ logic blocks, we will replace the programmable $V_{dd}$ interconnects in Class 3 by an optimal mix of high $V_{dd}$ low $V_{dd}$ and programmable $V_{dd}$ interconnects to reduce the area overhead with bounded or no performance loss.

6. Device and Architecture Co-Optimization for FPGA Power Reduction.

Numerous FPGA architecture evaluations assumed fixed $V_{dd}$ and $V_t$, and have not conducted simultaneous evaluation on device optimization such as $V_{dd}$ and $V_t$ tuning and architecture optimization on LUT and cluster size. It should be appreciated that optimization of $V_{dd}$ and $V_t$ has little or no area overhead compared to power gating and $V_{dd}$-programmability. The combination of architecture and device co-optimization is therefore able to provide improved power and performance trade-offs compared to architecture tuning alone. Herein the term "hyper-architecture" (or abbreviated as "hyper-arch") is defined as the combination of device parameters and architectural parameters. The co-optimization requires the exploration of the following dimensions: cluster size N, LUT size K, supply voltage $V_{dd}$, and threshold voltage $V_t$. The total hyper-arch combinations can be easily over a few hundreds and calls for accurate yet extremely efficient timing and power evaluation methods.

The existing FPGA power evaluation methods are based on cycle-accurate simulation or logic transition density estimation. Timing and power are calculated for each circuit element. Therefore, it is very time-consuming to explore the huge hyper-arch solution space using conventional methods. The present invention, by contrast, teaches a trace-based estimator for FPGA power, delay, and area. We perform benchmark profiling and collect statistical information on switching activity, short circuit power, critical path structure, and circuit element utilization rate for a given set of benchmark circuits (MCNC benchmark set in this section). We then derive formulae that use the statistical information and obtain FPGA performance and power for a given set of architectural and device parameter values.

Our trace-based estimator has a high fidelity compared to the cycle-accurate simulation and an average error of 3.4% for power and of 6.1% for delay. We will show that our trace information depends only on FPGA architecture but is insensitive to device parameters. Therefore, once the trace information is collected for the benchmark set, the remaining runtime is negligible as the trace-based hyper-arch evaluation is based on formulae and lookup tables. The trace collecting has the same runtime as evaluating FPGA architecture for a given $V_{dd}$ and $V_t$ combination using cycle accurate simulation. It took one week to collect the trace for the MCNC benchmark set using eight 1.2 GHz Intel Xeon servers. But all the hyper-arch evaluation reported in this section with over hundreds of $V_{dd}$ and $V_t$ combinations took a few minutes on one server.

The second contribution is that we perform the architecture and device co-optimization for a variety of FPGA classes. We explore different $V_{dd}$ and $V_t$ combinations in addition to the cluster size and LUT size combinations. For comparison, we obtain the baseline FPGA which uses the same architecture as the commercial FPGA used by Xilinx, and $V_{dd}$ suggested in the International Technology Roadmap for Semiconductor, but $V_t$ is optimized by our device optimization, and is significantly improved over the one with no device optimization. Compared to the baseline FPGA, architecture and device co-optimization can reduce energy-delay product (product of energy per clock cycle and critical path delay, abbreviated "ED") by 20.5% without incurring additional device area. Furthermore, considering power-efficient FPGA architecture with power-gating capability for logic blocks and interconnect switches, our architecture and device co-optimization method reduces ED by 54.7% and chip area by 8.3%.

In this section, we first discuss the preliminaries of FPGA architecture and review the power model used in the cycle accurate simulation described by F, Li, D. Chen, L. He and J. Gong, in "*Architecture Evaluation for Power-Efficient FPGAs*" in Proc. ACM Intl. Symp. Field-Programmable Gate Arrays, February 2003. We then present and validate our trace-based estimation called Ptrace for FPGA power and delay.

We assume the same cluster-based island style FPGA as previously described herein, therein providing a comparative basis for analysis. A logic block is a cluster of fully connected Basic Logic Elements (BLEs), and the cluster size N is the number of BLEs in a logic block. Each BLE consists of one Lookup Table (LUT) and one flip-flop. For an island style routing structure, logic blocks are surrounded by programmable routing channels, and the routing wires in both horizontal and vertical channels are segmented by routing switch blocks. In this section, we use a fixed routing architecture, i.e., fully buffered routing switches and uniform wire segment spanning four (4) logic blocks; and we study the impact of the values N and K on architecture optimization. Moreover, we assumed the routing channel width (number of tracks in each routing channel) to be 1.2 $W_{min}$ (1.2 times the minimum routing channel width) which is defined as the minimum width to let the FPGA circuit be routable. Because there is a limited number of cluster sizes and LUT size combinations, the previous evaluation method based on cycle-accurate simulation can be applied when only architecture optimization is considered. We define our baseline FPGA as the cluster-based island style FPGA architecture with a $V_{dd}$ of 0.9 v at 70 nm technology, LUT size of four (4) and cluster size of eight (8) as the Xilinx FPGA, and a $V_t$ of 0.3 v, which is optimized by our $V_t$ tuning for minimum ED product. If we use a $V_t$ of 0.35V, the ED increases by 58%. This illustrates the benefit of $V_t$ optimization and the quality of the baseline FPGA. Table 32 gives $V_{dd}$ and $V_t$ levels for the baseline FPGA and the evaluation ranges of $V_{dd}$, $V_t$, N and K.

Given the above FPGA architecture, a detailed power model has been proposed for cycle-accurate simulation (referred to in-short as "Psim"). It models switching power, short-circuit power, and leakage power. The first two types of power are called dynamic power and they can only occur during a signal transition. The switching power is due to the charging and discharging of load capacitance, and can be modeled according to the following.

$$P_{sw} = 0.5 f \cdot V_{dd}^2 \cdot \sum_{i=1}^{n} C_i S_i \qquad (8)$$

In the above, n is the total number of nodes, f is the clock frequency, $V_{dd}$ is the supply voltage, $C_i$ is the load capacitance for node i and $S_i$ is the switching activity for node i. Short-circuit power occurs when there is a signal transition at a gate output and the pull-up and pull-down transistors conduct simultaneously for a short period of time. The short-circuit power is a function of signal transition time and load capacitance, and can be modeled as follows.

$$P_{sc} = P_{sw} \cdot \alpha_{sc}(t_r) \qquad (9)$$

In the above, $t_r$ is the signal transition time and $\alpha_{sc}(t_r)$ is the ratio between short-circuit power and switching power, and it depends on transition time $t_r$. The third type of power, leakage power, is consumed when there is no signal transition for a gate or a circuit module. The leakage power is a function of technology, temperature, static input vector, and stack effect of the gate type. Average leakage power of a circuit element at a given temperature, $V_{dd}$, and $V_t$ can be characterized by running SPICE simulation under different input vectors. In each clock cycle of simulation, the simulation under the real delay model obtains the number of signal transitions as well as transition time of a circuit element and calculates its dynamic power. If the circuit element has no signal transition in that cycle, it only consumes leakage power. Also, leakage power is consumed by an active element too. Essentially, the cycle-accurate simulation is used to get the switching activity as well as signal transition time.

The cycle-accurate simulation is time consuming because a large number of input vectors needs to be simulated using a detailed delay model. Also, in order to obtain FPGA delay, static timing analysis has to be conducted for the entire circuit mapped to the FPGA fabric. The cycle-accurate simulation, therefore, is not practical for architecture and device co-optimization because the total number of hyper-arch combinations can easily reach into the several hundreds.

Accordingly, an aspect of the invention is a runtime efficient trace-based estimation method, referred to herein as Ptrace. For a given benchmark set and a given FPGA architecture, we collect statistical information of switching activity, critical path structure and circuit element utilization by profiling the benchmark circuits using cycle-accurate simulation. This statistical information is called the trace of the given benchmark set. We further develop our quick estimation formulae based on trace information and circuit models at different technologies. We will show that the trace information is insensitive to the device parameters such as $V_{dd}$ and $V_t$, and it can be reused during our device optimization to avoid the time-consuming cycle-accurate simulation.

Figure 43:
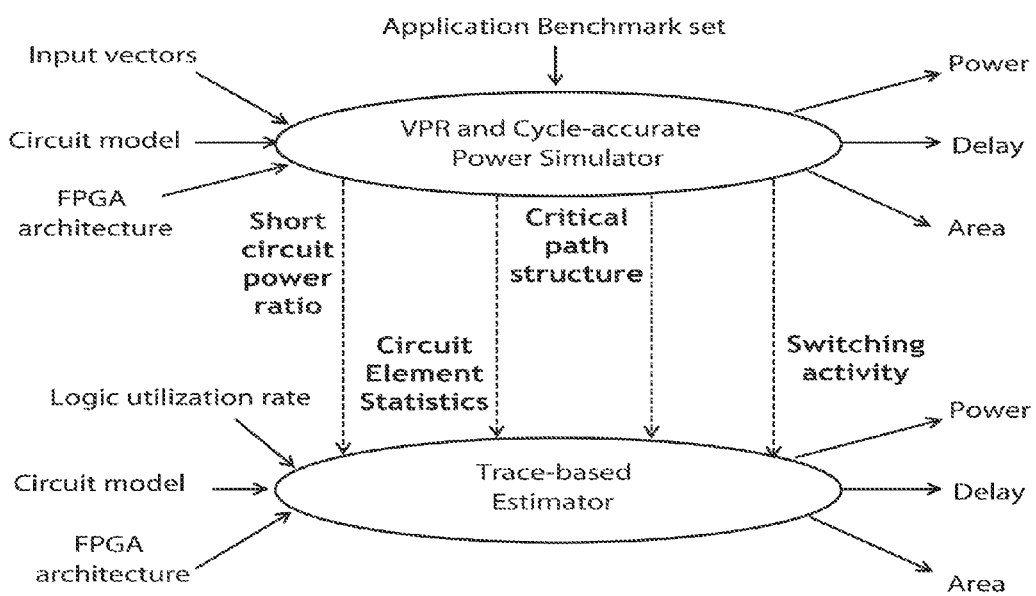
FIG. 43 is a symbolic representation comparing cycle-accurate simulation versus trace-based estimation.
Figure 44A:
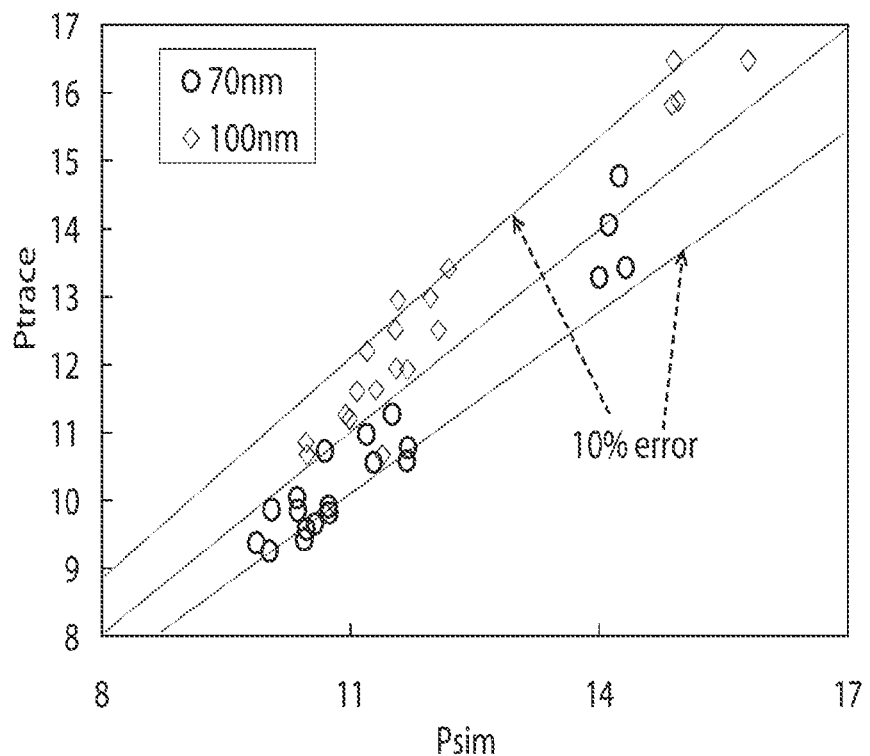
FIG. 44A is a graph comparing Psim and Ptrace versus delay according to an aspect of the present invention.
Figure 44B:
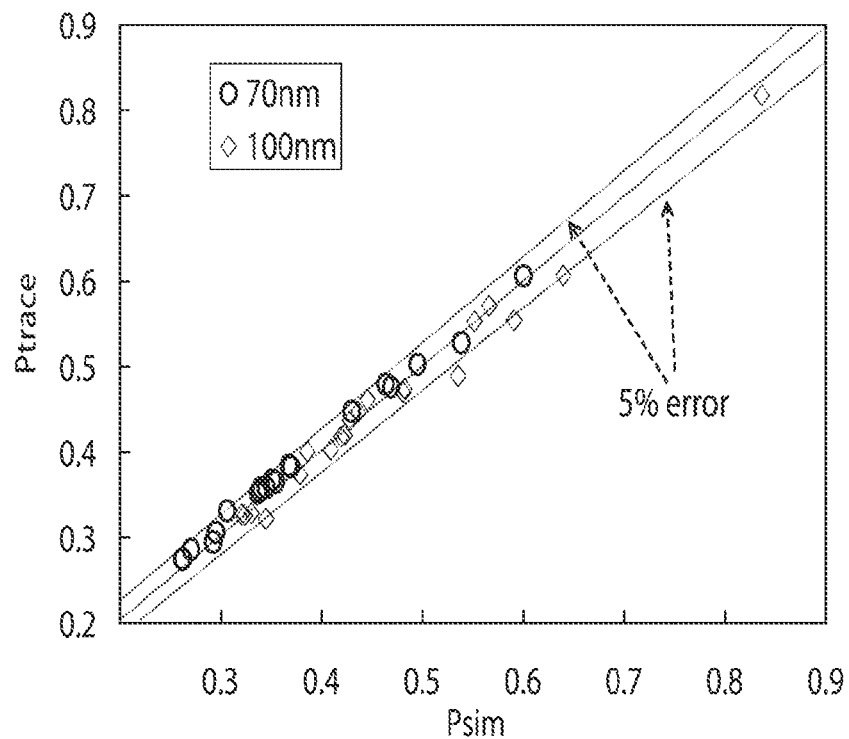
FIG. 44B is a graph comparing Psim and Ptrace versus delay according to an aspect of the present invention.

FIG. 43 illustrates the relation between the cycle-accurate simulation and trace-based estimation. Table 33 summarizes the collected trace information as well as the device and circuit parameters. In the table, trace parameters, including $N_i^u$, $N_i^t$, $S_i^u$, $N_i^p$, and $\alpha_{sc}$, depend only on FPGA architecture;

device parameters, including $V_{dd}$ and $V_t$, depend on technology scale; circuit parameters, including $P_i^s$, $C_i^u$, and $D_i$, depend on circuit design and device. The details of Ptrace is discussed in the following.

Dynamic power includes switching power and short-circuit power. A circuit implemented on an FPGA fabric cannot utilize all circuit elements in the FPGA because of the programmability. Dynamic power is only consumed by the utilized FPGA resources. Our trace-based switching power model distinguishes different types of FPGA resources which are used and applies the following formula.

$$P_{sw} = \sum_i \frac{1}{2} N_i^u \cdot f \cdot V_{dd}^2 \cdot C_i^{sw} \tag{10}$$

The summation is performed over different types of circuit elements, such as LUTs, buffers, input pins and output pins. For circuit elements in FPGA resource type i, $C_i^{sw}$ is the average switching capacitance and $N_i^u$ is the number of used circuit elements, f is the operating frequency. In this section, we assume the circuit operates at its maximum frequency, for example the reciprocal of the critical path delay. The switching capacitance is further calculated as follows.

$$C_i^{sw} = \left( \sum_{j \in El_i} C_{i,j} / N_i^u \right) \cdot S_i^u = C_i^u \cdot S_i^u \tag{11}$$

For the type i circuit elements, $C_i^u$ is the average load capacitance of a used circuit element, which is averaged over $C_{i,j}$ the local load capacitance for used circuit element j is the set of used type i circuit elements, and $S_i^u$ is the average switching activity of used type i circuit elements. We assume that the average switching activity of the circuit elements is determined by the circuit logic functionality and FPGA architecture. The device parameters of $V_{dd}$ and $V_t$ have a limited effect on switching activity. We verify this assumption in Table 34 by showing the average switching activity of five benchmarks at different $V_{dd}$ and $V_t$ levels. The short circuit power is related to signal transition time, which is difficult to obtain without detailed simulation or timing analysis. In our trace-based model, we model the short circuit power as follows.

$$P_{sc} = P_{sw} \cdot \alpha_{sc} \tag{12}$$

Where $\alpha_{sc}$ is the ratio between short circuit power and switching power, which is a circuit parameter which depends on FPGA circuit design and architecture. We assume $\alpha_{sc}$ does not depend on device and technology scale. For a given FPGA architecture (i.e., for a given N and K), we profile each MCNC benchmark circuit to get the average switching activity for each resource type in the FPGA. The trace parameters $\alpha_{sc}$, $N_i^u$, and $C_i^u$ depend only on the FPGA architecture and the benchmark set.

The leakage power is modeled according to the following relation.

$$P_{static} = \sum_i N_i^t P_i^s \tag{13}$$

For resource type i, $N_i^t$ is the total number of circuit elements, and $P_i^s$ is the leakage power for a type i element. It should be noted that typically $N_i^t > N_i^u$ because the resource utilization rate is low in FPGAs. For an FPGA architecture with power-gating capability, an unused circuit element can be power-gated to save leakage power. In that case, the total leakage power is modeled by the following formula.

$$P_{static} = \sum_i N_i^u P_i + \alpha_{gating} \cdot \sum_i (N_i^t - N_i^u) P_i \tag{14}$$

In the above relation $\alpha_{gating}$ is the average leakage ratio between a power-gated circuit element and a circuit element in normal operation. SPICE simulation shows that the use of sleep transistors can reduce leakage power by a factor of 300 and $\alpha_{gating} = 1/300$ is used in this section.

To avoid the static timing analysis for the whole circuit implemented on a given FPGA fabric, we obtain the structure of the ten longest circuit paths including the critical path for each circuit. The path structure is the number of elements of different resource types, such as LUT, wire segment and interconnect switch, on one circuit path. We assume that the new critical path due to different $V_{dd}$ and $V_t$ levels is among these ten longest paths found by our benchmark profiling. When $V_{dd}$ and $V_t$ change, we can calculate delay values for the ten longest paths under new $V_{dd}$ and $V_t$ levels, and choose the largest one as the new critical path delay. Therefore, the FPGA delay can be calculated according to the following equation.

$$D = \sum_i N_i^p D_i \tag{15}$$

For resource type i, $N_i^p$ is the number of circuit elements that the critical path goes through, and $D_i$ is the average delay of such a circuit element. Delay $D_i$ depends on circuit parameter $V_{dd}$, $V_t$, process technology, and FPGA architecture. To get the path statistical information $N_i^p$ we only need to place and route the circuit once for a given FPGA architecture.

To validate Ptrace, we consider both 70 nm and 100 nm technology. We assume voltages $V_{dd}=1.0$ and $V_t=0.2$ for 70 nm technology, and $V_{dd}=1.3$ and $V_t=0.32$ for 100 nm technology. We map 20 MCNC benchmarks to each architecture. For every architecture, power and delay are computed as the geometric mean of the 20 benchmarks. FIG. 2 compares power and delay between Psim and Ptrace. Compared to cycle-accurate simulation, the average power error of Ptrace is 3.4% and average delay error is 6.1%. From the figure, Ptrace will give the same trend of power and delay as Psim. Therefore, it is apparent that Ptrace provides high fidelity. Moreover, the run time of Ptrace is 2 seconds, while the run time of Psim is 120 hours, thereby reducing execution time by a factor of over 200,000.

In this section, we evaluate four FPGA hyper-arch classes: Class 1, Class 2, Class 3, and Class 4 (see Table 35). Class 1 is the conventional FPGA architecture using homogeneous-$V_t$ for both interconnects and logic blocks (referred to herein as "homogeneous-$V_t$"). Class 2 applies different $V_t$ to logic blocks and interconnects (referred to herein as "heterogeneous-$V_t$"). Class 3 and Class 4 are the same as Class 1 and Class 2, respectively, except that unused logic blocks and interconnects are power-gated. They are compared with the baseline hyper-arch, which together with the evaluation ranges for device and architecture are shown in Table 32. Note that a high $V_t$ is applied to all SRAM cells for configuration to reduce leakage power. In our work we find that the utilization rate of the FPGA chip, defined as the number of used logic blocks over the total available logic blocks, does not affect the hyper-arch evaluation. Therefore, throughout our work we assume the logic block utilization rate to be 0.5.

In this section, we present the hyper-arch evaluation. For each hyper-arch, the energy and delay are computed as the geometric mean of 20 MCNC benchmarks. If hyper-arch A has less energy consumption and a smaller delay than hyper-arch B, then we say that B is inferior to A. The dominant hyper-arch (referred to herein as "dom-arch") is defined as the set of hyper-arches that are not inferior to any other hyper-arches.

Figure 45:
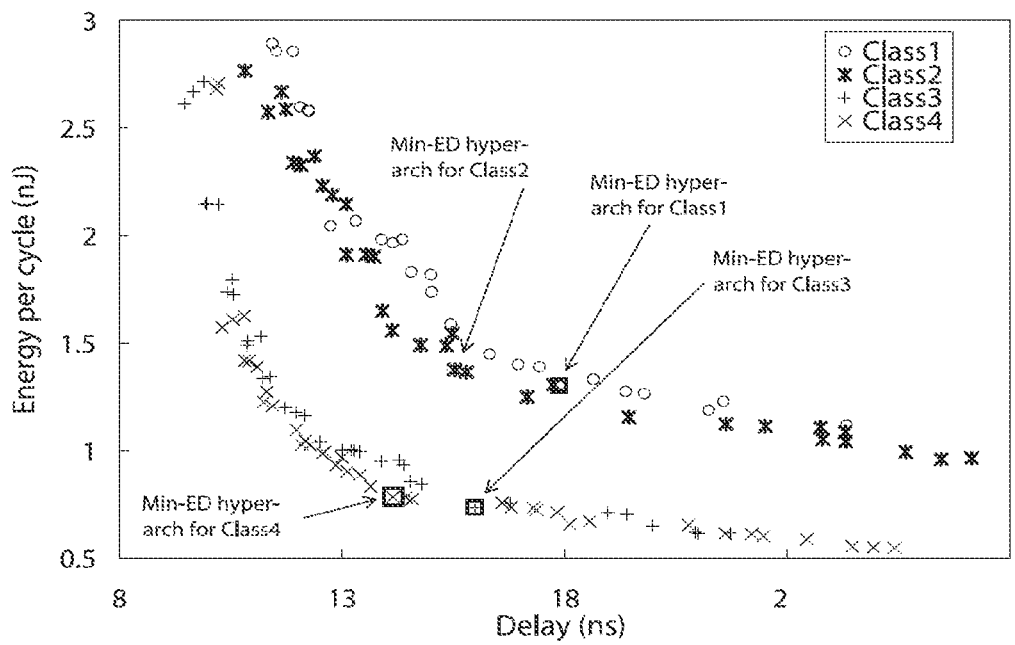
FIG. 45 is a graph of delay-energy trade-off of Dom-archs implemented according to an aspect of the present invention.

FIG. 45 presents the energy-performance trade-off for FPGA dom-arches. The min-ED hyper-arches for all classes are summarized in Table 36. The optimal $V_t$ for logic blocks ($CV_t$) is lower than the $V_t$ for interconnects ($IV_t$) because the interconnect leakage is more significant than logic block leakage. Compared to the baseline hyper-arch, Class 1 reduces the min-ED by 13.7% and Class 2 reduces the min-ED by 20.5%. Applying heterogeneous-$V_t$ reduces ED without increases in the area. Furthermore, power-gating can be applied to unused FPGA logic blocks and interconnects to reduce leakage power. Compared to the baseline hyper-arch, the use of Class 3 reduces the min-ED by 58.9% and Class 4 reduces min-ED by 59.0%, as shown in Table 36. From FIG. 45, it can be seen that the power gap between Class 3 and Class 4 is smaller than that between Class 1 and Class 2 because leakage power is significantly reduced by field programmable power-gating and therefore the more detailed $V_t$ tuning such as heterogeneous-$V_t$ has a smaller impact.

Area is important for FPGA design, especially when power gating is applied since sleep transistors may introduce delay and area overhead. It has been found that in many instances power-gating may reduce ED and area simultaneously because it offers a larger solution space to explore at the chip level. Because only one sleep transistor is used for one logic block, we assume a 210× PMOS for the sleep transistor with negligible area overhead. Moreover, we observe that a 1× PMOS as the sleep transistor for one switch in connection box provides good performance, any further increase of the sleep transistor size will not significantly improve performance. Therefore, a 1× PMOS transistor is used as the sleep transistor for one switch in the connection box. The sleep transistor for one switch in the routing box, however, may affect delay greatly.

Figure 46:
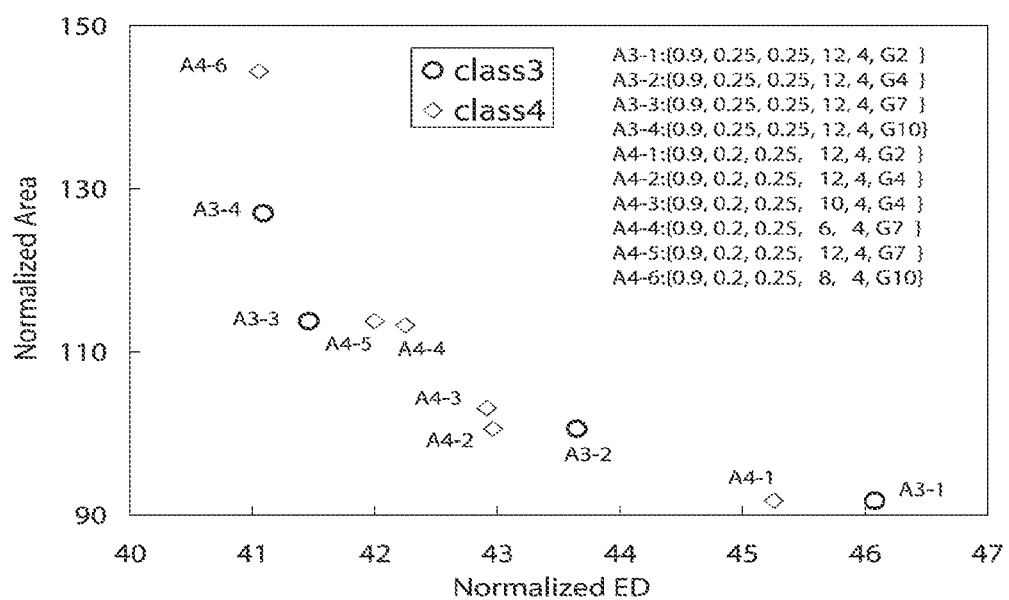
FIG. 46 is a graph of ED and area trade-off for Class 3 and Class 4 architectures according to an aspect of the present invention, showing ED and area are normalized with respect to those for the baseline architecture.

FIG. 46 presents the chip-level ED-area trade-off for Class 3 and Class 4, considering the following sleep transistor sizes: 2×, 4×, 7×, and 10× PMOS for a 7× switch. We prune inferior solutions with both ED and areas larger than any alternative solution. Compared to the baseline architecture, hyper-arch {$V_{dd}$=0.9, $CV_t$=$IV_t$=0.25, N=12, K=4} in Class 3 reduces ED by 53.9%, and hyper-arch {$V_{dd}$=0.9, $CV_t$=0.2, $IV_t$=0.25, N=12, K=4} in Class 4 reduces ED by 54.7%. Both have 2× sleep transistors for one switch in routing box, but reduce area by 8.3% because the optimized cluster size is now larger than the one in the baseline architecture. A higher ED reduction can be reached for a slightly greater area.

Table 37 summarizes a few hyper-arches within a similar range of delays (around 20 nS) for the 4 classes. From the table, we observe that heterogeneous-$V_t$ decreases the LUT size in the min-ED hyper-arch. For the min-energy hyper-arch within the delay range, $CV_t$ ($V_t$ for logic) is lower than $IV_t$ ($V_t$ for interconnect). This causes the logic power to increase. Therefore, to compensate for the power increase, a smaller LUT size is used to reduce the logic power.

FIG. 47 and Table 38 compare the impacts of device tuning and architecture tuning, where each set of data points is the hyper-arches for a given device setting. For example, set D4 is the dom-archs under $V_{dd}$=1.0 and $V_t$=0.25. From the figure, we observe that a change on the device level leads to a more significant change in power and delay than architecture change does. For example, for device setting $V_{dd}$=0.9 v, $V_t$=0.25 v, energy for the different architectures is detected as being from 1.84 nJ to 2.07 nJ, and delay is from 12.7 nS to 16.2 nS. However, if we increase $V_t$ by 0.05 v, such that $V_{dd}$=0.9 v, $V_t$=0.3 v, the energy range is from 1.19 nJ to 1.33 nJ and the delay range is from 17.9 nS to 21.6 nS. There is no overlap of delay and energy ranges between two device settings. Therefore, it is important to evaluate both the device and the architecture instead of evaluating the architecture only.

In this portion of the application a novel trace-based power and performance model, called Ptrace, has been described for FPGA. Ptrace was found to be significantly more efficient while providing accuracy comparable to the cycle accurate simulation, Psim. The one-time use of Psim is applied to collect the timing and power trace for a given benchmark set and given FPGA architecture. The trace can then be re-used to calculate timing and power via closed form formulae for different device parameters and technology scaling. Using the Ptrace, we have first performed device ($V_{dd}$ and $V_t$) and architecture (cluster and LUT size) co-optimizations for low power FPGAs.

In this section 70 nm technology is assumed with the following baseline used for comparison: $V_{dd}$ of 0.9 v, $V_t$ of 0.3 v as given by our $V_t$ optimization for min-ED (i.e., minimum energy delay product), cluster size of 8, and LUT size of 4 as in Xilinx FPGA. Compared to the baseline case, simultaneous optimization of FPGA architecture, $V_{dd}$ and $V_t$ reduces the min-ED by 13.4% for an FPGA employing homogeneous-$V_t$ for the logic and interconnect without power-gating, and optimizing $V_t$ separately (i.e., heterogeneous-$V_t$) for the logic and interconnect reduces min-ED by 20.5%. Furthermore, power-gating of unused logic and interconnects reduces the min-ED by 54.7% and area by 8.3%. Compared to the homogeneous-$V_t$ FPGAs, the min-ED hyper-arch using heterogeneous-$V_t$ has a smaller LUT size. In addition, device tuning of, for example $V_{dd}$ and $V_t$, has a more significant impact on power and delay than architecture tuning does.

7. Leakage Efficient Dual-$V_{dd}$ Assignment with Time Slack Allocation.

In this section, we use the $V_{dd}$-programmable interconnect in a generally conventional manner, but remove the level converters in routing channels by developing novel CAD algorithms. Test results show that compared to a conventional approach, we were able to reduce interconnect leakage power and area by 91.78% and 25.48% respectively, and reduce total interconnect power by up to 65.13% without performance loss.

Interconnects consume most of the area and power of FPGAs. By way of example, the following teachings describe the use of the traditional island-style routing architecture. Each of the logic blocks are surrounded by routing channels consisting of wire segments. The input and output pins of a logic block can be connected to the wire segments in the surrounding channels via a connection switch. Wire segments can be formed into a long connection via a routing switch at each intersection of routing channels. An interconnect switch is either a routing switch or a connection switch, and can be implemented by a tri-state buffer or a non-tri-state buffer. An interconnect segment is a wire segment driven by an interconnect switch. We assume a uniform length of four (4) for all wire segments.

Referring back to FIG. 36A through FIG. 36C a $V_{dd}$-programmable aspects are shown. As described in the section above "Vdd-programmability to Reduce FPGA Interconnect Power", $V_{dd}$ programmability can be applied to interconnects to reduce FPGA power. In FIG. 36C a $V_{dd}$-programmable interconnect switch is shown. For the routing switch in FIG. 36B, two PMOS power transistors M3 and M4 are inserted between the tri-state buffer and $V_{ddH}$, $V_{ddL}$ power rails, respectively. Turning off one of the power transistors can select a $V_{dd}$-level while turning off both power transistors can power-gate an unused routing switch. As already described, above power-gating of an unused routing switch can reduce the leakage power by a factor of over 300.

FIG. 36C illustrates another type of routing resource as the connection block. Similar to routing switches, programmable-$V_{dd}$ is also applied to connection switches inside connection blocks. The same power transistors from the section above entitled "Vdd-programmability to Reduce FPGA Interconnect Power" are used in this section.

FIG. 36A illustrates a $V_{dd}$-level converter (LC) which is utilized whenever a $V_{ddL}$ interconnect switch drives a $V_{ddH}$ interconnect switch to avoid excessive leakage, and can be bypassed in other cases. Pass transistor M1 and a MUX together with a SRAM cell can be used to implement configurable level conversion, which is inserted in front of each interconnect switch to provide fine-grained $V_{dd}$-programmability for interconnects described previously. We start herein with the single-$V_{dd}$ placed and routed net lists by VPR and then perform $V_{dd}$-level assignment for interconnects. For the remainder of this section, we use the term "switch" to represent an interconnect switch for the sake of simplicity whenever there is no ambiguity.

It has been shown that the fine-grained $V_{dd}$-level converter insertion introduces large leakage overhead. If CAD algorithms can guarantee that no $V_{ddL}$ interconnect switch drives $V_{ddH}$ switches, no level converter is needed. In this section, we teach two ways to avoid using level converters. In the first approach, we enforce that there is only one $V_{dd}$-level within each routing tree, namely, tree-based assignment. In the second approach, we can have different $V_{dd}$-levels within a routing tree, but no $V_{ddL}$ switch drives $V_{ddH}$ switches, namely, segment-based assignment. To make the presentation simple, we summarize the notations frequently used in this section in Table 39.

A directed acyclic timing graph $\mathcal{G}(\mathcal{V},\mathcal{E})$ as utilized by other researchers is constructed to model the inventive circuits for timing analysis. Vertices represent the inputs/outputs of basic circuit elements such as registers and LUTs. Edges are added between the inputs of combinational logic elements (i.e., LUTs) and their outputs, and between the connected pins specified by the circuit net list. Configurable level converters are inserted at logic block inputs and outputs, and can be used when needed. Register inputs are not joined to register outputs. Each edge is annotated with the delay required to pass through the circuit element or routing. We use $\mathcal{PI}$ to represent the set of primary inputs and register outputs, and $\mathcal{PO}$ to represent the set of primary outputs and register inputs. The Elmore delay model is utilized to calculate the routing delay. The fan-out cone of a switch is defined as the sub-tree of the routing tree rooted at the switch. Assigning $V_{ddL}$ to a switch affects the delay from source to all the sinks in its fan-out cone, and therefore affects the delay of the corresponding edges in $\mathcal{G}$. To incorporate dual-$V_{dd}$ into timing analysis, we use SPICE to pre-characterize the intrinsic delay and effective driving resistance for a switch under $V_{ddH}$ and $V_{ddL}$, respectively. The $V_{dd}$-level has little impact on the input and load capacitance of a switch, and such impact is ignored in this section.

There are three types of power sources in FPGAs, specifically: switching power, short-circuit power and static (leakage) power. The first two contribute to the dynamic power and only arise when a signal transition occurs at the gate output. Although timing may change the transition density, we assume that the transition density for an interconnect which will not change when $V_{ddL}$ is used, and the switches within one routing tree have the same transition density. The third type of power, static power, is the power consumed when there is no signal transition for a circuit element. It is assumed that the unused switches are power-gated and are not subject to leakage currents. A more accurate power simulation is described in a later portion of this section to verify test results. Given $V_{dd}$-level of interconnect switches and transition density of routing trees, the interconnect power P using programmable dual-$V_{dd}$ can be expressed by the following.

$$P = 0.5 f_{clk} \cdot c \sum_{i=0}^{N_r-1} f_s(i) \sum_{j=0}^{N_s(i)-1} V_{ddij}^2 + \sum_{i=0}^{N_r-1} \sum_{j=0}^{N_s(i)-1} P_s(V_{ddij})$$

According to this equation, $N_r$ is the total number of routing trees, $f_s(i)$ is the transition density of i-th routing tree $R_i$, $N_s(i)$ is the number of switches in $R_i$, and $V_{ddij}$, $P_s(V_{ddij})$ and c are the $V_{dd}$-level, leakage power and load capacitance of each switch respectively. Cycle-accurate simulation is performed on single-$V_{dd}$ placed and routed circuit to obtain transition density. For simplicity, it is assumed that all the switches have the same load capacitance. Our method however can be easily extended to remove this simplification. Value $V_{ij}$ indicates $V_{dd}$-level of jth switch in $R_i$ according to the following.

$$v_{ij} = \begin{cases} 1 & \text{if } V_{dd} \text{ level of } j^{th} \text{ switch in } R_i \text{ is } V_{ddH} \\ 0 & \text{if } V_{dd} \text{ level of } j^{th} \text{ switch in } R_i \text{ is } V_{ddL} \end{cases}$$

The interconnect dynamic power reduction $P_r$ using programmable dual-$V_{dd}$ can be expressed as follows.

$$P_r \propto \sum_{i=0}^{N_r-1} f_s(i) \sum_{j=0}^{N_s(i)-1} (1 - v_{ij}) = \sum_{i=0}^{N_r-1} f_s(i) N_l(i) \quad (16)$$

In the above equation $N_1(i)$ is the number of $V_{ddL}$ switches that can be achieved in $R_i$. Removing $V_{dd}$-level converters requires that no $V_{ddL}$ switch should drive $V_{ddH}$ switches. For the tree-based assignment, only one $V_{dd}$-level can be used within each routing tree, and the $V_{dd}$-level constraints can be expressed by the following.

$$v_{ij} = v_{ik}, 0 \le i < N_r, 0 \le j, k < N_s(i) \quad (17)$$

For example, each pair of switches within a routing tree has the same $V_{dd}$-level. For the segment-based assignment, we can have different $V_{dd}$-levels within one routing tree, and the $V_{dd}$-level constraints can be expressed as follows.

$$v_{ij} \le v_{ij}, 0 \le i < N_r, 0 \le j < N_s(i), k \in FO_{ij} \quad (18)$$

For example, no $V_{ddL}$ switch should drive $V_{ddH}$ switches. The value $FO_{ij}$ gives the set of fan-out switches of jth switch in $R_i$. The timing constraints require that the maximal arrival time at $\mathcal{PO}$ with respect to $\mathcal{PI}$ is at most $T_{spec}$, for example considering all paths from $\mathcal{PI}$ to $\mathcal{PO}$, the sum of edge delays in each path p must be at most $T_{spec}$. As the number of paths from $\mathcal{PI}$ to $\mathcal{PO}$ can be exponential, the direct path-based formulation on timing constraints is impractical for analysis and optimization. Alternatively, the net-based formulation is used which partitions the constraints on path delay into constraints on delay across circuit elements or routing. Let a(v) be the arrival time for vertex v in $\mathcal{G}$ and the timing constraints become the following.

$$a(v) \leq T_{spec} \; \forall v \in \mathcal{PO} \tag{19}$$

$$a(v) = 0 \; \forall v \in \mathcal{PI} \tag{20}$$

$$a(u) + d(u,v) \leq a(v) \; \forall u \in \mathcal{V} \wedge v \in \mathcal{FO}_u \tag{21}$$

In the above $\mathcal{V}$ is the set of vertices in $\mathcal{G}$, d(u,v) is the delay from vertex u to v and $\mathcal{FO}_u$ is the set of fan-out vertices of u. The objective function of Eq. (22) below is provided to maximize the dynamic power reduction (1).

$$\text{Maximize} \sum_{i=0}^{N_r-1} f_s(i) N_t(i) \tag{22}$$

It should be noted that Eq. (22) may help to minimize interconnect leakage power that exponentially depends on the $V_{dd}$-level. The tree-based assignment problem consists of objective function of Eq. (22), $V_{dd}$-level constraints of Eq. (17) and timing constraints given by Eqs. (19), (20) and (21). The segment-based assignment problem is similar to the tree-based problem except that $V_{dd}$-level constraints of Eq. (18) replaces Eq. (17).

Optimal $V_{dd}$-level assignment to circuit elements in a circuit is known to be NP-complete. Below are presented two simple yet practical power sensitivity-based heuristic algorithms which generate results without performance loss, namely, tree-based heuristic and segment-based heuristic.

Starting with a placed and routed single-$V_{dd}$ circuit net list, a power sensitivity $$\frac{\Delta P}{\Delta V_{dd}}$$

is calculated, which is the power reduction by changing $V_{ddH}$ to $V_{ddL}$, for each switch with the wire it drives. The total power P includes both the dynamic power $P_d$ and the leakage power $P_s$. The power sensitivity of tree $\mathcal{R}i$ is defined as $$\sum_{j=0}^{N_s(i)-1} \frac{\Delta P_{ij}}{\Delta V_{dd}},$$

where $$\frac{\Delta P_{ij}}{\Delta V_{dd}}$$

is the power sensitivity of jth switch in $\mathcal{R}i$. A greedy algorithm is performed to assign $V_{dd}$-level for routing trees. In the beginning, $V_{ddH}$ is assigned to all the trees and the power sensitivity is calculated for each tree. We then iteratively perform the following steps. Voltage $V_{ddL}$ is assigned to the tree with the largest power sensitivity. After updating the circuit timing, we accept the assignment if the critical path delay does not increase. Otherwise, we reject the assignment and restore the $V_{dd}$-level of this tree to $V_{ddH}$. In either case, the tree will be marked as 'tried' and will not be re-visited in subsequent iterations. After the dual-$V_{dd}$ assignment, we obtain a dual-$V_{dd}$ net list.

The segment-based heuristic is quite similar to the tree-based heuristic except two principle differences. First, the assignment unit in the segment-based heuristic is an interconnect switch instead of a routing tree. We define a switch as a candidate switch if it is 'untried', and it does not drive any switch, or all of its fan-out switches have been marked as 'tried' and assigned to $V_{ddL}$. In the assignment, we try to assign $V_{ddL}$ to the candidate switch with maximum power sensitivity in each iteration. Second, when $V_{ddL}$ cannot be assigned to a candidate switch due to the timing violation, we mark all the upstream switches of that candidate switch in the same routing tree as 'tried' and those upstream switches stay marked $V_{ddH}$. As there is no level converter in routing channels, $V_{ddH}$ has to be assigned to all the upstream switches of a $V_{ddH}$ switch. We summarize the segment-based heuristic in FIG. 48.

The above algorithms implicitly allocate time slack first to routing trees or switches with higher transition density to reduce more power. Below, a linear programming (LP) based method is presented according to an aspect of the invention with explicit time slack allocation considering both global and local optimization. As the segment-based assignment in general provides a greater power reduction than tree-based assignment, only segment-based assignments are considered herein within the LP-based algorithm. The LP-based algorithm generally includes three phases: (1) allocating time slack to each routing tree by formulating the problem as an LP problem to maximize a lower bound of power reduction. (2) A bottom-up assignment algorithm is executed to achieve the optimal solution within each routing tree given the allocated time slack. And finally, (3) a refinement is executed to leverage surplus time slack. The details of this process are discussed below.

The slack $s_{ij}$ of a connection between the source and jth sink in $\mathcal{R}i$ is defined as the amount of delay which could be added to this connection without increasing the cycle time $T_{spec}$. We represent the slack $s_{ij}$ in multiple of $\Delta d$, where $\Delta d$ is the delay increase for an interconnect segment by changing the $V_{dd}$-level from $V_{ddH}$ to $V_{ddL}$.

FIG. 49A through 49D presents a three-pin routing tree as an example. Slacks S0 and S1 are the slacks allocated to two sinks Sink0 and Sink1, respectively. In FIG. 49A $V_{ddL}$ can be assigned to b2 given S0=1 and $V_{ddL}$ can be assigned to b3 given S1=1. When the slack S1 for Sink1 is increased to two in FIG. 49B, b0 has to stay $V_{ddH}$ restricted by S0=1. In other words, b0 is restricted by both slack S0 and S1, and $V_{ddL}$ can only be assigned to b0 when S0≥3^S1≥2. FIG. 49C shows the case in which $V_{ddL}$ is assigned to all the switches given S0=3∧S1=2. Therefore, there is an upper bound for slack that is useful and slack beyond that upper bound cannot lead to more $V_{ddL}$ switches. For the remainder of this section, we use slack to represent the useful slack. FIG. 49A and FIG. 49B show that we may achieve the same number of $V_{ddL}$ switches with different slacks.

Given a routing tree with arbitrary topology and allocated slack for each sink, we need to estimate the number of $V_{ddL}$ switches that can be achieved. We use $l_{ik}$ to represent the number of switches in the path from the source to kth sink in $\mathcal{R}i$. We define sink list $\mathcal{SL}_{ij}$ as the set of sinks in the fan-out cone of jth switch in $\mathcal{R}i$. We then estimate the number of $V_{ddL}$ switches that can be achieved given the allocated slack as follows.

$$F_n(i) = \sum_{j=0}^{N_s(i)-1} \min\left(\frac{s_{ik}}{l_{ik}} : \forall\, k \in SL_{ij}\right) \quad (23)$$

To estimate the number of $V_{ddL}$ switches that can be achieved in tree $\mathcal{R}i$, we first deliberately distribute the slack $s_{ik}$ evenly to the $l_{ik}$ switches in the path from source to kth sink in $\mathcal{R}i$. For a switch with multiple sinks in its fan out cone, we choose the minimum $s_{ik}/l_{ik}$ as the slack distributed to the switch. We then add the slack distributed to all the switches in $\mathcal{R}i$ and get the estimated number of $V_{ddL}$ switches. The rationale is that we consider kth sink with minimum $s_{ik}/l_{ik}$ in sink list $\mathcal{SL}_{ij}$ as the most critical sink to jth switch in $\mathcal{R}i$.

FIG. 49D gives an example and the estimated number of $V_{ddL}$ switches is calculated as follows.

$$F_n = S0/3 + S0/3 + S1/2 + \min(S0/3, S1/2)$$

For Eq. (23) which estimates $V_{ddL}$ switch number, we have the following theorem that can be proven by induction.

Theorem 1. Given a routing tree and allocated slack in multiple of $\Delta d$, Eq. (23) gives a lower bound of number of $V_{ddL}$ interconnect switches that can be achieved.

The objective function of Eq. (22) provides for maximizing power reduction which is the weighted sum of $V_{ddL}$ switch number within each tree, where the weight is the transition density. To incorporate Eq. (23), which gives a lower bound of $V_{ddL}$ switch number, into mathematical programming, we introduce a variable $f_n(i,j)$ for jth switch in $\mathcal{R}i$ and some additional constraints. The new objective function after transformation plus the additional constraints can be expressed as follows.

$$\text{Maximize} \sum_{i=0}^{N_r-1} f_s(i) F_n(i) \quad (24)$$

s.t.

$$F_n(i) = \sum_{j=0}^{N_s(i)-1} f_n(i,j) \quad 0 \le i < N_r \quad (25)$$

$$f_n(i,j) \le \frac{s_{ik}-1}{l_{ik}} \quad 0 \le i < N_r \wedge \forall\, k \in SL_{ij} \quad (26)$$

The slack $s_{ik}$ is a continuous variable normalized to $\Delta d$ in Eq. (26). To make Eq. (25) a lower bound of number of switches, we replace $$\frac{s_{ik}}{l_{ik}}$$

with $$\frac{s_{ik}-1}{l_{ik}}$$

in Eq. (26) to avoid floor function $\lfloor s_{ik} \rfloor$ that is not a linear operation. The slack upper bound constraints can be expressed as follows.

$$0 \le s_{ik} < 1_{ik}, 0 \le i < N_r \wedge 1 \le k \le N_k(i) \quad (27)$$

In the above, $N_k(i)$ is the number of sinks in $R_i$. The timing constraints in Eq. (21) are modified as follows. For the edges corresponding to routing in $\mathcal{G}$, the constraints considering slack can be expressed as the following.

$$a(p_{io}) + d(p_{io}, p_{ik}) + s_{ik} \cdot \Delta d \le a(p_{ik})$$

$$0 \le i < N_r \wedge \forall\, p_{ik} \in \mathcal{FO}_{pio} \quad (28)$$

In Eq. 28 vertex $p_{io}$ is the source of $R_i$ in $\mathcal{G}$, vertex $p_{ik}$ is kth sink of $R_i$ in $\mathcal{G}$ and $d(p_{io}, p_{ik})$ is the delay from $p_{io}$ to $p_{ik}$ in $R_i$ using $V_{ddH}$. For the edges other than routing in $\mathcal{G}$, the constraints can be expressed as follows.

$$a(u) + d(u,v) \le a(v) \; \forall u \in \mathcal{V} \wedge u \notin \mathcal{SRC} \wedge v \in \mathcal{FO}_u \quad (29)$$

In Eq. (14) $\mathcal{SRC}$ is a subset of $\mathcal{V}$ and gives the set of vertices corresponding to routing tree sources. We formulate the time slack allocation problem using objective function of Eq. (24), additional constraints in Eq. (25) and Eq. (29), slack upper bound constraints of Eq. (27), plus timing constraints of Eqs. (19), (20), (28) and (29). It is easy to verify the following theorem.

Theorem 2. The time slack allocation problem is a linear programming (LP) problem. In this section, we use the LP solver from Eq. (28) to solve the above problem. For the remainder of this section, we use LP problem to represent the time slack allocation problem.

Given the allocated slack for each routing tree after solving the LP problem, we perform a bottom-up assignment within each tree to leverage the allocated slack. For each tree $R_i$, $V_{ddH}$ is first assigned to all the switches in $R_i$. We then iteratively perform the following steps in a bottom-up fashion. We assign $V_{ddL}$ to a candidate switch and mark the switch as 'tried'. After updating the circuit timing, we reject the assignment and restore the $V_{dd}$-level of the switch to $V_{ddH}$ if the delay increase at any sink exceeds the allocated slack. The iteration terminates when there is no candidate switch in $R_i$.

Theorem 3. Given a routing tree $R_i$ and allocated slack for each sink, the bottom-up assignment gives the optimal assignment solution when $V_{dd}$-level converters cannot be used.

The above theorem can be easily proven by contradiction.

Theorem 4. Given a routing tree $R_i$ in which each switch has a uniform load capacitance and the same transition density, and $V_{dd}$-level converter can be used, there exists a power-optimal $V_{dd}$-level assignment for any given slacks without using $V_{dd}$-level converters.

Sketch of proof: It is easy to prove that for an optimal solution using level converters, each $V_{ddL}$ switch in $R_i$ can drive at most one $V_{ddH}$ switch by contradiction. By keeping swapping $V_{dd}$-level of the $V_{ddL}$ switch and its fan-out $V_{ddH}$ switch in the optimal solution, we can achieve a solution with the same number of $V_{ddL}$ switches as the optimal solution, but no level converter is needed.

After net-level assignment, we may further reduce power by leveraging surplus slack. FIG. 49B shows a routing tree containing surplus slack. Value $b_0$ has to stay at $V_{ddH}$ restricted by S0=1. Therefore, Sink1 can only consume one unit slack from S1 and there is surplus slack of 1. To leverage surplus slack, we mark all the $V_{ddH}$ switches as 'untried' but keep the $V_{ddL}$ switches as 'tried', and then perform the segment-based heuristic (see FIG. 48) to achieve more $V_{ddL}$ switches and further reduce power.

In this portion we describe testing on the MCNC benchmark set and present the interconnect power and area reduction by the three algorithms compared to the baseline using $V_{dd}$-programmable interconnects with level converters as described in a previous section. We use the same $V_{dd}$-programmable interconnects as in that section, however, no level converter is inserted in the routing channels. The unused interconnect switches are power-gated in either case. Also as in that prior section we use 1.3 v for $V_{ddH}$ and 0.8 v for $V_{ddL}$ under 100 nm technology node. We use our FPGA evaluation package fpgaEva-LP2 to verify our power reduction. Because the power model in fpgaEva-LP2 is more accurate than the power model in our problem formulations, using fpgaEva-LP2 verifies both our modeling and problem formulations.

We present the interconnect power reduction in Table 40. Column 6 and Column 7 of that table are the interconnect dynamic power and leakage power for the baseline, respectively. By removing level converters in routing channels, we reduce interconnect leakage power by 91.78% (see column 8 of table). We can also reduce area by removing configurable level converters. As shown in Table 41, the interconnect device area is reduced by 25.48% compared to the prior section "Vdd-programmability to Reduce FPGA Interconnect Power", where the area is represented in number of minimum width transistors. Column 2-5 in Table 40 presents the percentage of $V_{ddL}$ switches achieved by the three algorithms compared to the sensitivity-based heuristic that uses a switch as an assignment unit in the prior section. The tree-based heuristic, segment-based heuristic and LP-based algorithm achieved 67.89%, 85.72% and 85.93% $V_{ddL}$ switches, respectively.

Both the segment-based heuristic and LP based algorithm provide better performance than the tree-based heuristic, and achieve almost the same number of $V_{ddL}$ switches. In contrast, the sensitivity-based heuristic in described in that prior section achieved 83.97% $V_{ddL}$ switches for $V_{dd}$-programmable interconnects with level converters.

Both segment-based heuristic and LP-based algorithm achieve more $V_{ddL}$ switches than the in the prior section because we remove the delay overhead of level converters in the routing. Column 9-11 of Table 41 present the interconnect dynamic power achieved by the three algorithms. Compared to the prior section, the segment-based heuristic and LP based algorithm reduce interconnect dynamic power by 1.92% and 4.68%, respectively. The tree-based heuristic cannot reduce interconnect dynamic power compared to the prior section as the assignment unit is a tree. Note that we assume wire segment length and wire capacitance per segment do not change when level converters are removed. Therefore, the dynamic power reduction is pessimistic and will be larger in reality.

Column 12-14 in Table 40 present the overall interconnect power reduction. Compared to the previous section, the tree-based heuristic, segment-based heuristic and LP-based algorithm reduce interconnect power by 58.03%, 64.19% and 65.13%, respectively. The LP-based algorithm achieves the best power reduction as it considers both global and local optimization. The segment-based heuristic achieves slightly smaller power reduction compared to the LP-based algorithm. Without considering the delay overhead of level converters, the preceding section may achieve more $V_{ddL}$ switches as the $V_{dd}$-programmable interconnects with level converters are more flexible in $V_{dd}$-level assignment.

Table 42 compares the run time between the three algorithms. The tree-based heuristic is the fastest among the three algorithms. The segment-based heuristic and the LP-based algorithm take 1.85× and 6.66× run time compared to the fastest one. For the largest circuit clma, the LP-based algorithm cannot solve the LP problem after executing for 20 hours. Compared to the LP-based method, the segment-based heuristic has slightly smaller power reduction, but runs 4× faster and is effective for large circuits. The LP-based algorithm is worthwhile for small circuits and can achieve the best power reduction.

We have developed chip-level dual-$V_{dd}$ assignment methods to guarantee that no $V_{ddL}$ switch drives $V_{ddH}$ switches. This removes the need of $V_{dd}$-level converters and reduces interconnect leakage and interconnect device area by 91.78% and 25.48% respectively compared to the prior section. We have presented two simple yet practical power sensitivity-based heuristics, tree-based heuristic and segment-based heuristic, which implicitly allocate time slack first to interconnect switch higher transition density and assign $V_{ddL}$ to them for more power reduction. In addition, a linear programming (LP) based algorithm is taught in which time slack is first explicitly allocated to each routing tree by formulating the problem as an LP problem to maximize a lower bound of power reduction, and then the $V_{dd}$-level assignment is solved optimally within each routing tree given the allocated time slack.

Testing has been conducted the experiments on MCNC benchmark set and compared the power reduction by the three algorithms. (The runtime includes single-$V_{dd}$ placement and routing by VPR and generating the interface files between VPR and fpgaEva-LP2.) Compared to the previous section, the LP-based algorithm herein obtains the best power reduction and reduces interconnect power by 65.13% without performance loss. The tree-based heuristic and segment-based heuristic reduce interconnect power by 58.03% and 64.19%, respectively. Compared to the LP-based algorithm, the segment-based heuristic has slightly smaller power reduction, but runs 4× faster and is effective for large circuits.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

$V_{dd}/V_t$ Combinations for Constant-Leakage $V_{dd}$ Scaling Scheme

| $V_{dd}$ (V) | NMOS-$V_t$ (Volts) | PMOS-$V_t$ (Volts) |
|---|---|---|
| 1.3 v | 0.2607 | −0.3030 |
| 1.0 v | 0.2205 | −0.2530 |

TABLE 1-continued $V_{dd}/V_t$ Combinations for Constant-Leakage $V_{dd}$ Scaling Scheme

| $V_{dd}$ (V) | NMOS-$V_t$ (Volts) | PMOS-$V_t$ (Volts) |
|---|---|---|
| 0.9 | 0.2105 | −0.2389 |
| 0.8 | 0.1884 | −0.2254 |

TABLE 2

SPICE Simulation Results for Single-supply Level Converter

| $V_{dd}$ (V) | delay (nS) | Energy/switch (fJ) | Leakage Pwr (uW) |
|---|---|---|---|
| 1.3 v/1.0 v | 0.0814 | 7.40 | 0.0104 |
| 1.3 v/0.9 v | 0.0801 | 8.05 | 0.0139 |
| 1.3 v/0.8 | 0.0845 | 9.73 | 0.0240 |

TABLE 3

Summary of 3 FPGA Fabrics

| Fabric name | $V_{dd}$ level across chip | $V_t$ level across chip | SRAM cell | LUT type | Layout Pattern (in terms of $V_{dd}$) |
|---|---|---|---|---|---|
| arch-SVST | single | single | normal-$V_t$ | SVST | uniform |
| arch-SVDT | single | dual | high-$V_t$ | SVDT | uniform |
| arch-DVDT | dual | dual | high-$V_t$ | SVDT | row/interleaved |

TABLE 4

Percentage of $V_{ddL}$ Logic Blocks

| circuit | # logic blocks | # I/O blocks | % $V_{ddL}$ logic blocks |
|---|---|---|---|
| alu4 | 162 | 22 | 74.07 |
| apex2 | 213 | 41 | 46.01 |
| apex4 | 134 | 28 | 60.45 |
| bigkey | 294 | 426 | 89.12 |
| clma | 1358 | 144 | 80.93 |
| des | 218 | 501 | 74.31 |
| diffeq | 195 | 103 | 83.59 |
| dsip | 588 | 426 | 54.32 |
| elliptic | 666 | 245 | 90.74 |
| ex1010 | 513 | 20 | 75.66 |
| ex5p | 194 | 71 | 60.98 |
| frisc | 731 | 136 | 95.13 |
| misex3 | 181 | 28 | 57.52 |
| pdc | 624 | 56 | 69.54 |
| s298 | 266 | 10 | 82.81 |
| s38417 | 982 | 135 | 88.67 |
| s38584 | 1046 | 342 | 96.73 |
| seq | 274 | 76 | 53.03 |
| spla | 461 | 122 | 79.70 |
| tseng | 305 | 174 | 86.26 |
| Avg | | | 74.98 |

TABLE 5

Power Savings by Pre-defined Dual-$V_{dd}$/Dual-$V_t$ Fabrics

| circuit | arch-SVST (baseline) Power (watt) | arch-SVDT power saving | arch-DVDT power saving |
|---|---|---|---|
| Results for Combinational Circuits | | | |
| alu4 | 0.0798 | 8.5% | 14.9% |
| apex2 | 0.108 | 9.3% | 7.7% |

TABLE 5-continued

Power Savings by Pre-defined Dual-$V_{dd}$/Dual-$V_t$ Fabrics

| circuit | arch-SVST (baseline) Power (watt) | arch-SVDT power saving | arch-DVDT power saving |
|---|---|---|---|
| apex4 | 0.0536 | 12.3% | 16.8% |
| des | 0.234 | 10.7% | 13.6% |
| ex1010 | 0.179 | 17.3% | 12.3% |
| ex5p | 0.059 | 11.6% | 16.1% |
| misex3 | 0.0753 | 9.4% | 13.1% |
| pdc | 0.256 | 14.7% | 15.0% |
| seq | 0.0927 | 9.4% | 4.3% |
| spla | 0.180 | 12.4% | 22.2% |
| avg. | | 11.6% | 13.6% |
| Results for Sequential Circuits | | | |
| bigkey | 0.148 | 12.3% | 22.1% |
| clma | 0.632 | 14.8% | 18.7% |
| diffeq | 0.0391 | 19.7% | 13.8% |
| dsip | 0.134 | 14.5% | 22.2% |
| elliptic | 0.140 | 16.3% | 12.0% |
| frisc | 0.190 | 19.2% | 18.0% |
| s298 | 0.0736 | 13.4% | 9.3% |
| s38417 | 0.307 | 11.7% | 6.9% |
| s38584 | 0.261 | 10.2% | 5.6% |
| tseng | 0.0351 | 14.0% | 11.8% |
| avg. | | 14.6% | 14.1% |

TABLE 6

Power-off State Leakage for a P-block Containing 4-LUT

| | P-block leakage power in power-off state (watts) | |
|---|---|---|
| $V_{dd}$ | normal power switch | gate-boosted power-switch |
| 1.3 v | 3.46E−07 | 2.17E−09 |
| 1.0 v | 3.37E−07 | 9.28E−10 |

TABLE 7

Delay and Power for a Level Converter

| $V_{ddH}/V_{ddL}$ | delay (nS) | leakage power (µW) | switch energy (fJ) |
|---|---|---|---|
| 1.3 v/1.0 v | 0.0814 | 0.0104 | 7.40 |
| 1.3 v/0.9 v | 0.0801 | 0.0139 | 8.05 |
| 1.3 v/0.8 v | 0.0845 | 0.0240 | 9.73 |

TABLE 8

Power Switch Transistor Area

| | arch-SV | arch-DV | |
|---|---|---|---|
| | | H/L/P = 1/1/3 | 100% P-blks |
| area overhead | 0% | 14% | 24% |

TABLE 9

Results from Design Flow Refinement

| | # of VddL P-blocks | | | critical path delay (ns) | | |
|---|---|---|---|---|---|---|
| circuit | before refine | after refine | (% diff) | before refine | after refine | (% diff) |
| alu4 | 83 | 70 | −15.66% | 11.3 | 10.2 | −9.07% |
| apex4 | 54 | 59 | 9.26% | 11.2 | 10.8 | −3.76% |

TABLE 9-continued

Results from Design Flow Refinement

| | # of VddL P-blocks | | | critical path delay (ns) | | |
|---|---|---|---|---|---|---|
| circuit | before refine | after refine | (% diff) | before refine | after refine | (% diff) |
| bigkey | 164 | 170 | 3.66% | 6.84 | 6.53 | −4.45% |
| clma | 774 | 793 | 2.45% | 25.3 | 24.3 | −3.75% |
| des | 105 | 110 | 4.76% | 11.9 | 11.0 | −6.98% |
| diffeq | 100 | 110 | 10.00% | 14.0 | 13.7 | −2.43% |
| dsip | 58 | 78 | 34.48% | 5.94 | 5.61 | −5.60% |
| elliptic | 229 | 233 | 1.75% | 17.4 | 16.6 | −4.45% |
| ex5p | 49 | 47 | −4.08% | 11.8 | 11.2 | −4.81% |
| frisc | 344 | 342 | −0.58% | 24.6 | 24.2 | −1.55% |
| misex3 | 59 | 83 | 40.68% | 10.7 | 10.7 | 0% |
| pdc | 268 | 294 | 9.70% | 16.0 | 15.6 | −2.36% |
| s298 | 119 | 120 | 0.84% | 22.9 | 21.8 | −5.07% |
| s38417 | 459 | 467 | 1.74% | 15.9 | 15.0 | −5.90% |
| s38584.1 | 406 | 409 | 0.74% | 11.5 | 11.4 | −0.95% |
| seq | 72 | 97 | 34.72% | 10.7 | 10.3 | −3.48% |
| spla | 226 | 187 | −17.72% | 15.2 | 13.7 | −10.1% |
| tseng | 70 | 70 | 0% | 14.2 | 14.1 | −1.38% |
| avg. | | | 6.52% | | | −4.23% |

TABLE 10

Power Savings using arch-DV compared to arch-SV Baseline

| | arch-SV (baseline) | | arch-DV (H/L/P = 1/1/3) | | | arch-DV (100% P-blocks) | | |
|---|---|---|---|---|---|---|---|---|
| circuit | logic Pwr (W) | total Pwr (W) | logic Pwr saving | (by pwr-gating) | total Pwr saving | logic Pwr saving | (by pwr-gating) | total Pwr saving |
| alu4 | 0.0112 | 0.0769 | 27.06% | (0.94%) | 12.66% | 34.20% | (1.57%) | 15.83% |
| apex4 | 0.0063 | 0.0500 | 24.33% | (2.84%) | 4.18% | 22.18% | (4.74%) | 7.58% |
| bigkey | 0.0331 | 0.1375 | 39.79% | (12.42%) | 19.16% | 53.39% | (20.71%) | 24.89% |
| clma | 0.0532 | 0.5450 | 24.78% | (0.34%) | 3.07% | 30.07% | (0.57%) | 8.82% |
| des | 0.0448 | 0.2136 | 46.12% | (18.13%) | 10.36% | 56.26% | (30.22%) | 19.07% |
| diffeq | 0.0068 | 0.0360 | 20.47% | (0.49%) | 7.02% | 25.39% | (0.81%) | 11.01% |
| dsip | 0.0277 | 0.1280 | 49.20% | (20.78%) | 22.27% | 66.46% | (34.64%) | 24.17% |
| elliptic | 0.0176 | 0.1236 | 26.49% | (1.54%) | 7.89% | 35.10% | (2.56%) | 11.62% |
| ex5p | 0.0079 | 0.0534 | 27.51% | (3.90%) | 10.51% | 22.94% | (6.51%) | 8.50% |
| frisc | 0.0204 | 0.1603 | 23.55% | (1.88%) | 4.51% | 33.36% | (3.14%) | 9.57% |
| misex3 | 0.0081 | 0.0682 | 21.67% | (2.75%) | 2.17% | 22.06% | (4.59%) | 8.12% |
| pdc | 0.0201 | 0.2317 | 20.26% | (0.89%) | 4.41% | 28.56% | (1.48%) | 8.32% |
| s298 | 0.0114 | 0.0714 | 23.36% | (0.13%) | 6.21% | 26.32% | (0.22%) | 12.87% |
| s38417 | 0.0511 | 0.2995 | 23.01% | (1.38%) | 4.45% | 31.27% | (2.30%) | 17.45% |
| s38584 | 0.0459 | 0.2590 | 36.34% | (0.66%) | 15.47% | 49.88% | (1.09%) | 24.99% |
| seq | 0.0106 | 0.0924 | 25.35% | (3.40%) | 3.38% | 27.11% | (5.65%) | 8.54% |
| spla | 0.0165 | 0.1684 | 28.46% | (0.48%) | 15.25% | 32.32% | (0.79%) | 14.64% |
| tseng | 0.0063 | 0.0325 | 27.39% | (2.67%) | 9.81% | 41.47% | (4.44%) | 21.20% |
| avg. | — | — | 28.62% | (4.20%) | 9.04% | 35.46% | (7.00%) | 14.29% |

TABLE 11

Utilization Rate of Interconnect Switches

| | Interconnect Switches | | |
|---|---|---|---|
| Circuit | Total | Unused | Utilization rate % |
| alu4 | 36478 | 31224 | 14.40 |
| apex4 | 43741 | 37703 | 13.80 |
| bigkey | 63259 | 57017 | 9.87 |
| clma | 653181 | 593343 | 9.16 |
| des | 87877 | 79932 | 9.04 |
| diffeq | 42746 | 36974 | 13.50 |
| dsip | 75547 | 70138 | 7.16 |
| elliptic | 140296 | 125800 | 10.33 |
| ex5p | 45404 | 39288 | 13.47 |
| frisc | 238853 | 216993 | 9.15 |
| misex3 | 39928 | 33819 | 15.30 |

TABLE 11-continued

Utilization Rate of Interconnect Switches

| Circuit | Interconnect Switches Total | Unused | Utilization rate % |
|---|---|---|---|
| pdc | 268167 | 238610 | 11.02 |
| s298 | 43725 | 37641 | 13.91 |
| s38417 | 243315 | 216577 | 10.99 |
| s38584 | 195363 | 174460 | 10.70 |
| seq | 61344 | 53173 | 13.32 |
| spla | 153235 | 134991 | 11.91 |
| tseng | 29051 | 25026 | 13.85 |
| Average | | | 11.90 |

TABLE 12

Delay and Power of $V_{dd}$-Programmable Routing Switch

| $V_{dd}$ | Routing switch delay (nS) (% increase) WITHOUT $V_{dd}$ programmability | WITH $V_{dd}$ programmability | Energy per switch (Joule) WITHOUT $V_{dd}$ programmability | WITH $V_{dd}$ programmability |
|---|---|---|---|---|
| 1.3 v | 5.90E−11 | 6.26E−11 (6.00%) | 3.3049E−14 | 3.2501E−14 |
| 1.0 v | 6.99E−11 | 7.42E−11 (6.17%) | 1.6320E−14 | 1.6589E−14 |

TABLE 13

Percentage for $V_{ddL}$ Interconnect Switches and $V_{ddL}$ Logic Blocks

| Circuit | Number of Blocks Logic | Input/Output | $V_{ddL}$ Interconnect switches (%) | Logic Blocks (%) |
|---|---|---|---|---|
| alu4 | 162 | 22 | 73.64 | 74.69 |
| apex2 | 213 | 41 | 75.57 | 47.42 |
| apex4 | 134 | 28 | 72.42 | 62.69 |
| bigkey | 294 | 426 | 85.63 | 89.12 |
| clma | 1358 | 144 | 86.68 | 80.78 |
| des | 218 | 501 | 86.92 | 75.69 |
| diffeq | 195 | 103 | 94.72 | 83.59 |
| dsip | 588 | 426 | 89.12 | 53.70 |
| elliptic | 666 | 245 | 95.84 | 90.74 |
| ex1010 | 513 | 20 | 75.74 | 74.24 |
| ex5p | 194 | 71 | 81.03 | 62.60 |
| frisc | 731 | 136 | 99.48 | 95.13 |
| misex3 | 181 | 28 | 75.07 | 58.17 |
| pdc | 624 | 56 | 81.15 | 70.07 |
| s298 | 266 | 10 | 90.64 | 82.81 |
| s38417 | 982 | 135 | 93.32 | 88.55 |
| s38584 | 1046 | 342 | 98.09 | 96.88 |
| seq | 274 | 76 | 72.80 | 53.03 |
| spla | 461 | 122 | 82.67 | 81.20 |
| tseng | 305 | 174 | 98.13 | 86.26 |
| Average | | | 85.43 | 75.37 |

TABLE 14

Power Savings by Fully $V_{dd}$ Programmable Fabric Compared to arch-SV Baseline

| | arch-SV (baseline) Power (W) | | arch-PV-logic | arch-PV-fpga Total Power Savings | |
|---|---|---|---|---|---|
| Circuit | Logic | Input/Output | Total Power savings (%) | 1-bit control (%) | 2-bit control |
| alu4 | 0.0657 | 0.0769 | 15.83 | 23.93 | 39.12 |
| apex4 | 0.0437 | 0.0500 | 7.58 | 13.75 | 41.31 |
| bigkey | 0.1044 | 0.1375 | 24.89 | 28.88 | 49.12 |
| clma | 0.4918 | 0.5450 | 8.82 | 20.13 | 60.57 |
| des | 0.1688 | 0.2136 | 19.07 | 31.22 | 49.60 |
| diffeq | 0.0292 | 0.0360 | 11.01 | 14.47 | 52.10 |
| dsip | 0.1003 | 0.1280 | 24.17 | 28.23 | 57.03 |
| elliptic | 0.1060 | 0.1236 | 11.62 | 22.92 | 60.98 |
| ex5p | 0.0455 | 0.0534 | 8.49 | 11.00 | 38.45 |
| frisc | 0.1399 | 0.1603 | 9.57 | 13.98 | 64.42 |
| misex3 | 0.0601 | 0.0682 | 8.12 | 15.65 | 33.43 |
| pdc | 0.2116 | 0.2317 | 8.32 | 16.76 | 56.37 |
| s298 | 0.0600 | 0.0714 | 12.87 | 25.06 | 44.43 |
| s38417 | 0.2484 | 0.2995 | 17.45 | 23.88 | 48.84 |
| s38584 | 0.2131 | 0.2590 | 24.99 | 39.52 | 62.97 |
| seq | 0.0818 | 0.0924 | 8.54 | 17.93 | 38.76 |
| spla | 0.1519 | 0.1684 | 14.64 | 21.82 | 53.50 |
| tseng | 0.0262 | 0.0325 | 21.20 | 30.65 | 58.91 |
| Average | | | 14.29 | 22.21 | 50.55 |

TABLE 15

Interconnect Power Savings for arch-PV-fpga with 2-bit Control

| | arch-SV (baseline) | | arch-PV-fpga (two-bit control) | | |
|---|---|---|---|---|---|
| circuit | interconnect power (W) | interconnect lkg. pwr (%) | interconnect power saving overall | leakage | dynamic |
| alu4 | 0.0657 | 27.42% | 41.52% | 78.35% | 27.51% |
| apex4 | 0.0437 | 44.02% | 47.43% | 79.04% | 22.63% |

TABLE 15-continued

Interconnect Power Savings for arch-PV-fpga with 2-bit Control

| | 2 | 3 | 4 | 5 | 6 |
|---|---|---|---|---|---|
| | arch-SV (baseline) | | arch-PV-fpga (two-bit control) | | |
| 1 | interconnect | interconnect | interconnect power saving | | |
| circuit | power (W) | lkg. pwr (%) | overall | leakage | dynamic |
| bigkey | 0.1044 | 32.73% | 52.51% | 80.61% | 38.85% |
| clma | 0.4918 | 56.81% | 66.97% | 82.83% | 46.07% |
| des | 0.1688 | 22.52% | 51.54% | 82.54% | 42.50% |
| diffeq | 0.0292 | 66.35% | 64.46% | 77.09% | 39.69% |
| dsip | 0.1003 | 37.57% | 57.12% | 84.07% | 40.89% |
| elliptic | 0.1060 | 58.09% | 69.73% | 80.71% | 54.46% |
| ex5p | 0.0455 | 44.26% | 47.15% | 79.87% | 21.24% |
| frisc | 0.1399 | 72.28% | 73.06% | 82.65% | 48.12% |
| misex3 | 0.0601 | 28.83% | 38.07% | 78.40% | 21.83% |
| pdc | 0.2116 | 55.76% | 61.78% | 82.02% | 36.15% |
| s298 | 0.0600 | 36.53% | 51.92% | 77.80% | 37.03% |
| s38417 | 0.2484 | 43.06% | 56.30% | 79.89% | 38.46% |
| s38584 | 0.2131 | 40.87% | 68.02% | 79.61% | 59.94% |
| seq | 0.0818 | 32.63% | 43.77% | 79.73% | 26.36% |
| spla | 0.1519 | 46.56% | 58.65% | 81.11% | 39.0% |
| steng | 0.0262 | 50.63% | 67.21% | 76.26% | 57.89% |
| Avg. | | 44.27% | 56.51% | 80.14% | 38.81% |

TABLE 16

Utilization Rate of Interconnection Switches

| circuit | total interconnect switches | unused interconnect switches | utilization rate (%) |
|---|---|---|---|
| alu4 | 36478 | 31224 | 14.40 |
| apex4 | 43741 | 37703 | 13.80 |
| bigkey | 43741 | 37703 | 9.87 |
| clma | 653181 | 593343 | 9.16 |
| des | 87877 | 79932 | 9.04 |
| diffeq | 42746 | 36974 | 13.50 |
| dsip | 75547 | 70138 | 7.16 |
| elliptic | 140296 | 251800 | 10.33 |
| ex5p | 45404 | 39288 | 13.47 |
| frisc | 238853 | 216993 | 9.15 |
| misex3 | 39928 | 33819 | 15.30 |
| pdc | 268167 | 238610 | 11.02 |
| s298 | 43725 | 37641 | 13.91 |
| s38417 | 243315 | 216577 | 10.99 |
| s38584 | 195363 | 174460 | 10.70 |
| seq | 61344 | 53173 | 13.32 |
| spla | 153235 | 25026 | 11.91 |
| tseng | 29051 | 134991 | 13.85 |
| Avg. | | | 11.90% |

TABLE 17

Delay and Power of Power-Gating Routing Switch

| | routing switch delay (ns) | | energy per switch (Joule) | |
|---|---|---|---|---|
| Vdd | w/o power-gating | w/power-gating (incr. %) | w/o power-gating | w/ power-gating |
| 1.3 v | 5.90E−11 | 6.26E−11 (6.00%) | 3.3049E−14 | 3.2501E−14 |
| 1.0 v | 6.99E−11 | 7.42E−11 (6.17%) | 1.6320E−14 | 1.6589E−14 |

TABLE 18

Power Saving by arch-PV-PG Compared with arch-SV

| | 1 | | 2 arch-PV w/o power-gating | 3 arch-PV-PG w/ power-gating |
|---|---|---|---|---|
| | arch-SV (baseline) | | | |
| circuit | interconnect power (W) | total power (W) | total power saving | total power saving |
| alu4 | 0.0657 | 0.0769 | 15.83% | 29.09% |
| apex4 | 0.0437 | 0.0500 | 7.58% | 30.70% |
| bigkey | 0.1044 | 0.1375 | 24.89% | 40.49% |
| clma | 0.4918 | 0.5450 | 8.82% | 45.69% |
| des | 0.1688 | 0.2136 | 19.07% | 31.79% |
| diffeq | 0.0292 | 0.0360 | 11.01% | 45.25% |
| dsip | 0.1003 | 0.1280 | 24.17% | 43.66% |
| elliptic | 0.1060 | 0.1236 | 11.62% | 47.04% |
| ex5p | 0.0455 | 0.0534 | 8.49% | 31.49% |
| frisc | 0.1399 | 0.1603 | 9.57% | 58.33% |
| misex3 | 0.0601 | 0.0682 | 8.12% | 22.36% |
| pdc | 0.2116 | 0.2317 | 8.32% | 45.64% |
| s298 | 0.0600 | 0.0714 | 12.87% | 28.64% |
| s38417 | 0.2484 | 0.2995 | 17.45% | 36.60% |
| s38584 | 0.2131 | 0.2590 | 24.99% | 43.28% |
| seq | 0.0818 | 0.0924 | 8.54% | 24.76% |
| spla | 0.1519 | 0.1684 | 14.64% | 39.88% |
| tseng | 0.0262 | 0.0325 | 21.20% | 42.55% |
| avg. | — | — | 14.29% | 38.18% |

TABLE 19

Percentage for VddL Nets and Logic Assigned Under Dual-Vdd w/Zero Delay Increase

| circuit | # nets | # logic blocks | # I/O blocks | VddL nets (%) | VddL logic blocks (%) |
|---|---|---|---|---|---|
| alu4 | 782 | 162 | 22 | 49.74 | 82.10 |
| apex2 | 1246 | 213 | 41 | 30.02 | 69.95 |
| apex4 | 849 | 134 | 28 | 35.45 | 78.36 |
| bigkey | 1542 | 294 | 426 | 67.77 | 85.03 |
| clma | 7995 | 1358 | 144 | 69.74 | 89.84 |
| des | 1325 | 218 | 501 | 52.83 | 80.73 |
| diffeq | 1291 | 195 | 103 | 63.36 | 85.64 |
| dsip | 1139 | 588 | 426 | 71.29 | 88.89 |
| elliptic | 2617 | 666 | 245 | 78.45 | 92.16 |
| ex1010 | 3033 | 513 | 20 | 37.36 | 71.40 |
| ex5p | 834 | 194 | 71 | 20.38 | 53.66 |
| frisc | 3240 | 731 | 136 | 88.49 | 95.97 |
| misex3 | 828 | 181 | 28 | 11.35 | 51.63 |
| pdc | 2933 | 624 | 56 | 58.95 | 88.20 |
| s298 | 908 | 66 | 10 | 47.03 | 78.91 |
| s38417 | 5426 | 982 | 135 | 64.17 | 80.05 |
| s38584 | 4502 | 1046 | 342 | 90.94 | 95.88 |
| seq | 1138 | 274 | 76 | 20.74 | 61.62 |
| spla | 2091 | 461 | 122 | 54.52 | 88.47 |
| tseng | 918 | 305 | 174 | 78.21 | 87.02 |
| Avg | | | | 54.54 | 80.28 |

TABLE 20

Power Savings Using arch-PV-PG

| | 1 | | 2 arch-PV | 3 arch-DV-PG (1.0 W) | | | 4 arch-DV-PG (1.5 W) | | | 5 arch-DV-PG (2.0 W) | | |
|---|---|---|---|---|---|---|---|---|---|---|---|---|
| | arch-SV (baseline) | | total | | | total | | | total | | | total |
| circuit | interconnect power (W) | total power (W) | power saving (%) | interconnect power saving | | power saving (%) | interconnect power saving | | power saving (%) | interconnect power saving | | power saving (%) |
| | | | | dynamic | leakage | | dynamic | leakage | | dynamic | leakage | |
| alu4 | 0.0657 | 0.0769 | 15.83 | −5.90 | 82.01 | 22.04 | 6.86 | 79.87 | 29.15 | 17.40 | 77.98 | 35.08 |
| apex4 | 0.0437 | 0.0500 | 7.58 | −77.27 | 82.43 | 18.48 | 9.64 | 80.33 | 38.64 | 8.88 | 78.41 | 36.69 |
| bigkey | 0.1044 | 0.1375 | 24.89 | 10.93 | 83.77 | 29.98 | 18.07 | 82.17 | 41.04 | 33.04 | 80.21 | 48.65 |
| clma | 0.4918 | 0.5450 | 8.82 | 8.72 | 86.41 | 50.27 | 9.63 | 84.46 | 48.89 | 26.61 | 82.49 | 53.28 |
| des | 0.1688 | 0.2136 | 19.07 | −13.34 | 85.80 | 24.10 | 4.89 | 84.11 | 30.12 | 22.13 | 82.27 | 40.66 |
| diffeq | 0.0292 | 0.0360 | 11.01 | 1.99 | 79.97 | 45.17 | 34.71 | 78.20 | 51.97 | 33.79 | 76.51 | 51.94 |
| dsip | 0.1003 | 0.1280 | 24.17 | −10.31 | 87.49 | 37.97 | 9.45 | 85.70 | 45.73 | 33.81 | 83.80 | 54.28 |
| elliptic | 0.1060 | 0.1236 | 11.62 | 21.60 | 84.10 | 52.90 | 31.90 | 82.39 | 53.73 | 36.33 | 80.34 | 54.91 |
| ex5p | 0.0455 | 0.0534 | 8.49 | −12.19 | 83.25 | 36.34 | −12.08 | 81.07 | 27.18 | 10.58 | 79.24 | 36.19 |
| frisc | 0.1399 | 0.1603 | 9.57 | 5.46 | 85.86 | 56.61 | 39.95 | 83.92 | 62.62 | 47.93 | 82.26 | 63.91 |
| misex3 | 0.0601 | 0.0682 | 8.12 | −9.31 | 81.18 | 23.69 | −17.79 | 79.62 | 11.43 | 5.76 | 77.57 | 25.86 |
| pdc | 0.2116 | 0.2317 | 8.32 | −10.69 | 85.92 | 42.35 | −2.51 | 83.70 | 43.48 | 15.60 | 81.65 | 48.41 |
| s298 | 0.0600 | 0.0714 | 12.87 | 0.64 | 80.91 | 31.25 | −11.62 | 79.07 | 23.04 | 7.00 | 77.24 | 32.49 |
| s38417 | 0.2484 | 0.2995 | 17.45 | −23.33 | 83.15 | 30.07 | 0.68 | 81.38 | 23.10 | 27.70 | 79.47 | 44.76 |
| s38584 | 0.2131 | 0.2590 | 24.99 | −3.21 | 82.75 | 35.34 | 33.52 | 80.96 | 48.20 | 49.94 | 79.27 | 56.52 |
| seq | 0.0818 | 0.0924 | 8.54 | −47.99 | 83.00 | 13.95 | −33.90 | 81.02 | 11.16 | 6.32 | 79.18 | 30.00 |
| spla | 0.1519 | 0.1684 | 14.64 | −25.23 | 84.69 | 34.54 | 8.86 | 82.48 | 42.77 | 16.71 | 80.71 | 43.65 |
| tseng | 0.0262 | 0.0325 | 21.20 | 4.64 | 78.91 | 42.46 | 45.86 | 77.61 | 54.05 | 44.48 | 75.75 | 52.72 |
| avg. | — | — | 14.29 | −11.48 | 83.42 | 34.86 | 9.78 | 81.56 | 38.68 | 24.78 | 79.69 | 45.00 |

TABLE 21

Comparison of Device Area for Different FPGA Architectures

| | arch-SV (baseline) | arch-DV-PG (1.0 W) | arch-DV-PG (1.5 W) | arch-DV-PGA (2.0 W) | our other results |
|---|---|---|---|---|---|
| total FPGA area geometric mean/20 ckts | 7077044 | 11092744 | 15420197 | 20249865 | 22678225 |
| area overhead (%) | — | 57% | 118% | 186% | 220% |

TABLE 22

Interconnect Geometries at 100 nm Technology

| wire width | wire spacing | wire thickness |
|---|---|---|
| 0.56 um | 0.52 um | 1.08 um |

TABLE 23

Value of α to Determine Signal Transition Time

| | buffer delay | | |
|---|---|---|---|
| | <0.012 ns | <0.03 ns | ≥0.03 ns |
| α | 2 | 4.4 | 7 |

TABLE 24

Device and Interconnect Thresholds at 100 nm

| Device model | | | |
|---|---|---|---|
| | Vdd (V) | NMOS-Vt (V) | PMOS-Vt (V) |
| normal-Vt | 1.3 | 0.2607 | −0.3030 |
| high-Vt | 1.3 | 0.4693 | −0.5454 |

Interconnect model (wire info)

| width | spacing | thickness | dielectric const. |
|---|---|---|---|
| 0.56 um | 0.52 um | 1.08 um | 2.7 |

TABLE 25

Configurations for a Vdd-programmable Routing Switch

| state | VddH_En | VddL_En | Pass_En |
|---|---|---|---|
| $V_{ddH}$ | 0 | 1 | 1 |
| $V_{ddL}$ | 1 | 0 | 1 |
| power-gated | 1 | 1 | 0 |

TABLE 26

Configuration for $V_{dd}$-programmable Connection Switch

| state | Dec_Disable | Vdd_Sel | Pass_En | VddH_En | VddL_En |
|---|---|---|---|---|---|
| power-gated | 1 | — | 0 | — | — |
| power-gated | 0 | — | 0 | — | — |

TABLE 26-continued

Configuration for $V_{dd}$-programmable Connection Switch

| state | Dec_Disable | Vdd_Sel | Pass_En | VddH_En | VddL_En |
|---|---|---|---|---|---|
| $V_{ddH}$ | 0 | 1 | 1 | 0 | 1 |
| $V_{ddL}$ | 0 | 0 | 1 | 1 | 0 |

TABLE 27

Comparison of Architectural Aspects with a Baseline

| Vdd-prog. routing switch | | | SRAM-efficient Vdd-prog. routing switch | | | | | compared to baseline | | |
|---|---|---|---|---|---|---|---|---|---|---|
| SRAM cells | | | SRAM cells | | | NAND2 | | | | |
| number | leakage (watt) | area | number | leakage (watt) | area | leakage | area | Δ # of SRAM cells | leakage (watt) | Δ area |
| 3 | 2.32E−8 | 21.87 | 2 | 1.55E−8 | 14.58 | 3.49E−10 | 2.50 | −1 | −7.38E−9 | −4.79 |

32:1 connection block

| Vdd-prog. connection block | | | SRAM-efficient Vdd-prog. connection block | | | | | compared to baseline | | |
|---|---|---|---|---|---|---|---|---|---|---|
| SRAM cells | | | SRAM cells | | | control logic | | | | |
| number | leakage (watt) | area | number | leakage (watt) | area | leakage (watt) | area (watt) | Δ number SRAM cells | Δ leakage (watt) | Δ area |
| 69 | 5.32E−7 | 503.01 | 7 | 5.42E−8 | 43.74 | 3.30E−8 | 311 | −62 | −4.56E7 | −148.2 |

TABLE 28

Comparison of Decoder and Non-decoder Based Vdd Gateable Connection Blocks

| non-decoder based connection block | | | decoder based connection block | | | | | comparison baseline: w/o decoder | | |
|---|---|---|---|---|---|---|---|---|---|---|
| SRAM cells | | | SRAM cells | | | 5:32 decoder | | Δ # SRAM cells | Δ leakage (watt) | Δ area |
| number | leakage (watt) | area | number | leakage (watt) | area | leakage (watt) | area | | | |
| 32 | 2.47E−7 | 233.28 | 6 | 4.63E−8 | 43.74 | 2.00E−8 | 94.25 | −26 | −1.81E−7 | −95.29 |

TABLE 29

Summary of Baseline and Vdd-programmable Classes

| Architecture Class | Logic block | Interconnect |
|---|---|---|
| Class 0 (baseline) | single Vdd | single Vdd |
| Class 1 | programmable dual-Vdd | programmable dual-Vdd w/ LCs in the routing |
| Class 2 | programmable dual-Vdd | Vdd-gateable |
| Class 3 | programmable dual-Vdd | programmable dual-Vdd w/o LCs in routing chann. |

TABLE 30

Comparison of Class 1 and Class 2 FPGA with Baseline

| | Architecture Class | | | |
|---|---|---|---|---|
| | (baseline) Class 0 | Class 1 | Class 2 | Class 3 |
| min-E arch. (N, k) | (8, 4) | (8, 4) | (12, 4) | (12, 4) |
| energy (nJ/cycle) | 3.58 | 2.77 | 1.99 | 1.81 |
| energy saving (%) | — | 22.63% | 44.42% | 49.41% |
| min-D arch. (N, k) | (8, 7) | (8, 7) | (8, 7) | (8, 7) |
| delay (ns) | 10.46 | 10.88 | 10.89 | 10.88 |
| delay increase (%) | — | 4% | 4% | 4% |
| min-ED arch. (N, k) | (8, 4) | (12, 4) | (12, 4) | (12, 4) |
| ED product (nJ · ns) | 42.82 | 34.48 | 23.92 | 21.75 |

TABLE 30-continued

Comparison of Class 1 and Class 2 FPGA with Baseline

| | Architecture Class | | | |
|---|---|---|---|---|
| | (baseline) Class 0 | Class 1 | Class 2 | Class 3 |
| ED reduction | — | 19.48% | 44.14% | 49.21% |
| device area | 7014240 | 27245631 | 13943892 | 21557990 |
| area overhead | — | 288% | 99 | 207% |

TABLE 31

SRAM Cell and Device Overhead for Different Vdd-programmable FPGAs

| | total # of SRAM cells on chip | | | total device area | | | total # of SRAM cells | total device |
|---|---|---|---|---|---|---|---|---|
| Dominant Arch. (N, k) | Class0 baseline | Class1 (% overhead) | Class2 | Class0 baseline | Class1 | Class2 | Class3 (% overhead) | area Class3 |
| (8, 7) | 649218 | 88% | 2% | 11541440 | 149% | 41% | 17% | 102% |
| (6, 7) | 621929 | 89% | 2% | 10689783 | 164% | 42% | 20% | 116% |
| (6, 6) | 469504 | 128% | 3% | 10114162 | 195% | 56% | 31% | 140% |
| (10, 5) | 374174 | 164% | 3.4% | 9793576 | 189% | 50% | 33% | 129% |
| (12, 4) | 317391 | 190% | 4% | 9173613 | 197% | 52% | 40% | 135% |
| Average | — | 132% | 3% | — | 178% | 48% | 28% | 124% |

TABLE 32

Baseline Hyper-arch and Evaluation Ranges

| Vdd | Vt | N | K |
|---|---|---|---|
| Baseline FPGA device/architecture parameter values | | | |
| 0.9 v | 0.3 v | 8 | 4 |
| Value range for device/architecture optimization | | | |
| 0.8 v–1.1 v | 0.2 v–0.4 v | 6–12 | 3–7 |

TABLE 33

Trace Information and Circuit Parameters

Trace Parameters (depend on architecture)

| | |
|---|---|
| $N_i^u$ | # of used circuit elements of resource type i |
| $N_i^t$ | total # of circuit elements in resource type i |
| $S_i^u$ | avg. switching activity for a used ckt element of type i |
| $N_i^p$ | # of circuit elements of type i on the critical path |
| $\alpha_{sc}$ | ratio between short circuit power and switching power |

Device Parameters (depend on technology)

| | |
|---|---|
| $V_{dd}$ | power supply voltage |
| $V_t$ | threshold voltage |

Circuit Parameters (depend on circuit design and device)

| | |
|---|---|
| $P_i^s$ | avg. leakage power for a circuit element in resource type i |
| $C_i^u$ | avg. load capacitance of a circuit element of resource type i |
| $D_i$ | avg. delay of a circuit element in resource type i |

TABLE 34

Comparison of Switching Activity for Different Scale, Vdd and Vt

| | 70 nm $V_{dd}$ = 1.1 $V_t$ = 0.25 | | 100 nm $V_{dd}$ = 1.3 $V_t$ = 0.32 | | 70 nm $V_{dd}$ = 1.0 $V_t$ = 0.20 | |
|---|---|---|---|---|---|---|
| benchmark | logic | inter-connect | logic | inter-connect | logic | inter-connect |
| alu4 | 2.06 | 0.55 | 2.01 | 0.54 | 2.03 | 0.59 |
| apex2 | 1.73 | 0.47 | 1.75 | 0.47 | 1.70 | 0.47 |
| apex4 | 1.23 | 0.27 | 1.19 | 0.26 | 1.16 | 0.29 |

TABLE 34-continued

Comparison of Switching Activity for Different Scale, Vdd and Vt

| | 70 nm $V_{dd}$ = 1.1 $V_t$ = 0.25 | | 100 nm $V_{dd}$ = 1.3 $V_t$ = 0.32 | | 70 nm $V_{dd}$ = 1.0 $V_t$ = 0.20 | |
|---|---|---|---|---|---|---|
| benchmark | logic | inter-connect | logic | inter-connect | logic | inter-connect |
| bigkey | 1.75 | 0.56 | 1.96 | 0.59 | 1.71 | 0.55 |
| clma | 0.90 | 0.21 | 0.87 | 0.21 | 0.91 | 0.23 |

TABLE 35

Summary of FPGA Hyper-arch Classes

| hyper-arch Class | Case to study |
|---|---|
| Class1 | homogeneous-Vt w/o power-gating |
| Class2 | heterogeneous-Vt w/o power-gating |
| Class3 | homogeneous-Vt w/ power-gating |
| Class4 | heterogeneous-Vt w/ power-gating |

TABLE 36

Comparison of Parameters Across Arch' Classes

| Class | $V_{dd}$ (V) | $CV_t$ (V) | $IV_t$ (V) | (N, k) | ED (nJ · ns) | Area |
|---|---|---|---|---|---|---|
| Baseline | 0.9 | 0.30 | 0.30 | (8, 4) | 26.9 (0%) | 1 |
| Class1 | 0.9 | 0.30 | 0.30 | (6, 7) | 23.3 (13.4%) | 1.67 |
| Class2 | 0.9 | 0.20 | 0.25 | (8, 4) | 21.4 (20.5%) | 1 |
| Class3 | 0.9 | 0.25 | 0.25 | (12, 4) | 11.1 (58.9%) | 1.26 |
| Class4 | 0.9 | 0.20 | 0.25 | (8, 4) | 11.0 (59.0%) | 1.44 |

TABLE 37

Comparison Between Classes in Similar Performance Range

| Vdd (V) | Vt (V) | (N, K) | Energy (nJ) | Delay (ns) | ED (nJ·ns) | Vdd (V) | CVt (V) | IVt | (N, K) | Energy (nJ) | Delay (ns) | ED (nJ·ns) |
|---|---|---|---|---|---|---|---|---|---|---|---|---|
| Class 1 | | | | | | Class 2 | | | | | | |
| 0.9 | 0.30 | (6, 6) | 1.33 | 18.7 | 24.8 | 0.9 | 0.30 | 0.35 | (12, 4) | 1.23 | 18.9 | 23.2 |
| 0.9 | 0.30 | (8, 5) | 1.28 | 19.4 | 24.7 | 0.9 | 0.30 | 0.35 | (10, 4) | 1.19 | 18.9 | 22.5 |
| 0.9 | 0.30 | (10, 5) | 1.27 | 19.8 | 25.1 | 0.9 | 0.30 | 0.35 | (6, 4) | 1.16 | 20.1 | 23.3 |
| 0.9 | 0.30 | (12, 4) | 1.19 | 21.2 | 26.5 | 0.9 | 0.30 | 0.35 | (12, 4) | 1.14 | 20.5 | 23.7 |
| 0.9 | 0.30 | (6, 4) | 1.23 | 21.6 | 26.5 | 0.9 | 0.30 | 0.35 | (8, 4) | 1.09 | 22.1 | 24.1 |
| Class 3 | | | | | | Class 4 | | | | | | |
| 0.8 | 0.25 | (8, 5) | 0.71 | 19.0 | 13.5 | 0.9 | 0.25 | 0.30 | (12, 4) | 0.66 | 18.9 | 12.5 |
| 0.8 | 0.25 | (10, 5) | 0.70 | 19.4 | 13.7 | 0.9 | 0.25 | 0.30 | (8, 4) | 0.68 | 19.4 | 13.2 |
| 0.8 | 0.25 | (6, 4) | 0.65 | 20.0 | 13.0 | 0.8 | 0.25 | 0.25 | (6, 4) | 0.65 | 20.0 | 13.0 |
| 0.8 | 0.25 | (8, 4) | 0.62 | 20.9 | 12.9 | 0.8 | 0.25 | 0.25 | (8, 4) | 0.62 | 20.9 | 12.9 |
| 0.8 | 0.25 | (12, 4) | 0.62 | 21.0 | 12.9 | 0.8 | 0.25 | 0.25 | (12, 4) | 0.62 | 21.0 | 12.9 |

TABLE 38

Power and Delay Ranges for Different Device Settings

| Vdd (V) | Vt (V) | Min energy (nJ) | Max energy (nJ) | Min delay (ns) | Max delay (ns) |
|---|---|---|---|---|---|
| 0.9 | 0.25 | 1.84 | 2.07 | 12.7 | 16.2 |
| 0.9 | 0.30 | 1.19 | 1.33 | 17.9 | 21.6 |
| 0.9 | 0.35 | 0.98 | 1.09 | 29.3 | 36.7 |
| 1.0 | 0.25 | 2.31 | 3.13 | 11.0 | 13.9 |
| 1.0 | 0.30 | 1.12 | 1.30 | 20.3 | 24.3 |
| 1.0 | 0.35 | 5.50 | 16.0 | 9.77 | 12.0 |
| 1.1 | 0.25 | 3.10 | 8.74 | 12.1 | 14.9 |
| 1.1 | 0.30 | 1.98 | 4.77 | 16.1 | 20.4 |

TABLE 39

Notations Frequently Used

| | |
|---|---|
| $\mathcal{G}(\mathcal{V}, \mathcal{E})$ | timing graph |
| $\mathcal{PI}$ | set of all primary inputs and register outputs |
| $\mathcal{PO}$ | set of all primary outputs and register inputs |
| $\mathcal{FO}$ | set of all fanout vertices of vertex v in $\mathcal{G}$ |
| $\mathcal{SRC}$ | set of vertices corresponding to routing tree sources |
| $\mathcal{R}_i$ | ith routing tree in FPGA |
| $\mathcal{FO}$ | set of fanout switches of jth switch in $\mathcal{R}_i$ |
| $\mathcal{SL}_{ij}$ | set of sinks in the fanout cone of jth switch in $\mathcal{R}_i$ |
| a(v) | arrival time of vertex v in $\mathcal{G}$ |
| d(u, v) | delay from vertex u to vertex v in $\mathcal{G}$ |
| Nr | total number (#) of routing trees in FPGA |
| $v_{ij}$ | $V_{dd}$-level of jth switch in $\mathcal{R}_i$ |
| $l_{ik}$ | # of switches in the path from source to kth sink in $\mathcal{R}_i$ |
| $S_{ik}$ | allocated slack for kth sink in $\mathcal{R}_i$ |
| $p_{i0}$ | vertex in $\mathcal{G}$ corresponding to the source of $\mathcal{R}_i$ |
| pik | vertex in $\mathcal{G}$ corresponding to kth sink of $\mathcal{R}_i$ |
| fs(i) | transition density of $\mathcal{R}_i$ |
| Nk(i) | # of sinks in $\mathcal{R}_i$ |
| Ns(i) | total # of switches in $\mathcal{R}_i$ |
| Nl(i) | # of $V_{ddL}$ switches in $\mathcal{R}_i$ |
| Fn(i) | estimated # of $V_{ddL}$ switches in $\mathcal{R}_i$ |

TABLE 40

Relative Number of VddL Switches in Relation to Baseline

| | 2 | 3 | 4 | 5 | 6 | 7 | 8 | 9 | 10 | 11 | 12 | 13 | 14 |
|---|---|---|---|---|---|---|---|---|---|---|---|---|---|
| | | of VddL switches | | | interconnect power | | leakage | interconnect power w/o LCs compared to baseline | | | | | |
| | | w/o LCs | | | w/ LCs (baseline) | | | dynamic power | | | overall power | | |
| 1 circuit | w/ LCs [8] | tree based heuristic | segment based heuristic | LP based alg. | dynamic power (watt) | leakage power (watt) | power (from LC) removal) | tree based heuristic | segment based heuristic | LP based alg. | tree based heuristic | segment based heuristic | LP based alg. |
| alu4 | 69.12 | 49.01 | 73.70 | 74.93 | 0.03735 | 0.03444 | −91.22 | +20.90 | −1.35 | −5.00 | −32.88 | −44.46 | −46.36 |
| apex2 | 76.97 | 51.59 | 80.50 | 80.65 | 0.04472 | 0.05665 | −91.03 | +37.92 | +1.02 | −4.90 | −34.15 | −50.43 | −53.04 |
| apex4 | 71.44 | 48.12 | 73.24 | 74.09 | 0.02192 | 0.03863 | −91.14 | +30.72 | +4.09 | −3.52 | −47.03 | −56.67 | −59.42 |
| bigkey | 85.72 | 80.70 | 87.04 | 87.78 | 0.07125 | 0.08036 | −92.92 | +3.62 | −1.33 | −1.42 | −47.55 | −49.87 | −49.92 |
| des | 87.56 | 76.81 | 89.36 | 89.61 | 0.08156 | 0.11627 | −93.83 | +8.40 | −2.18 | −2.96 | −51.68 | −56.04 | −56.37 |
| diffeq | 93.89 | 84.61 | 94.01 | 94.07 | 0.00476 | 0.03666 | −89.68 | −4.37 | −6.60 | −6.54 | −79.88 | −80.14 | −80.13 |
| dsip | 86.56 | 80.76 | 87.55 | 87.73 | 0.07656 | 0.09994 | −94.27 | +6.04 | −1.19 | −1.53 | −50.76 | −53.89 | −54.04 |
| elliptic | 96.70 | 88.34 | 97.14 | 97.09 | 0.01716 | 0.12359 | −91.81 | −4.96 | −6.16 | −8.38 | −81.23 | −81.38 | −81.65 |
| ex1010 | 77.61 | 56.49 | 81.01 | 80.30 | 0.03800 | 0.16439 | −91.93 | +35.78 | −1.11 | −7.57 | −67.95 | −74.88 | −76.09 |
| ex5p | 73.26 | 53.16 | 76.67 | 75.44 | 0.01968 | 0.04033 | −91.54 | +16.45 | −2.17 | −3.75 | −56.13 | −62.23 | −62.75 |
| frisc | 99.44 | 97.17 | 99.42 | 99.45 | 0.01251 | 0.26407 | −93.74 | −11.93 | −11.33 | −12.18 | −90.03 | −90.01 | −90.04 |
| misex3 | 73.77 | 47.95 | 75.41 | 75.94 | 0.03653 | 0.03721 | −91.07 | +27.48 | +2.20 | −2.83 | −32.34 | −44.86 | −47.35 |
| pdc | 80.06 | 53.66 | 82.08 | 82.22 | 0.05591 | 0.24593 | −92.92 | +36.01 | −3.21 | −5.74 | −69.04 | −76.31 | −76.78 |
| s298 | 87.42 | 50.84 | 88.67 | 88.99 | 0.01269 | 0.04383 | −90.93 | +41.37 | −5.20 | −6.29 | −61.23 | −71.68 | −71.92 |
| s38417 | 90.76 | 83.72 | 92.04 | 92.41 | 0.06916 | 0.21047 | −91.27 | +10.91 | +0.24 | −3.19 | −66.00 | −68.63 | −69.48 |
| s38584 | 98.07 | 94.60 | 98.39 | 98.36 | 0.06632 | 0.17088 | −91.17 | +4.30 | −1.94 | −2.02 | −64.48 | −66.22 | −66.24 |
| seq | 71.87 | 48.12 | 74.38 | 75.32 | 0.04767 | 0.05663 | −91.59 | +28.07 | +1.06 | −5.03 | −36.90 | −49.24 | −52.03 |

TABLE 40-continued

Relative Number of VddL Switches in Relation to Baseline

| 1 circuit | 2 w/ LCs [8] | 3 of VddL switches w/o LCs tree based heuristic | 4 of VddL switches w/o LCs segment based heuristic | 5 of VddL switches w/o LCs LP based alg. | 6 interconnect power w/ LCs (baseline) dynamic power (watt) | 7 interconnect power w/ LCs (baseline) leakage power (watt) | 8 leakage power (from LC) removal) | 9 interconnect power w/o LCs compared to baseline dynamic power tree based heuristic | 10 interconnect power w/o LCs compared to baseline dynamic power segment based heuristic | 11 interconnect power w/o LCs compared to baseline dynamic power LP based alg. | 12 interconnect power w/o LCs compared to baseline overall power tree based heuristic | 13 interconnect power w/o LCs compared to baseline overall power segment based heuristic | 14 interconnect power w/o LCs compared to baseline overall power LP based alg. |
|---|---|---|---|---|---|---|---|---|---|---|---|---|---|
| spla | 77.64 | 49.11 | 80.28 | 80.46 | 0.04260 | 0.13954 | −92.37 | +39.25 | +0.29 | −5.74 | −61.59 | −70.70 | −72.11 |
| tseng | 97.63 | 95.22 | 97.75 | 97.88 | 0.00627 | 0.02527 | −89.48 | −0.06 | −1.60 | −0.37 | −71.69 | −72.00 | −71.75 |
| avg. | 83.97 | 67.89 | 85.72 | 85.93 | — | — | −91.78 | +17.15 | −1.92 | −4.68 | −58.03 | −64.19 | −65.13 |

TABLE 41

Interconnect Device Area Reduction Results

| Circuit | w/ LCs baseline | w/o LCs | area reduction |
|---|---|---|---|
| alu4 | 8027562 | 6031490 | 24.87% |
| apex2 | 12832956 | 9533624 | 25.71% |
| apex4 | 8807502 | 6559485 | 25.52% |
| bigkey | 19520485 | 15065392 | 22.82% |
| clma | 123197209 | 89125972 | 27.66% |
| des | 28285474 | 21783998 | 22.99% |
| diffeq | 8479705 | 6397439 | 24.56% |
| dsip | 23769620 | 18101740 | 23.85% |
| elliptic | 27411520 | 20210164 | 26.27% |
| ex1010 | 36205361 | 26561010 | 26.64% |
| ex5p | 9176510 | 6825863 | 25.62% |
| frisc | 57239492 | 41537145 | 27.43% |
| misex3 | 8587536 | 6430858 | 25.11% |
| pdc | 53364989 | 38756961 | 27.37% |
| s298 | 10362364 | 7824915 | 24.49% |
| s38417 | 46594875 | 34463763 | 26.04% |
| s38584 | 37840516 | 28014506 | 25.97% |
| seq | 12832956 | 9533624 | 25.71% |
| spla | 30784702 | 22541947 | 26.78% |
| tseng | 5911100 | 4484115 | 24.14% |
| avg. | — | — | 25.48% |

TABLE 42

Runtime Comparisons of Tree/Segment/LP based Schemes

| circuit | # nodes | runtime (S) tree based | runtime (S) segment based | runtime (S) LP based |
|---|---|---|---|---|
| alu4 | 10716 | 60.52 | 124.4 | 482.53 |
| apex2 | 14860 | 180.75 | 378.59 | 1153.28 |
| apex4 | 9131 | 66.93 | 177.52 | 461.37 |
| clma | 91620 | 8763.24 | 16799.67 | >20H |
| elliptic | 30192 | 607.85 | 913.04 | 3136.59 |
| ex1010 | 33265 | 836.32 | 1422.79 | 5109.22 |
| frisc | 40662 | 1135.84 | 1912.15 | 6135.38 |
| pdc | 40001 | 1254.57 | 2508.57 | 8210.07 |
| s38417 | 57503 | 1821.09 | 2895.79 | 9152.52 |
| s38584 | 46014 | 1255.31 | 1892.86 | 6863.62 |
| geometric mean | | 1X | 1.85X | 6.66X |

What is claimed is:

1. A method of placing and routing application logic within an FPGA fabric having multiple supply voltage levels, $V_{ddx}$, levels, the method comprising:

providing a computer aided FPGA circuit design system, said system comprising a computer and programming executable on said computer, and performing with said system steps comprising:

(a) receiving a net list;
(b) assigning critical circuit paths defined within said net list to high supply voltage levels within the FPGA;
(c) determining timing slack on non-critical circuit paths defined in said net list;
(d) determining power sensitivity of circuit non-critical circuit paths;
(e) assigning circuit paths with high power sensitivity and sufficient timing slack to logic blocks operating at a low supply voltage level;
(f) updating timing information;
(g) reversing assignment to logic blocks operating at a low supply voltage level if delay constraints are not met;
(h) continuing, iteratively, to perform steps (e) through (g) until all circuit paths within said net list have been assigned to blocks and routes within said FPGA; and
(i) using a trace-based model, from cycle-accurate simulations of placed and routed circuits for evaluating power tradeoffs when assigning circuit paths.

2. A method as recited in claim 1, further comprising preventing low $V_{dd}$ referenced signals from driving high $V_{dd}$ referenced signals.

3. A method as recited in claim 1, further comprising determining output voltages to be generated on said FPGA by a power supply configured for generating at least one of said multiple supply voltage levels toward optimizing the power-performance tradeoff.

4. A method as recited in claim 1, further comprising power gating of unused logic blocks or interconnect switches to reduce power consumption.

5. A method as recited in claim 1, further comprising coupling lowest available supply voltage level to unused logic blocks or interconnect switches to reduce power.

6. A method as recited in claim 1, wherein the trace is reused for evaluating different $V_{dd}$ and $V_t$ combinations without the need to reroute the circuits.

7. A method as recited in claim 6, wherein the trace is reused for evaluating other device parameters selected from the set of parameters consisting essentially of Tox, size, and body bias, without the need to reroute the circuits.

8. A method as recited in claim 1, further comprising performing simultaneous device and FPGA architecture evaluation within said trace-based model.

9. A method as recited in claim 1, further comprising utilizing different $V_{dd}$ and $V_t$ combinations toward reducing device power dissipation.

10. A method of placing and routing application logic within an FPGA fabric having multiple supply voltage levels, $V_{ddx}$, levels, the method comprising:

providing a computer aided FPGA circuit design system, said system comprising a computer and programming executable on said computer, and performing with said system steps comprising:
(a) receiving a net list;
(b) assigning critical circuit paths defined within said net list to high supply voltage levels within the FPGA;
(c) determining timing slack on non-critical circuit paths defined in said net list;
(d) determining power sensitivity of circuit non-critical circuit paths;
(e) assigning circuit paths with high power sensitivity and sufficient timing slack to logic blocks operating at a low supply voltage level;
(f) updating timing information;
(g) reversing assignment to logic blocks operating at a low supply voltage level if delay constraints are not met;
(h) continuing, iteratively, to perform steps (e) through (g) until all circuit paths within said net list have been assigned to blocks and routes within said FPGA; and
(i) collecting trace information, within a trace-based model, from cycle-accurate simulations of placed and routed circuits for evaluating power tradeoffs when assigning circuit paths.

11. A method as recited in claim 10, further comprising preventing low $V_{dd}$ referenced signals from driving high $V_{dd}$ referenced signals.

12. A method as recited in claim 10, further comprising determining output voltages to be generated on said FPGA by a power supply configured for generating at least one of said multiple supply voltage levels toward optimizing the power-performance tradeoff.

13. A method as recited in claim 10, further comprising power gating of unused logic blocks or interconnect switches to reduce power consumption.

14. A method as recited in claim 10, further comprising coupling lowest available supply voltage level to unused logic blocks or interconnect switches to reduce power.

15. A method as recited in claim 10, wherein the trace is reused for evaluating different $V_{dd}$ and $V_t$ combinations without the need to reroute the circuits.

16. A method as recited in claim 15, wherein the trace is reused for evaluating other device parameters selected from the set of parameters consisting essentially of Tox, size, body bias, without the need to reroute the circuits.

17. A method as recited in claim 10, further comprising performing simultaneous device and FPGA architecture evaluation within said trace-based model.

18. A method as recited in claim 10, further comprising utilizing different $V_{dd}$ and $V_t$ combinations toward reducing device power dissipation.

19. A method of placing and routing application logic within an FPGA fabric having multiple supply voltage levels, $V_{ddx}$, levels, the method comprising:
providing a computer aided FPGA circuit design system, said system comprising a computer and programming executable on said computer, and performing with said system steps comprising:
(a) receiving a net list;
(b) assigning critical circuit paths defined within said net list to high supply voltage levels within the FPGA;
(c) determining timing slack on non-critical circuit paths defined in said net list;
(d) determining power sensitivity of circuit non-critical circuit paths;
(e) assigning circuit paths with high power sensitivity and sufficient timing slack to logic blocks operating at a low supply voltage level;
(f) updating timing information;
(g) reversing assignment to logic blocks operating at a low supply voltage level if delay constraints are not met;
(h) continuing, iteratively, to perform steps (e) through (g) until all circuit paths within said net list have been assigned to blocks and routes within said FPGA;
(i) collecting trace information, within a trace-based model, from cycle-accurate simulations of placed and routed circuits for evaluating power tradeoffs when assigning circuit paths; and
(j) wherein the trace is reused for evaluating different $V_{dd}$ and $V_t$ combinations, for wherein the trace is reused for evaluating other device parameters selected from the set of parameters consisting essentially of Tox, size, body bias, without the need to reroute the circuits.

20. A method as recited in claim 19, further comprising preventing low $V_{dd}$ referenced signals from driving high $V_{dd}$ referenced signals.

21. A method as recited in claim 19, further comprising determining output voltages to be generated on said FPGA by a power supply configured for generating at least one of said multiple supply voltage levels toward optimizing the power-performance tradeoff.

22. A method as recited in claim 19, further comprising power gating of unused logic blocks or interconnect switches to reduce power consumption.

23. A method as recited in claim 19, further comprising coupling lowest available supply voltage level to unused logic blocks or interconnect switches to reduce power.

24. A method as recited in claim 19, further comprising performing simultaneous device and FPGA architecture evaluation within said trace-based model.

25. A method as recited in claim 19, further comprising utilizing different $V_{dd}$ and $V_t$ combinations toward reducing device power dissipation.

26. A method of placing and routing application logic within an FPGA fabric having multiple supply voltage levels, $V_{ddx}$, levels, the method comprising:
providing a computer aided FPGA circuit design system, said system comprising a computer and programming executable on said computer, and performing with said system steps comprising:
(a) receiving a net list;
(b) assigning critical circuit paths defined within said net list to high supply voltage levels within the FPGA;
(c) determining timing slack on non-critical circuit paths defined in said net list;
(d) determining power sensitivity of circuit non-critical circuit paths;
(e) assigning circuit paths with high power sensitivity and sufficient timing slack to logic blocks operating at a low supply voltage level;
(f) updating timing information;
(g) reversing assignment to logic blocks operating at a low supply voltage level if delay constraints are not met;
(h) continuing, iteratively, to perform steps (e) through (g) until all circuit paths within said net list have been assigned to blocks and routes within said FPGA;
(i) collecting trace information, within a trace-based model, from cycle-accurate simulations of placed and routed circuits for evaluating power tradeoffs when assigning circuit paths; and
(j) performing simultaneous device and FPGA architecture evaluation within said trace-based model.

27. A method as recited in claim 26, further comprising power gating of unused logic blocks or interconnect switches to reduce power consumption.

28. A method as recited in claim 26, further comprising coupling lowest available supply voltage level to unused logic blocks or interconnect switches to reduce power.

\* \* \* \* \*